(12) United States Patent
Otsuka et al.

(10) Patent No.: US 6,670,830 B2
(45) Date of Patent: Dec. 30, 2003

(54) DRIVER CIRCUIT, RECEIVER CIRCUIT, AND SIGNAL TRANSMISSION BUS SYSTEM

(75) Inventors: Kanji Otsuka, 1074-38, Kohan 2-chome, Higashiyamato-shi, Tokyo 207-0002 (JP); Tamotsu Usami, 38-4, Nishimachi 2-chome, Kokubunji-shi, Tokyo 185-0035 (JP)

(73) Assignees: Kanji Otsuka, Tokyo (JP); Tamotsu Usami, Tokyo (JP); Oki Electric Industry Co., Ltd., Tokyo (JP); Sanyo Electric Co., Ltd., Osaka (JP); Sharp Kabushiki Kaisha, Osaka (JP); Sony Corporation, Tokyo (JP); Kabushiki Kaisha Toshiba, Kanagawa (JP); NEC Corporation, Tokyo (JP); Hitachi, Ltd., Tokyo (JP); Fujitsu Limited, Kanagawa (JP); Matsushita Electric Industrial Co. Ltd., Osaka (JP); Mitsubishi Denki Kabushiki Kaisha, Tokyo (JP); Rohm Co., Ltd., Kyoto (JP)

( * ) Notice: Subject to any disclaimer, the term of this patent is extended or adjusted under 35 U.S.C. 154(b) by 506 days.

(21) Appl. No.: 09/761,583

(22) Filed: Jan. 18, 2001

(65) Prior Publication Data

US 2001/0013075 A1 Aug. 9, 2001

(30) Foreign Application Priority Data

Jan. 27, 2000 (JP) ........................................ 2000-018928

(51) Int. Cl.$^7$ ........................................ H03K 19/0175
(52) U.S. Cl. ........................ 326/86; 326/30; 326/83
(58) Field of Search .............................. 326/26, 27, 30, 326/82, 83, 86, 89, 90

(56) References Cited

U.S. PATENT DOCUMENTS

| | | | |
|---|---|---|---|
| 6,373,275 B1 * | 4/2002 | Otsuka et al. ................. 326/30 |
| 6,448,813 B2 * | 9/2002 | Garlepp et al. ............... 326/83 |
| 2001/0028261 A1 * | 10/2001 | Aizawa ....................... 327/108 |

* cited by examiner

Primary Examiner—Don Le
(74) Attorney, Agent, or Firm—Volentine Francos, PLLC

(57) ABSTRACT

A signal transmission bus system has a transmission line pair on which binary data values are indicated by the presence and absence of a complementary signal. A driver circuit opens and closes a current path that supplies the complementary signal to the transmission line pair. When this path is opened, the driver circuit closes a bypass current path, so that the driver circuit behaves as a direct-current circuit and does not generate power-supply and ground noise. A receiver that senses the presence and absence of the complementary signal on the transmission line pair includes a differential amplifier and a termination transistor coupled across the input terminals of the differential amplifier, to discharge the input capacitance of the differential amplifier so that high-speed signals can be sensed rapidly.

74 Claims, 28 Drawing Sheets

DRIVER CIRCUIT, RECEIVER CIRCUIT, AND SIGNAL TRANSMISSION BUS SYSTEM

BACKGROUND OF THE INVENTION

The present invention relates to a signal transmission bus system for transmitting an electrical signal, such as a high-speed digital signal with a frequency of several gigahertz or more, over a transmission line from a driver circuit to a receiver circuit.

A conventional signal transmission bus system, depicted in FIG. 21, includes a transmission line 101, a driver circuit 102, and a receiver circuit 103 formed in or mounted on a circuit substrate 104. In a typical application, the driver circuit 102 and receiver circuit 103 are disposed in separate integrated-circuit (IC) chips, which are mounted on the circuit substrate 104. A power-supply pattern 105 and a ground pattern 106 are formed within the circuit substrate 104. The power-supply pattern 105 supplies power from a power supply, generically denoted Vdd, to the driver circuit 102, receiver circuit 103, and other circuits. Although shown as a line in the drawing, the power-supply pattern 105 may occupy part or all of a plane in the circuit substrate 104. A ground pattern 106, likewise having a broad planar extent, connects the driver circuit 102, receiver circuit 103, and other circuits to the ground side of the power supply, denoted by the conventional ground symbol and the letters GND. The transmission line 101 is configured as a microstrip transmission line.

The driver circuit 102 and receiver circuit 103 are complementary metal-oxide-semiconductor (CMOS) circuits, each having a p-channel metal-oxide-semiconductor field-effect transistor (hereinafter, pMOS transistor) with its source electrode coupled to the power-supply pattern 105, an n-channel metal-oxide-semiconductor field-effect transistor (hereinafter, nMOS transistor) with its source electrode coupled to the ground pattern 106, an input terminal connected to the gate electrodes of these two transistors, and an output terminal connected to the drain electrodes of the two transistors. The two ends of the transmission line 101 are coupled to the output terminal of the driver circuit 102 and the input terminal of the receiver circuit 103. The input impedance of the receiver circuit 103 exceeds the characteristic impedance of the transmission line 101.

The driver circuit 102 receives a transmit input signal TS from an external source, and places a corresponding transmitted signal on the transmission line 101. The receiver circuit 103 receives the transmitted signal and generates a corresponding receive output signal RS.

One advantage of a CMOS driver circuit such as the driver circuit 102 is its low power dissipation. Power dissipation is low because significant current flows only when the transmit input signal TS changes state.

A high-to-low transition of the transmit input signal TS causes current (denoted $I_{LH}$) to flow from the power-supply pattern 105 through the pMOS transistor in the driver circuit 102 into the microstrip transmission line 101. On the microstrip transmission line 101, the transmitted signal propagates as an electromagnetic wave from the driver circuit 102 to the receiver circuit 103, changing the potential level sensed by the receiver circuit 103 from low to high. In the power-supply pattern 105, a flow of charge occurs as electrons drift from the driver circuit 102 toward the power supply Vdd. Repeated at each high-to-low transition of the transmit input signal TS, this flow of charge creates a current flow with an alternating (ac) component in the power-supply pattern 105.

Similarly, a low-to-high transition of the transmit input signal TS causes current (denoted $I_{HL}$) to flow from the microstrip transmission line 101 through the nMOS transistor in the driver circuit 102 into the ground pattern 106. On the microstrip transmission line 101, the transmitted signal again propagates as an electromagnetic wave from the driver circuit 102 to the receiver circuit 103, changing the potential level sensed by the receiver circuit 103 from high to low. In the ground pattern 106, a flow of charge occurs as electrons drift from ground toward the driver circuit 102. Repeated at each low-to-high transition of the transmit input signal TS, this flow of charge creates a current flow with an ac component in the ground pattern 106.

If, for example, the power-supply voltage Vdd is 3.3 volts, the transistors in the driver circuit 102 have on-resistances of fifteen ohms (15 Ω) and off-resistances of one hundred thousand ohms (100 kΩ), and the resistance of the transmission line 101 is one hundred ohms (100 Ω), then the so-called dark current that flows from the power supply through the power-supply pattern 105 to the transmission line 101 when the transmission line 101 is at the low (ground) potential level, and from the transmission line 101 through the ground pattern 106 to ground when the transmission line 101 is at the high (Vdd) potential level, has the comparatively small value of three hundred thirty microamperes.

$$3.3 \text{ V}/(100 \text{ Ω}+100 \text{ kΩ})=330 \text{ }\mu\text{A}$$

If the signal propagation time on the transmission line 101 is one nanosecond (1 ns), then during that one nanosecond, the current $I_{LH}$ or $I_{HL}$ flowing into or out of the microstrip transmission line 101, charging or discharging the capacitance of the transmission line 101, has the comparatively large value of twenty-nine milliamperes.

$$3.3 \text{ V}/(15 \text{ Ω}+100 \text{ Ω})=29 \text{ mA}$$

If the transmit input signal TS is a high-speed digital signal with a frequency of several gigahertz (GHz), for example, then an alternating current component of comparable frequency, with a magnitude equal to the difference between the above two current values, is generated in the power-supply pattern 105 and ground pattern 106. This comparatively large, high-frequency ac component can perturb the power-supply and ground potentials and affect the signal transmission bus system as a whole. Resonating with stray inductances and capacitances, it can cause the signal transmission bus system to malfunction.

Another problem is waveform distortion due to substantially total reflection of the transmitted signal at the receiver circuit 103. If, for example, TS transitions occur at frequencies of several gigahertz and the signal propagation time on the transmission line 101 is one nanosecond, then each reflection may distort multiple pulse waveforms, which are propagating simultaneously in the transmission line 101, and each waveform may be distorted by multiple reflections. The reflection distortions are further increased if the transmission line 101 is connected as a signal bus to multiple receiver circuits.

The above resonance effects and multiple reflection effects also generate electromagnetic radiation, which can give rise to eddy currents in extended planar areas of the power-supply pattern 105 and ground pattern 106. The eddy currents in turn generate further electromagnetic radiation, which becomes electromagnetic interference (EMI) affecting other circuits on the circuit substrate 104.

Another problem is that when the TS frequency is high enough to make the TS pulse width less than the signal propagation time (e.g., 1 ns) on the transmission line 101, a large current (either $I_{LH}$ or $I_{HL}$) flows almost continuously, so the CMOS advantage of low power dissipation is lost.

As a solution to the problems of the signal transmission bus system shown in FIG. 21, the present inventors have proposed the signal transmission bus system shown in FIG. 22 (disclosed in Japanese Unexamined Patent Publication No. 10-348270). The transmission line in this system is a transmission line pair 201 comprising parallel signal transmission lines 201a, 201b of equal length, interconnected by a termination resistance 202 at one end, connected to a driver circuit 203 at the other end, and having one or more branching sections 204 (two are shown) at intermediate points between the two ends. The branching sections 204 couple the transmission line pair 201 to respective receiver circuits 205. The system also includes a power-ground line pair 206, comprising a power-supply line 206a and a parallel ground line 206b of equal length. The above components are disposed on a circuit substrate 207, the driver circuit 203 being part of an IC chip 211, the receiver circuits 205 being disposed in other IC chips 212.

The termination resistance 202 is matched to the characteristic impedance of the transmission line pair 201.

The driver circuit 203 is a driver of the current-switch type, the current switch being formed by a pMOS transistor $Q_1$ and an nMOS transistor $Q_2$ coupled in series between the power-supply line 206a and ground line 206b, in parallel with an nMOS transistor $Q_3$ and a pMOS transistor $Q_4$ also coupled in series between the power-supply line 206a and ground line 206b. The connections to the power-supply line 206a and ground line 206b pass through respective series resistances 208, 209. The transmit input signal TS is applied to the gate electrodes of all four transistors $Q_1$, $Q_2$, $Q_3$, $Q_4$. The node at which transistors $Q_1$ and $Q_2$ are interconnected is coupled to transmission line 201a, while the node at which transistors $Q_3$ and $Q_4$ are interconnected is coupled to transmission line 201b. Incidentally, bipolar transistors may be used instead of MOS transistors in the current switch.

The driver circuit 203 supplies a transmitted signal to the transmission line pair 201, responsive to the transmit input signal TS. The transmitted signal is a complementary signal having mutually complementary components that propagate on transmission lines 201a and 201b, respectively. The driver circuit 203 interchanges these complementary components, thereby inverting the polarity of the complementary signal, each time the TS level changes (from high to low, or from low to high).

Each branching section 204 diverts a small part of the energy of the complementary signal on the transmission line pair 201 to the coupled receiver circuit 205, which senses the signal without significantly disturbing its propagation on the transmission line pair 201. The receiver circuit 205 is, for example, a differential amplifier.

A driver circuit of the current-switch type enables current to flow steadily from the power supply Vdd to ground, regardless of whether the transmit input signal TS is high or low. This direct current (dc) flow is necessary if digital signals are to be transmitted at frequencies above five hundred megahertz (500 MHz). At frequencies that high, a CMOS driver of the type shown in FIG. 21 cannot supply charge to the transmission line fast enough to keep up with the transmit input signal; switching the currents $I_{LH}$ and $I_{HL}$ on and off at that high a frequency requires too much energy. The driver circuit 203 in FIG. 22, however, only has to change the direction of charge movement on the transmission line pair 201, which it can do at high speed while maintaining a steady dc flow from the power supply (Vdd) to ground.

By using a transmission line pair 201 comprising two parallel signal transmission lines 201a, 201b of equal length, the signal transmission bus system shown in FIG. 22 can transmit digital signals at rates up to several gigahertz. Sinewave signals can be transmitted at frequencies more than five times higher than the maximum digital signal rate. No reflection occurs at the end of the transmission line pair 201, because the termination resistance 202 matches the characteristic impedance of the signal transmission lines 201a and 201b. A signal transmission bus system of this type thus combines a simple structure with ideal signal-transmission properties.

This signal transmission bus system is not entirely free of problems, however. Since the transistors $Q_1$, $Q_2$, $Q_3$, $Q_4$ switch on and off simultaneously, they pass simultaneously through a partly-on state, halfway between the on and off states, in which current flows directly from the power-supply line 206a to the ground line 206b through transistors $Q_1$ and $Q_2$, and through transistors $Q_3$ and $Q_4$, bypassing the transmission line pair 201. At each transition of the transmit input signal TS, there is thus a brief instant during which the power-supply line 206a is semi-short-circuited to the ground line 206b. This causes common-mode noise, in which the ground potential rises momentarily and the power-supply potential (Vdd) falls momentarily. A small amount of differential-mode noise may also occur.

As an example, suppose that the power-supply voltage Vdd is 3.3 V, the characteristic impedance of each signal transmission line 201a, 201b is 100 Ω, the termination resistance is 100 Ω, and the resistance value of each series resistance 208, 209 is also 100 Ω. Let it further be assumed that transistors $Q_1$ to $Q_4$ have identical switching characteristics, with an on-resistance of 15 Ω, an off-resistance of 100 kΩ, and a resistance of 500 Ω in the state halfway between the on and off states.

When the transistors $Q_1$ to $Q_4$ in the current switch are not being switched, the total series resistance of transistors $Q_1$ and $Q_2$ and series resistances 208, 209 has the following value, which is also the total series resistance of transistors $Q_3$ and $Q_4$ and series resistances 208, 209.

$$(2\times100\ \Omega)+(100\ k\Omega+15\ \Omega)=100215\ \Omega$$

The current conducted through transistors $Q_1$ and $Q_2$ has the following value, as does the current conducted through transistors $Q_3$ and $Q_4$.

$$3.3\ V/100215\ \Omega 33\ \mu A$$

During non-switching times, the total current conducted directly through the current switch from the power-supply line 206a to the ground line 206b is only 66 µA.

When switching occurs, at the instant halfway through the switching period, the total series resistance on the direct path through each pair of transistors has the following value.

$$(2\times100\ \Omega)+(2\times500\ \Omega)=1.2\ k\Omega$$

The short-circuit current conducted on each direct path at this instant thus has the following value.

$$3.3\ V/1.2\ k\Omega=2.75\ mA$$

The signal current conducted through the transmission line pair 201 at non-switching times has the following value.

$$3.3\ V/(2\times100\ \Omega+2\times15\ \Omega+100\ \Omega)=10\ mA$$

These two current values can be compared as follows.

2.75 mA/10 mA=27.5%

Halfway through the switching period, accordingly, the short-circuit current becomes too large to be ignored. Since there are two short-circuit paths in the driver circuit 203, if the two paths switch with exactly the same timing, the total instantaneous short-circuit current reaches twice the above value (55% of the normal signal current flow through the transmission line pair 201). If the timing is skewed, the short-circuit current changes in a complex pattern including high-frequency components, which also cause significant noise problems.

A similar short-circuit current flows through the driver circuit 102 in FIG. 21 at switching instants. The problems caused by this short-circuit current did not become noticeable, however, because this driver circuit 102 is not used with very high-frequency signals.

The common-mode noise due to the above short-circuit current occurs on a shorter time scale than even the rise time of the transmitted digital signal; the common-mode noise includes frequency components more than ten times higher than those of the transmitted digital signal. The common-mode noise leads to power and ground potential perturbations that affect the entire signal transmission bus system. Through resonance with stray inductances and capacitances, these perturbations of the signal transmission system as a whole produce electromagnetic radiation.

One way to reduce the occurrence of common-mode noise is to insert a bypass capacitor, also referred to as a decoupling capacitor, between the power-supply line and the ground line, near the driver circuit, to supply extra charge when sudden current changes occur. A bypass capacitor, however, has its own parasitic inductance, which functions as an impedance when charge is being supplied in response to sudden current changes, impeding the supply of charge and inducing voltage noise in the power supply and ground potentials.

FIG. 23 shows an evaluation system that the inventors have used to evaluate common-mode noise. The IC chip 211 including the driver circuit 203 was mounted on an evaluation board 221 together with a bypass capacitor 222, a resistor 223, and probe terminals 224, 225, 226.

The bypass capacitor 222 was a ceramic chip capacitor measuring one millimeter by one-half millimeter in size (size 1005, 1.0 mm×0.5 mm), with a capacitance of one-tenth of a microfarad (0.1 $\mu$F). It was mounted between the power-supply line 206a and ground line 206b at a point near the IC chip 211. The resistor 223 was connected to the output terminals $D_1$ and $D_2$ of the driver circuit 203, and had a resistance of 100 Ω. Probe terminal 224 was coupled to the ground line 206b, probe terminal 225 to output terminal $D_1$ of the driver circuit 203, and probe terminal 226 to output terminal $D_2$ of the driver circuit 203.

In the evaluation system in FIG. 23, the supply voltage Vdd was 3.3 V and the input signal $V_{IN}$ was a 100-MHz signal with an amplitude of 2.4 V. The probe terminals 224, 225, 226 were contacted by field-effect-transistor (FET) probes. Measurements were made of the voltage $V(D_1-D_2)$ across the two output terminals, the voltage $V(D_1\text{-GND})$ of output terminal $D_1$ with respect to ground, and the voltage $V(D_2\text{-GND})$ of output terminal $D_2$ with respect to ground.

An example of the observed voltage waveforms is shown in FIGS. 24A, 24B, and 24C. FIG. 24A shows the differential voltage waveform $V(D_1-D_2)$ across the driver output terminals $D_1$ and $D_2$. FIG. 24B shows the voltage waveforms $V(D_1\text{-GND})$ and $V(D_2\text{-GND})$ of each output terminal with respect to ground, and the sum $V(D_1\text{-GND})+V(D_2\text{-GND})$ of these two voltages. FIG. 24C shows only the sum waveform $V(D_1\text{-GND})+V(D_2\text{-GND})$.

As can be seen from FIGS. 24B and 24C, the parasitic inductance of the bypass capacitor 222 prevents it from instantly supplying the charge needed during the sudden current changes that occur when the driver circuit is switching, allowing considerable common-mode noise to appear on both of the outputs of the driver circuit; that is, on both $V(D_1\text{-GND})$ and $V(D_2\text{-GND})$. Both the frequency components and the intensity of the common-mode noise are high enough to cause significant EMI problems, even though the common-mode noise does not affect the transmitted signal itself. Since the driver circuit outputs a differential voltage signal, the common-mode noise cancels out, giving the transmitted signal the comparatively noise-free $V(D_1-D_2)$ waveform shown in FIG. 24A.

The measurements described in FIG. 23 and FIGS. 24A to FIG. 24C indicate that an external bypass capacitor such as a ceramic chip capacitor is incapable of eliminating the common-mode noise that occurs during the switching of the driver circuit, because of the parasitic inductance of the bypass capacitor. This is true even if a low-inductance capacitor (LICA) is employed as the external bypass capacitor. The only type of capacitor that can eliminate the common-mode noise is an embedded capacitor disposed together with the driver circuit inside the IC chip. Embedding the capacitor in the chip reduces its parasitic inductance to a substantially negligible level, such as one-tenth of a nanohenry (0.1 nH).

The power-supply and ground perturbations caused by the parasitic inductance of the bypass capacitor will be described in further detail below, with reference to a simulation performed with the well-known Simulation Program with Integrated Circuit Emphasis (SPICE).

Equivalent circuit diagrams of the signal transmission bus system to which the SPICE simulator was applied are shown in FIGS. 25A to 25D. The bypass capacitor is capacitor C1, and its parasitic inductance is represented by inductance L1. Bipolar npn transistors $Q_1$ and $Q_2$ are equivalent to the pMOS transistors in a CMOS driver circuit (see the signal transmission bus system 104 in FIG. 21), while bipolar pnp transistors $Q_3$ and $Q_4$ are equivalent to the nMOS transistors of a CMOS driver circuit. Transmission lines T1 and T2 are equivalent to the signal transmission lines, while transmission line T3 is equivalent to the power line. The equivalent circuits in FIGS. 25A to 25d differ only in the capacitance and inductance values (C1 and L1) assigned to the bypass capacitor. This capacitance (C1) is one hundred nanofarads (100 nF) in FIGS. 25A and 25B, and ten nanofarads (10 nF) in FIGS. 25C and 25D. The inductance (L1) is one-tenth of a nanohenry (0.1 nH) in FIGS. 25A and 25C, and one nanohenry (1 nH) in FIGS. 25B and 25D. Capacitance values C2 to C5, inductance values L2 and L3, resistance values R1 to R7, and the characteristics of the power-supply voltages $V_1$ and $V_2$, transmission lines T1 to T3, and transistors $Q_1$ to $Q_4$ are the same in all four circuits.

The SPICE simulator was used to obtain waveforms at node N2 (the positive terminal of power supply $V_2$) and node N3 (at which inductance L1 and transistor $Q_1$ are interconnected) when a square wave was applied at node N1 (the positive terminal of power supply $V_1$). The simulated waveforms obtained from the equivalent circuits in FIGS. 25A to 25D are shown in corresponding FIGS. 26A to 26D. V(N1), V(N2), and V(N3) indicate voltages at nodes N1, N2, and N3, respectively, while I(L1) indicates the voltage across inductance L1 due to the charging and discharging of capacitance C1, and I(R5) indicates the ac component of the voltage across resistance R5.

Conventional wisdom calls for the bypass capacitor to have a capacitance of 100 nF or more, but the simulated waveforms indicate that if the parasitic inductance of the bypass capacitor is 0.1 nH or less, a capacitance of only 10 nF, one-tenth the conventional value, provides an adequate decoupling effect.

Common-mode noise can also be eliminated from the current-switch driver circuit shown in FIG. 22 by use of a bypass capacitor with a parasitic inductance of 0.1 nH or less, but a parasitic inductance value that small cannot be achieved with an external bypass capacitor. The only choice is to embed the bypass capacitor inside the IC chip, as mentioned above, preferably close to the driver circuit. Further information is given in the patent publication cited above.

Thus with a driver circuit of the current-switch type described above, there is the problem that during signal transition periods (when the transistors in the driver circuit are switching), the impedances seen from the power supply and ground undergo momentary changes, due to the dynamic changes in the transistor impedances, and short-circuit current is permitted to flow, generating common-mode noise (and a small amount of differential-mode noise) that leads to power-supply and ground perturbations. To eliminate this common-mode noise, it is necessary to embed a bypass capacitor inside the IC chip, near the driver circuit, but that constrains the design of the IC chip.

SUMMARY OF THE INVENTION

An object of the present invention is to reduce power-supply and ground disturbances caused by transmission of high-speed signals.

Another object of the invention is to increase signal transmission speeds.

Another object is to simplify the decoupling of power-supply and ground lines.

The invented driver circuit receives power at different potentials from a first power supply and a second power supply, and receives an input signal having a first level and a second level. The driver circuit supplies a complementary signal to a signal transmission line pair, which has first and second signal transmission lines, by closing a first current path between the first power supply and the first signal transmission line, and a second current path between the second power supply and the second signal transmission line, when the input signal is at the first level. When the input signal is at the second level, the driver circuit opens the first current path and second current path, and closes a third current path between the first power supply and the second power supply, bypassing the signal transmission line pair, so that no complementary signal is supplied. The first and second signal transmission lines are mutually parallel and have equal length.

The second power supply may be a ground supply.

The driver circuit behaves as a dc circuit, conducting current from the first power supply to the second power supply via the first current path, the signal transmission line pair, and the second current path when the input signal is at the first level, and via the third current path when the input signal is at the second level. During transitions between the two input signal levels, the impedance of the first and second current paths increases while the impedance of the third current path decreases, or vice versa, so the impedance seen from the power supplies remains substantially constant. Consequently, the driver circuit generates comparatively little common-mode noise, does not significantly disturb the power-supply potentials, and can transmit signals at high speed without producing significant electromagnetic interference. These effects are furthermore obtained without reliance on the decoupling of the power-supply lines by a bypass capacitor; in particular, it is not necessary to embed a bypass capacitor in the driver circuit. Thus while a bypass capacitor may be used, there are no tight constraints on its mounting position, parasitic inductance, and other attributes.

The invented receiver circuit includes a differential amplifier having a pair of differential input terminals, and a termination transistor coupled between the differential input terminals. The differential input terminals are coupled through respective resistances to a signal transmission line pair of the type described above. The differential amplifier generates an output signal indicating whether or not a complementary signal is present on the signal transmission line pair.

When the complementary signal is present, it charges the input capacitance of the differential amplifier. When the complementary signal disappears, the stored charge is rapidly discharged through the termination transistor, enabling the signal-absent state to be sensed quickly.

The invented signal transmission bus system comprises the signal transmission line pair described above, and a termination resistance interconnecting the first signal transmission line and second signal transmission line at one end of the signal transmission line pair, matching the characteristic impedance of the first signal transmission line and second signal transmission line. The signal transmission line pair is coupled to at least one driver circuit of the invented type, or at least one receiver circuit of the invented type. Several connection configurations are possible.

In one configuration, a driver circuit is coupled to the end of the signal transmission line pair opposite the termination resistance, and at least one receiver circuit is coupled to the signal transmission line pair at a point intermediate between its two ends, through a branching section.

In another configuration, a receiver circuit is coupled to the end of the signal transmission line pair opposite the termination resistance, and at least one driver circuit is coupled to the signal transmission line pair at a point intermediate between its two ends, through a branching section.

In still another configuration, a first IC chip is coupled to the end of the signal transmission line pair opposite the termination resistance, and a second IC chip is coupled to the signal transmission line pair at a point intermediate between its two ends, through a branching section. Each of the two IC chips includes both a driver circuit and a receiver circuit, enabling complementary signals to be transmitted in both directions on the signal transmission line pair.

In the invented signal transmission bus system, the termination resistance prevents reflection at the end of the signal transmission line pair. Use of the invented driver circuit and/or the invented receiver circuit enables high-speed signal transmission.

When the invented driver circuit is used in the invented signal transmission bus system, the termination resistance may be configured as two resistances coupled in series, the node between the two resistances being coupled to the second power supply. This configuration stabilizes the potential of the signal transmission line pair when the complementary signal is absent, providing the signal transmission line pair with added immunity to external electromagnetic interference.

The invented driver circuit may also include a noise-elimination resistance, coupled between the first signal and second signal transmission lines, to absorb reflections that may occur at intermediate points on the signal transmission line pair. The noise-elimination resistance may be configured as two resistances coupled in series, the node between the two resistances being coupled to the second power supply, to stabilize the potential of the signal transmission line pair when the complementary signal is absent and provide added immunity to external electromagnetic interference.

Power from the first and second power supplies may be supplied to the driver circuit over a power line pair comprising parallel lines of equal length. The inductances of these parallel lines will then cancel out, so that the power line pair is substantially free of reactance. This arrangement helps to prevent electromagnetic disturbances on the power lines. A bypass capacitor may be coupled to the power line pair, to reduce the effects of electromagnetic noise generated by other circuits.

One or more resistances may be inserted in series between the driver circuit and the power supplies, to reduce current consumption and thus reduce power dissipation.

The receiver circuit, driver circuit, or IC chip coupled to the signal transmission line pair at an intermediate point thereon may be coupled through a branch transmission line pair comprising parallel lines of equal length. When a driver circuit is coupled in this way, the characteristic impedance of the branch transmission line pair is preferably one-half the characteristic impedance of the signal transmission line pair.

The signal transmission bus system may include two or more signal transmission line pairs, coupled to respective driver circuits or receiver circuits by branch transmission line pairs. A branch transmission line pair may then cross a signal transmission line pair to which it is not coupled. In one preferred structure in this case, the first and second signal transmission lines forming the signal transmission line pair are mutually separated by a first dielectric layer, the first and second branch transmission lines forming the branch transmission line pair are mutually separated by a second dielectric layer, and the signal transmission line pair is separated from the branch transmission line pair by a third dielectric layer at least twice as thick as the first and second dielectric layers. The inductances of the first and second signal transmission lines then cancel out, and the inductances of the first and second branch transmission lines cancel out, so that the signal transmission line pair and branch transmission line pair have zero reactance. The signal transmission line pair and branch transmission line pair are also sufficiently separated from each other that mutual interference between the signals on them is prevented at the crossover point.

If the receiver circuit has a sufficiently high input resistance and a sufficiently low input capacitance, it may be coupled directly to the signal transmission line pair.

DETAILED DESCRIPTION OF THE INVENTION

Figure 1:
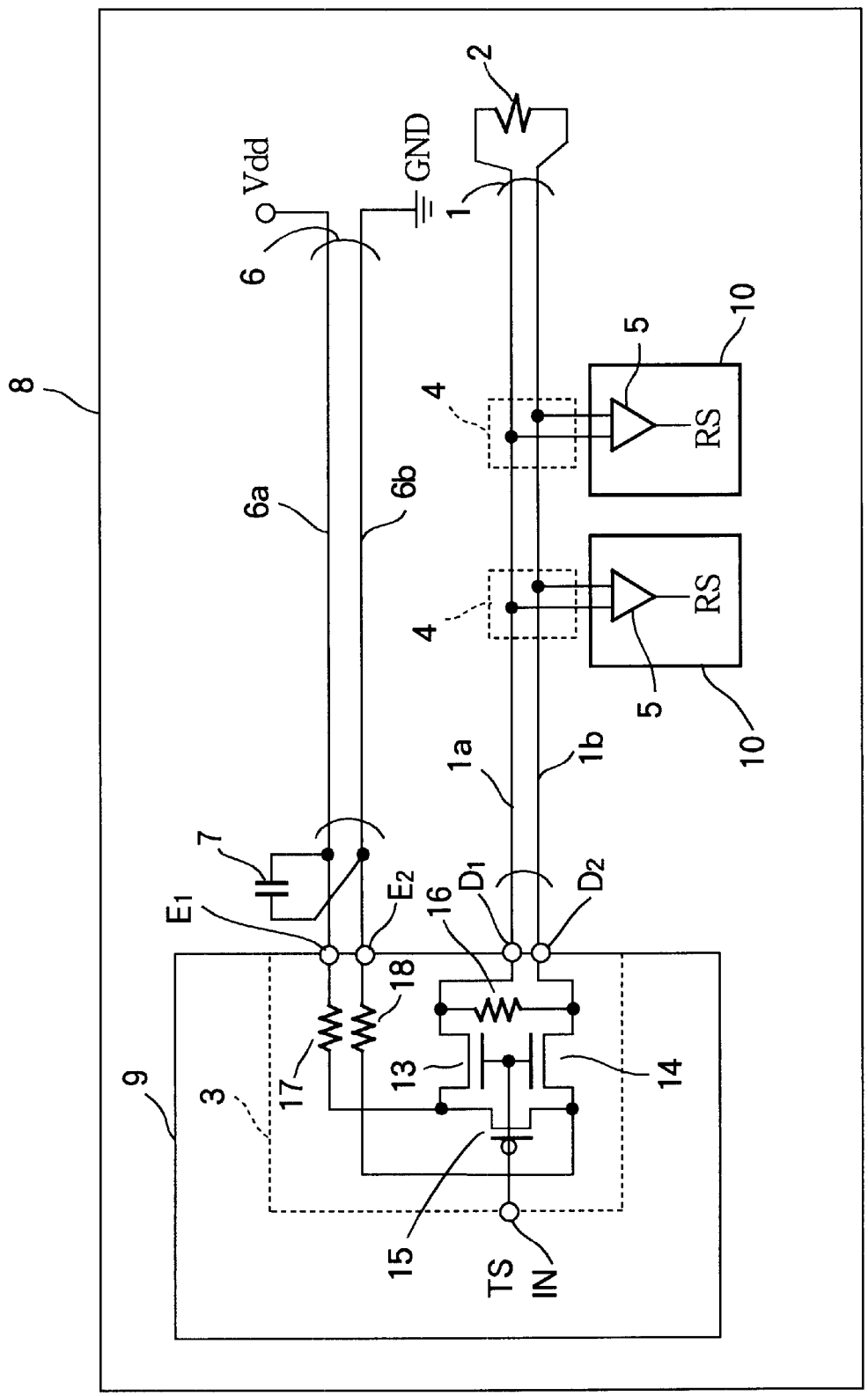
FIG. 1 is a circuit diagram of a signal transmission bus system illustrating a first embodiment of the invention.

Embodiments of the invention will now be described with reference to the attached drawings, in which like parts are indicated by like reference characters. The first power supply will be referred to simply as the power supply (Vdd), the second power supply will be referred to as ground (GND), and the power line pair will be referred to as a power-ground line pair.

The first embodiment of the invention is the signal transmission bus system shown in FIG. 1, comprising a signal transmission line pair 1, a termination resistance 2, a driver circuit 3, one or more branching sections 4 (two are shown), one or more receiver circuits 5 (two are shown), a power-ground line pair 6, and a bypass capacitor 7, disposed in or on a circuit substrate 8. The driver circuit 3 is disposed in an IC chip or driver chip 9, and each receiver circuit 5 is disposed in another IC chip or receiver chip 10, these IC chips 9, 10 being mounted on the circuit substrate 8. Novel features are present in both the driver circuit 3 and the receiver circuits 5.

The signal transmission line pair 1 comprises two parallel signal transmission lines 1a, 1b of equal length. The termination resistance 2, which terminates one end of the signal transmission line pair 1, is matched to the characteristic impedance of the signal transmission lines 1a, 1b. The driver circuit 3 is disposed at the other end of the signal transmission line pair 1. The branching sections 4 and receiver circuits 5 are disposed at intermediate points on the signal transmission line pair 1, between the two ends, each receiver circuit 5 being coupled to the signal transmission line pair 1 by a branching section 4. A receiver circuit 5 and its connected branching section 4 together constitute a branch receiver unit.

The power-ground line pair 6 comprises a power-supply line 6a and a ground line 6b, which are mutually parallel and equal in length. The power-supply line 6a couples a power terminal $E_1$ of the driver circuit 3 to a power supply Vdd. The ground line 6b couples a ground terminal $E_2$ of the driver circuit 3 to ground (GND).

Figure 2A:
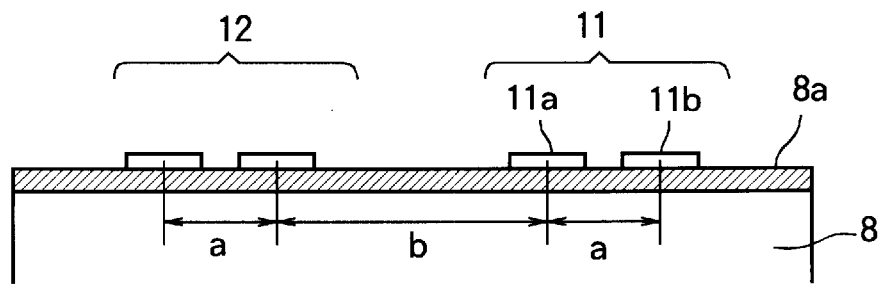
FIGS. 2A and 2B are sectional views of transmission line pairs.
Figure 2B:
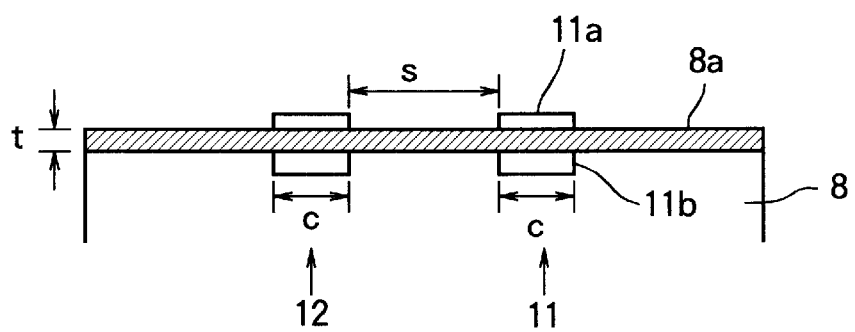

Both the signal transmission line pair 1 and the power-ground line pair 6 are transmission line pairs comprising two parallel transmission lines of equal length. FIGS. 2A and 2B show two possible dispositions of such a transmission line pair. In FIG. 2A, the two transmission lines 11a, 11b constituting the transmission line pair 11 are disposed side by side on the same surface of a dielectric layer 8a forming part of the circuit substrate 8, their centers separated by a certain distance (a). In FIG. 2B, the two transmission lines 11a, 11b are disposed on opposite surfaces of this dielectric layer 8a, facing one another, so that they are separated by the thickness (t) of the dielectric layer 8a. The two transmission lines 11a, 11b have equal length, although this is not visible in the cross-sectional views in FIGS. 2A and 2B.

In the transmission line pairs 11 shown in both FIGS. 2A and 2B, the inductance of transmission line 11a cancels the inductance of transmission line 11b; this feature suppresses electromagnetic interference.

In the structure shown in FIG. 2A, if two transmission line pairs 11, 12 are separated by a distance (b) more than twice the internal separation (a) of each transmission line pair (b>2a), the electromagnetic field of each transmission line pair will be substantially closed, and its electromagnetic radiation will not affect the other transmission line pair significantly. In the structure shown in FIG. 2B, if the separation (s) between two adjacent signal transmission line pairs 11, 12 is greater than twice the sum of the thickness (t) of the dielectric layer 8a and the width (c) of the individual transmission lines, that is, if $$s>2(t+c)$$

then once again, the electromagnetic field of each transmission line pair will be substantially closed, and its electromagnetic radiation will not affect the other transmission line pair significantly. The structure shown in FIG. 2B will be adopted in this and the subsequent embodiments. Thus, in the following description, a transmission line pair with parallel transmission lines of equal length will mean a transmission line pair with the structure shown in FIG. 2B.

The power-supply line 6a and ground line 6b, which carry predominantly direct current, do not always need to have the structure shown in FIG. 2A or 2B, but in a signal transmission bus system that carries high-speed digital signals, it is desirable for any transmission lines on which charge flows to have closed electromagnetic fields, to reduce the effects of electromagnetic radiation on other transmission lines or other circuit elements.

Figure 3:
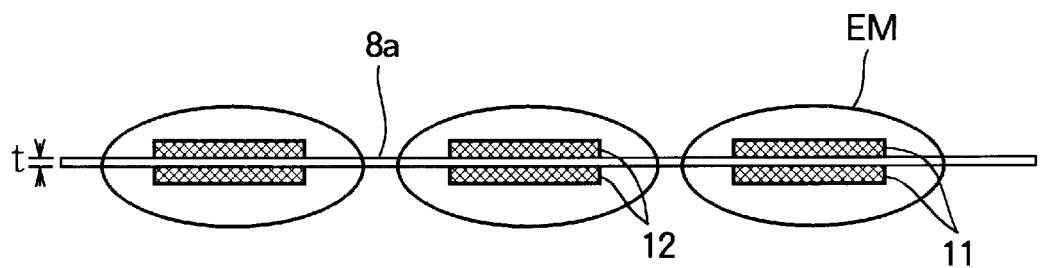
FIG. 3 is a sectional view illustrating electromagnetic fields surrounding transmission line pairs.

The extent of the electromagnetic field EM surrounding a transmission line pair with the parallel equal-length structure described above is shown schematically in FIG. 3. The thickness (t) of the dielectric layer 8a should be small enough to satisfy the condition s>2(t+c) given above. If this condition is satisfied, then, as shown in FIG. 3, the electromagnetic field EM of the signal transmission line pair 11 will be substantially confined to the vicinity of the transmission line pair and will not interfere with the electromagnetic field of the adjacent signal transmission line pair 12.

Referring again to FIG. 1, the driver circuit 3 comprises a pair of drive transistors 13, 14, a bypass transistor 15, a noise-elimination resistance 16, a pair of series resistances 17, 18, an input terminal IN, a pair of drive terminals $D_1$, $D_2$, and the above-mentioned power-supply terminal $E_1$ and ground terminal $E_2$.

A transmit input signal TS is supplied to the input terminal IN from another circuit (not visible) in the driver chip 9. Drive terminal $D_1$ is coupled to the end of signal transmission line 1a, drive terminal $D_2$ is coupled to the end of signal transmission line 1b, power terminal $E_1$ is coupled to the end of the power-supply line 6a, and ground terminal $E_2$ is coupled to the end of the ground line 6b.

Drive transistor 13 is an nMOS transistor coupled between the power terminal $E_1$ and drive terminal $D_1$. Drive transistor 14 is an nMOS transistor coupled between drive terminal $D_2$ and the ground terminal $E_2$. The bypass transistor 15 is a pMOS transistor coupled between the power terminal $E_1$ and ground terminal $E_2$. The gate electrodes of the drive transistors 13, 14 and bypass transistor 15 are coupled to the input terminal IN.

Series resistance 17 is inserted between drive transistor 13 and the power terminal $E_1$, forming a series circuit with drive transistor 13. Series resistance 18 is inserted between drive transistor 14 and the ground terminal $E_2$, forming a series circuit with drive transistor 14. One electrode of the bypass transistor 15 is coupled to an electrode of drive transistor 13, both of these electrodes being coupled through series resistance 17 to the power terminal $E_1$. The other electrode of the bypass transistor 15 is coupled to an electrode of drive transistor 14, both of these electrodes being coupled through series resistance 18 to the ground terminal $E_2$. The noise-elimination resistance 16 is inserted between the drive terminals $D_1$, $D_2$.

The drive transistors 13, 14 turn on when the transmit input signal TS is at the high logic level, and turn off when TS is at the low logic level. (For the sake of brevity, TS logic levels will be referred to below as simply the high level and the low level.) The bypass transistor 15, conversely, turns off when TS is at the high level, and on when TS is at the low level.

When the transmit input signal TS is at the high level, the transistors 13, 14, 15 in the driver circuit 3 couple signal transmission line 1a to the power supply Vdd, and couple signal transmission line 1b to ground, thereby supplying positive charge to signal transmission line 1a and negative charge to signal transmission line 1b. When the transmit input signal TS is at the low level, signal transmission lines 1a and 1b are disconnected from the power supply Vdd and ground, so that no charge is supplied to the signal transmission line pair 1, but charge is shunted from the power supply Vdd to ground through the bypass transistor 15, bypassing the signal transmission line pair 1.

In other words, when the transmit input signal TS is high, a first current path is closed between the power supply Vdd and signal transmission line 1a (between terminals $E_1$ and $D_1$), and a second current path is closed between signal transmission line 1b and ground (between terminals $D_2$ and $E_2$), thereby supplying a complementary signal to the signal transmission line pair 1. When the transmit input signal TS is low, these current paths are opened, no complementary signal is supplied to the signal transmission line pair 1, and instead, a third current path is closed between the power supply Vdd and ground (between terminals $E_1$ and $E_2$), bypassing the signal transmission line pair 1.

The driver circuit 3 accordingly maintains a closed path conducting current between the power supply and ground at all times. Seen from the power supply and ground, the driver circuit 3 behaves as a dc circuit. Nevertheless, the driver circuit 3 switches the complementary signal supplied to the signal transmission line pair 1 on and off according to the transmit input signal TS. Further details will be given later.

A complementary signal propagating on a transmission line pair (with the parallel equal-length structure shown in FIG. 2A or 2B, or with another structure such as a coaxial structure or twisted-pair structure) creates a movement of positive charge in one direction on one transmission line and an equal movement of negative charge in the same direction on the other transmission line. In a driver circuit of the conventional current-switch type shown in FIG. 22, the polarity of the complementary signal is switched according to the transmit input signal TS. That is, either one transmission line carries the positive charge and is at the higher potential, or the other transmission line carries the positive charge and is at the higher potential, depending on whether the transmitted signal is a '1' or a '0'. In contrast, the driver circuit 3 of the first embodiment supplies a complementary signal with a fixed polarity, but switches the signal on and off, depending on the transmit input signal TS. The transmitted signal becomes a '1' or '0' according to whether the complementary signal is present or absent, not according to the polarity of the complementary signal.

The branch receiver unit, formed by a branching section 4 and receiver circuit 5 located at an intermediate point on the signal transmission line pair 1, detects whether or not a complementary signal is currently present at this immediate point. The branching section 4 diverts a certain amount of the energy of the complementary signal away from the signal transmission line pair 1 at this intermediate point, but the amount is so slight as not to disturb the complementary signal on the signal transmission line pair 1 significantly. The receiver circuit 5 receives the transmitted signal by detecting the slight amount of diverted energy, thereby determining whether the complementary signal is present or absent.

As an example, suppose that the voltage value of the power supply Vdd is 1.0 V, the resistance values of the series resistances 17, 18 are 100 Ω each, the resistance value of the termination resistance 2 is 15 Ω, the on-resistance of each drive transistor 13, 14 is 15 Ω, that the transmission lines 1a, 1b are free of skin effects, and that the dc resistance value of each transmission line 1a, 1b is zero (0 Ω).

When the driver circuit 3 supplies a complementary signal to the signal transmission line pair 1, the current $I_t$ on each transmission line 1a, 1b has the following value.

$I_t$=1.0 V/(100 Ω+100 Ω+15 Ω+15 Ω+15 Ω)=4.1 mA

The voltage differential $V_t$ between signal transmission lines 1a and 1b (the voltage drop across the termination resistance 2) has the following value.

$V_t$=4.1 mA×15 Ω=61 mV

If the skin effect in the transmission lines 1a, 1b is large enough to give the signal transmission line pair 1 a dc resistance value of, for example, 30 Ω, then $I_t$ and $V_t$ are calculated as follows.

$I_t$=1.0 V/(100 Ω+100 Ω+15 Ω+15 Ω+30 Ω)=3.6 mA $V_t$=3.6 mA×15 Ω=55 mV

When the driver circuit 3 switches the complementary signal off, after all of the energy (movement of charge) that was being supplied to the signal transmission line pair 1 just before the complementary signal was switched off has been dissipated in the termination resistance 2, the current flowing on the signal transmission lines 1a, 1b is zero, so the voltage differential between the signal transmission lines 1a, 1b is also zero.

The branch receiver unit (comprising a branching section 4 and a receiver circuit 5) must be able to detect the above complementary signal voltage $V_t$, without disturbing the propagation of the complementary signal on the signal transmission line pair 1. The branch receiver unit must accordingly divert a small amount of energy away from the signal transmission line pair 1 without significantly attenuating the complementary signal or distorting its waveform. The branch receiver unit, as seen from the signal transmission line pair 1, must therefore behave as a high-impedance circuit element with only a dc resistance component; the capacitive component of the impedance must be negligibly small.

One example of a high-impedance circuit element having an adequate dc resistance component and a negligible capacitive component is a pure resistance element with a resistance value of four hundred ohms (0.4 kΩ) and zero capacitance. Another example is a circuit element with an input resistance value of 1 kΩ and an input capacitance value of 0.05 nF or less. If the characteristic impedance of each signal transmission line 1a, 1b is 15 Ω, then if the signal transmission line pair 1 is branched into an impedance with a 0.4-kΩ input resistance value, the percent of the energy of the complementary signal that is diverted away from the signal transmission line pair 1 can be calculated as follows.

15 Ω/(0.4 kΩ+15 Ω)=3.6%

The above branching resistance could also be regarded as a pure resistance that diverts 3.6% or less of the energy of the complementary signal away from the signal transmission line pair 1.

When there are a plurality of branch receiver units, to avoid disturbing the propagation of the complementary signal, each individual branch receiver unit must satisfy the condition above, and the total energy diverted by all of the branch receiver units must not exceed a fixed limit, such as ten percent (10%) of the complementary signal energy supplied to the signal transmission line pair 1.

As explained in the background of the invention, the complementary signal supplied to the signal transmission line pair 1 is almost free of noise, because common-mode noise cancels out, so even though only a small part of the energy of the complementary signal is diverted into each branch receiver unit, this energy is sufficient for detection of the voltage differential $V_t$.

Figure 4:
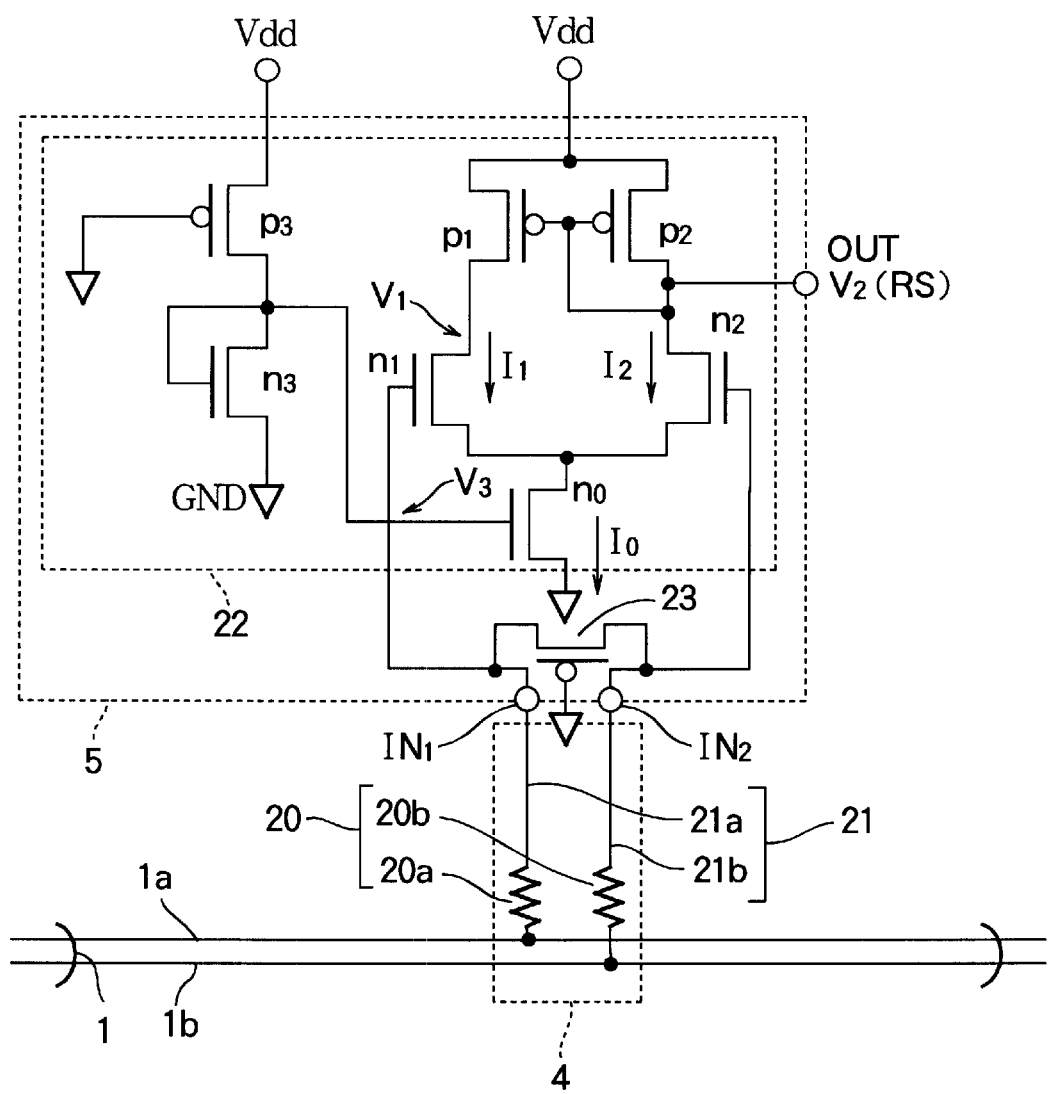
FIG. 4 is a circuit diagram of a branch receiver unit in FIG. 1.

FIG. 4 is a circuit diagram of a branch receiver unit. The branching section 4 in FIG. 4 comprises a branch resistance pair 20 and a branch transmission line pair 21. The branch transmission line pair 21 comprises two parallel equal-length branch transmission lines 21a and 21b. The branch resistance pair 20 comprises two branch resistances 20a and 20b. Branch resistance 20a is inserted between an intermediate point on signal transmission line 1a and one end of branch transmission line 21a. The other end of branch transmission line 21a is coupled to an input terminal $IN_1$ of the receiver circuit 5. Branch resistance 20b is inserted between an intermediate point on signal transmission line 1b and one end of branch transmission line 21b. The other end of branch transmission line 21b is coupled to another input terminal $IN_2$ of the receiver circuit 5.

The branch resistances 20a and 20b have respective resistance values of at least four hundred ohms (0.4 kΩ), in order to divert complementary signal energy without disturbing signal propagation on the signal transmission line pair 1. A resistance of 1 kΩ will be assumed below as an example. The branch transmission line pair 21 is a transmission line pair that transmits the diverted complementary signal energy to the receiver circuit 5.

The receiver circuit 5 comprises a differential amplifier 22, a termination transistor 23, the above mentioned input terminals $IN_1$ and $IN_2$, and an output terminal OUT. The complementary signal energy diverted by the branching section 4 is received at the input terminals $IN_1$, $IN_2$, which are the differential input terminals of the differential amplifier 22. The output terminal OUT, which is the output terminal of the differential amplifier 22, outputs a receive output signal with a voltage level that varies according to the presence or absence of a complementary signal voltage at the input terminals $IN_1$, $IN_2$.

By thus sensing the presence or absence of a complementary signal voltage at the input terminals $IN_1$, $IN_2$, the receiver circuit 5 senses whether a complementary signal is present or not at the intermediate point on the signal transmission line pair 1 to which the receiver circuit 5 is coupled through the branch resistances 20a, 20b, without disturbing the propagation of the complementary signal on the signal transmission line pair 1. The receiver circuit 5 thus determines whether the transmitted signal is in the '1' or '0' state, and generates a corresponding receive output signal RS. A particular feature of the receiver circuit 5 is the termination transistor 23 connected across the input terminals $IN_1$ and $IN_2$. The receiver circuit 5 will be described in more detail later.

Referring again to FIG. 1, the bypass capacitor 7 is disposed close outside the driver chip 9, coupled between the power-supply line 6a and ground line 6b. Because the driver circuit 3 behaves as a dc circuit as seen from the power supply and ground, the bypass capacitor 7 does not have to be embedded in the driver chip 9. In fact, the bypass capacitor 7 is almost unnecessary as far as the signal transmission bus system itself is concerned. The main function of the bypass capacitor 7 in FIG. 1 is to keep the power-ground line pair 6 from being affected by electromagnetic radiation generated by other circuits.

Figure 5:
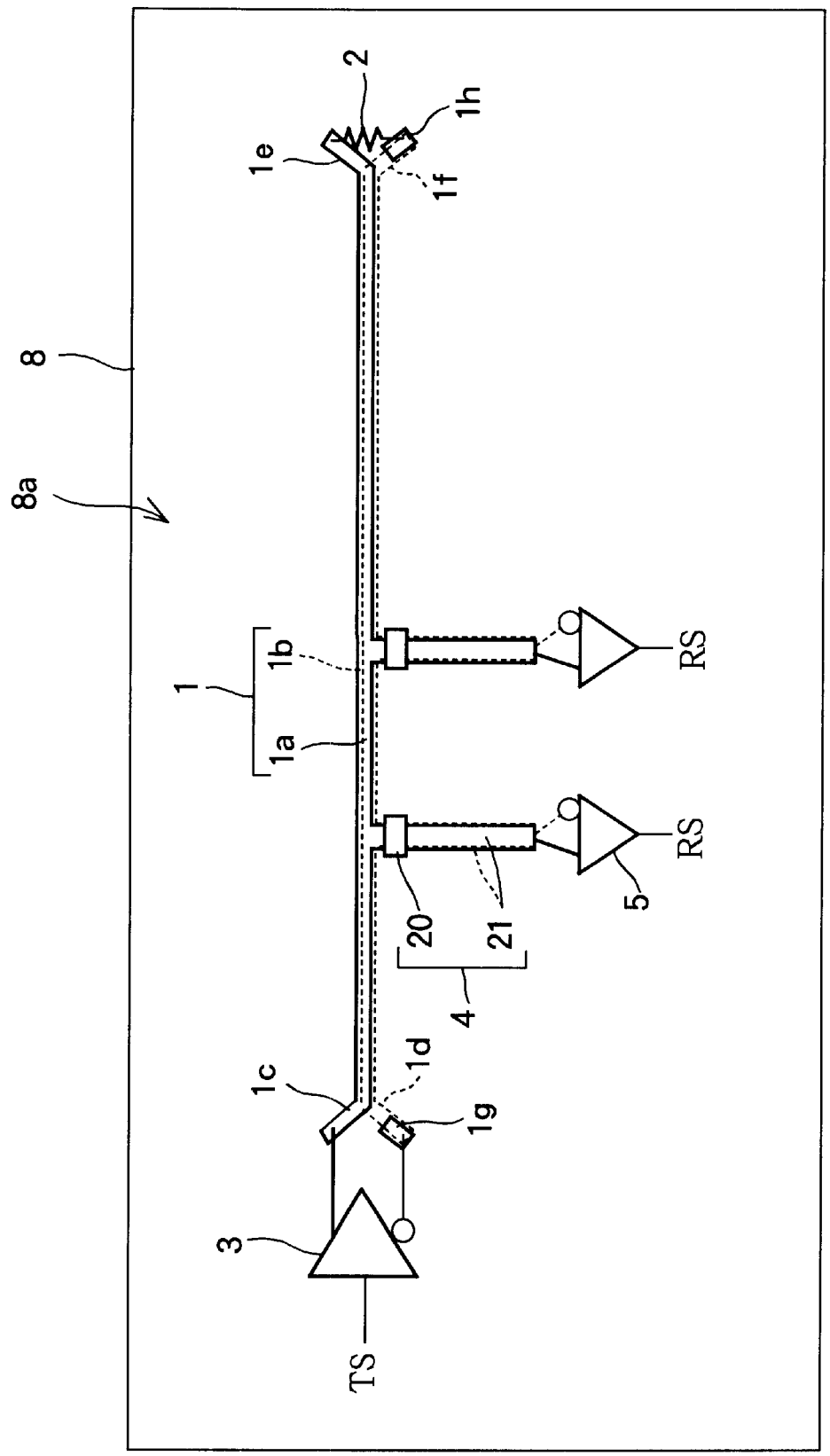
FIG. 5 is a simplified circuit diagram of the signal transmission bus system in FIG. 1.

FIG. 5 shows a simplified circuit diagram of the signal transmission bus system in FIG. 1. In the signal transmission line pair 1 in FIG. 5, signal transmission line 1a is disposed above the dielectric layer 8a. Signal transmission line 1b is disposed below the dielectric layer 8a, facing signal transmission line 1a. At the end of the signal transmission line pair 1 near the driver circuit 3, the two signal transmission lines 1a, 1b diverge away from one another to terminate near the driver circuit 3 in, respectively, a pad electrode 1c and a contact electrode 1d. Similarly, near the termination resistance 2, the two signal transmission lines 1a, 1b diverge to terminate in a pad electrode 1e and a contact electrode 1f. These electrodes 1c, 1d, 1e, 1f are unitary with the signal transmission lines 1a, 1b. The dielectric layer 8a has a via hole through which a pad electrode 1g disposed above the dielectric layer 8a makes contact with contact electrode 1d, and another via hole through which a pad electrode 1h disposed above the dielectric layer 8a makes contact with contact electrode 1f. The driver chip 9 (shown in FIG. 1) that includes the driver circuit 3 is coupled to pad electrodes 1c and 1g by flip-chip bonding or wire bonding. Similarly, the termination resistance 2 is coupled to pad electrodes 1e and 1h by flip-chip bonding or wire bonding, the termination resistance 2 being a chip resistor.

Figure 6:
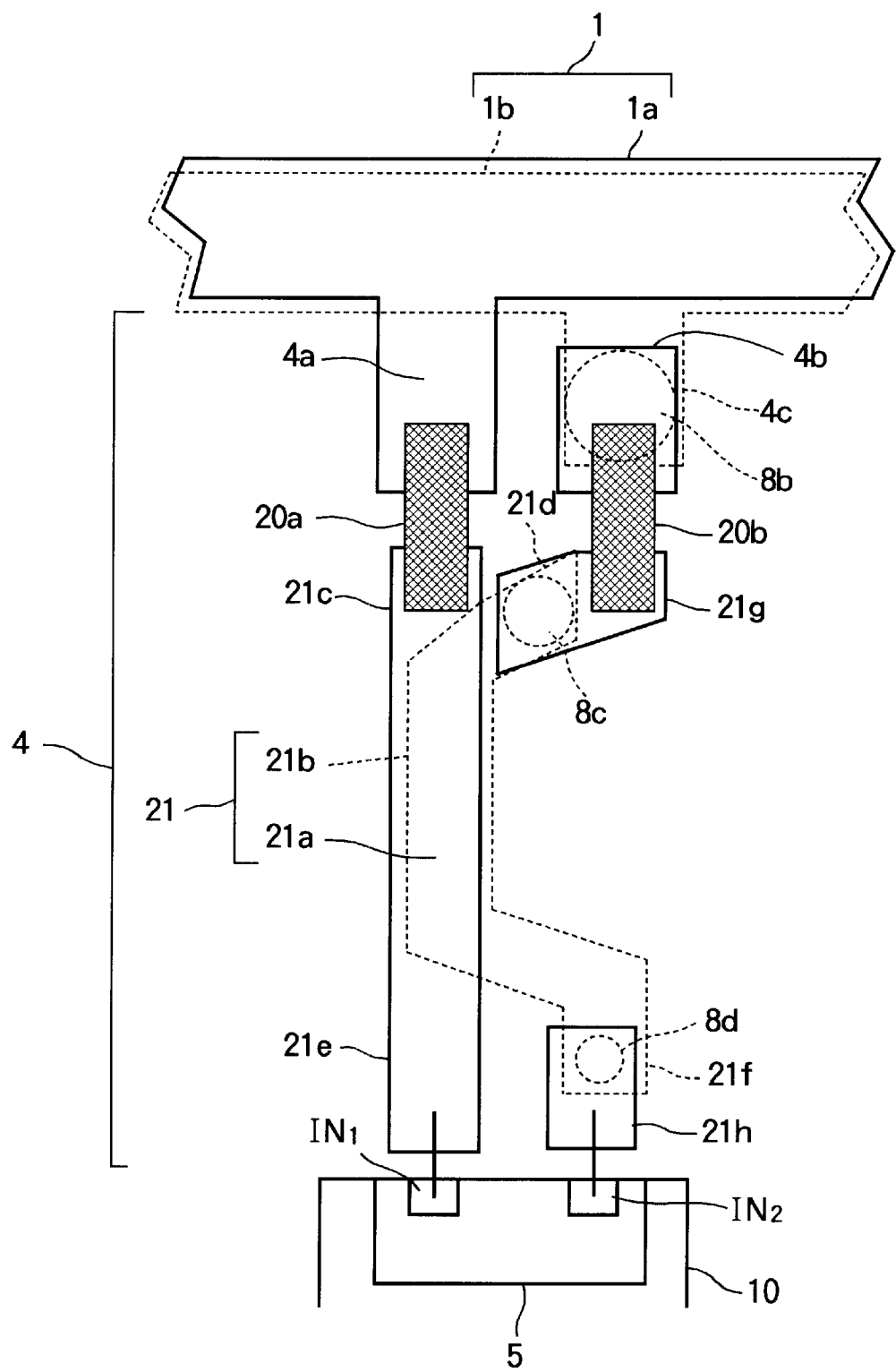
FIG. 6 is a plan view of a branching section in FIG. 1.

The branching sections 4, each comprising a branch resistance pair 20 and a branch transmission line pair 21, are respectively coupled to the signal transmission line pair 1 by two pad electrodes 4a, 4b and a contact electrode 4c as shown in FIG. 6. Pad electrode 4a is unitary with signal transmission line 1a; contact electrode 4c is unitary with signal transmission line 1b, and makes contact with pad electrode 4b through a via hole 8b in the dielectric layer. At the approaches to these pad electrodes 4a, 4b, the branch transmission lines 21a, 21b diverge and end, respectively, in a pad electrode 21c and contact electrode 21d that do not face each other. The branch transmission lines 21a, 21b also diverge into a pad electrode 21e and a contact electrode 21f at their opposite ends, near the input terminals $IN_1$, $IN_2$ of the receiver circuit 5. Pad electrodes 21g, 21h make contact with respective contact electrodes 21d, 21f through respective via holes 8c, 8d. The branch resistances 20a, 20b are coupled to pad electrodes 4a, 4b, 21c, 21g by flip-chip bonding (as shown in FIG. 6) or by wire bonding. The receiver chip 10 including the receiver circuit 5 is similarly coupled to pad electrodes 21e, 21h by flip-chip bonding or (as shown in FIG. 6) by wire bonding.

Next the driver circuit 3 and receiver circuit 5 will be described in more detail.

Referring again to FIG. 1, the noise-elimination resistance 16 is provided to absorb reflection noise. Because of the high input impedance of the branch receiver units, as seen from the branch points on the signal transmission line pair 1, some reflection occurs at the branch points, causing a small part of the energy of the complementary signal to be reflected back to the driver circuit 3. The noise-elimination resistance 16 absorbs this reflected energy, so that it is not reflected back again from the driver circuit 3 onto the signal transmission line pair 1. Possible attenuation of the complementary signal due to multiple reflections is thereby reduced. The resistance value of the noise-elimination resistance 16 should be approximately ten times the characteristic impedance of the signal transmission line pair 1. If the characteristic impedance of the signal transmission line pair 1 is 15 Ω, for example, then a suitable value for the noise-elimination resistance 16 is 150 Ω. It is also possible to omit the noise-elimination resistance 16.

The series resistances 17, 18 reduce the current consumption and hence the power dissipation of the driver circuit 3. By the selection of suitable resistance values, the current consumed by the driver circuit 3 can be reduced to a desired level, preferably to the minimum value within the range that permits detection of the complementary signal by the receiver circuit 5. One or both of the series resistances 17, 18 may be omitted.

The essential parts of the driver circuit 3 are the drive transistors 13, 14 that selectively supply the complementary signal to the signal transmission line pair 1, and the bypass transistor 15 that selectively closes a current path bypassing the signal transmission line pair 1. The reason why the bypass transistor 15 is necessary is as follows.

The power supply Vdd and ground are coupled to a large number of circuits, forming a power supply network on the circuit substrate 8. Furthermore, the power-ground line pair 6 is a type of transmission line. If the bypass transistor 15 were not present, then when the transmit input signal TS changed from the high level to the low level, switching off the drive transistors 13, 14, the power and ground terminals $E_1$, $E_2$ of the driver circuit 3 would suddenly become a high-impedance input port, and all of the energy being supplied to these terminals would be reflected back down the power-ground line pair 6 toward the power supply Vdd and ground. This reflected energy would be further reflected at other nodes in the power supply network, and the multiple reflections would perturb the power-supply and ground potentials.

Since the bypass transistor 15 switches on when the drive transistors 13, 14 switch off, forming a bypass current path between the power and ground terminals $E_1$, $E_2$, these terminals are never placed in the high-impedance state. Total reflection of energy back onto the power-ground line pair 6 is thereby avoided.

The common-mode noise problem noted in the background of the invention is also mitigated by the bypass transistor 15. As explained earlier, common-mode noise occurs when the normal signal transmission path is replaced by a low-impedance path that conducts current directly from the power terminal to the ground terminal for a brief instant halfway through the transistor switching interval. If the switching characteristics of the bypass transistor 15 complement those of the drive transistors 13, 14, however, then switchovers between the current path passing through the drive transistors 13, 14 and signal transmission line pair 1 and the parallel path passing through the bypass transistor 15 can be made without any abrupt changes in the impedance between the power and ground terminals $E_1$, $E_2$. Moreover, since the bypass transistor 15 is not a driving transistor, it can be designed to have the desired switching characteristics. Power and ground perturbations due to common-mode noise can thus be avoided.

The design of the optimum on-resistance of the bypass transistor 15 will be described below. The on-resistance of the bypass transistor 15 is preferably equal to the sum of the on-resistance of drive transistor 13, the resistance value of the termination resistance 2, and the on-resistance of drive transistor 14. If the on-resistance of drive transistors 13, 14 is 15 Ω, for example, and the resistance value of the termination resistance 2 is also 15 Ω, then the bypass transistor 15 should have the following on-resistance value.

15+15+15=45 Ω

If the bypass transistor 15 has this on-resistance, then the impedance of the driver circuit 3, as seen from the power supply and ground, will be the same regardless of whether the power and ground terminals ($E_1$ and $E_2$) are terminated through the termination resistance 2 at the end of the signal transmission line pair 1, or internally inside the driver circuit 3. Furthermore, if the dynamic switching characteristics of the bypass transistor 15 complement those of the drive transistors 13, 14, direct current will continue to flow through the driver circuit 3 without any abrupt changes during switching periods.

Referring again to FIG. 4, the differential amplifier 22 in the receiver circuit 5 has pMOS transistors $p_1$, $p_2$, $p_3$ and nMOS transistors $n_0$, $n_1$, $n_2$, $n_3$. In FIG. 4, $I_0$ is a constant current conducted by transistor $n_0$, $I_1$ is a current conducted by transistors $p_1$ and $n_1$, and $I_2$ is a current conducted by transistors $p_2$ and $n_2$. Currents $I_1$ and $I_2$ vary in response to the transmitted signal voltages received at terminals $IN_1$ and $IN_2$.

The complementary signal represents one of the two transmitted signal values, either '1' or '0,' the other value being represented by absence of the complementary signal. By sensing whether the complementary signal is present or not, the differential amplifier 22 senses whether the transmitted signal is a '1' or a '0.' By amplifying the received signal voltage, the differential amplifier 22 outputs a receive output signal voltage $V_2$ responsive to the transmitted signal at output terminal OUT. To be able to sense the presence and absence of the complementary signal, the differential amplifier 22 needs to be sensitive enough to detect the slight energy of the complementary signal diverted from the signal transmission line pair 1.

The differential amplifier 22 has a conventional internal structure that will be described below, with particular attention to features relevant to the sensing of the slight energy of the complementary signal diverted from the signal transmission line pair 1.

In the differential amplifier 22, transistors $p_1$, $p_2$, $n_0$, $n_1$, $n_2$ constitute the differential amplifying section. Transistors $p_1$ and $n_1$ are coupled in series, as are transistors $p_2$ and $n_2$. The source electrodes of transistors $p_1$ and $p_2$ are coupled to the power supply Vdd through a power-supply line or pattern; the source electrodes of transistors $n_1$ and $n_2$ are coupled to the drain electrode of transistor $n_0$. The source electrode of transistor $n_0$ is coupled through the ground line or pattern to ground (GND). The gate electrodes of transistors $p_1$ and $p_2$ are coupled to the drain electrode of transistor $p_2$ (and the drain electrode of transistor $n_2$). The gate electrodes of transistors $n_1$ and $n_2$ are coupled to respective input terminals $IN_1$ and $IN_2$; the drain electrodes of transistors $p_2$ and $n_2$ are coupled to the output terminal OUT.

Transistors $p_3$ and $n_3$, which constitute a current-setting section of the differential amplifier 22, are coupled in series. The source electrode of transistor $p_3$ is coupled through a power-supply line or pattern to the power supply Vdd. The source electrode of transistor $n_3$ and the gate electrode of transistor $p_3$ are coupled through a ground line or pattern to ground (GND). The drain electrode of transistor $p_3$ and the gate and drain electrodes of transistor $n_3$ are coupled to the gate electrode of transistor $n_0$ in the differential amplifying section.

The current-setting section sets the gate voltage of transistor $n_0$ near the threshold voltage of transistor $n_0$, thereby controlling the constant current $I_0$ in the differential amplifying section. If the transconductance $g_{m3}$ of transistor $p_3$ in the current-setting section is smaller than the transconductance of transistor $n_3$, the gate voltage $V_3$ of transistor $n_3$ will be near the threshold voltage of transistor $n_3$. This gate voltage $V_3$ is also the gate voltage of transistor $n_0$, so if the threshold voltage of transistor no matches the threshold voltage of transistor $n_3$, the gate voltage of transistor $n_0$ will be stabilized near the threshold voltage of transistor $n_0$. It is then possible to set the value of the constant current $I_0$ in the differential amplifying section by designing transistor $p_3$ to have a desired transconductance $g_{m3}$. The transconductance value $g_{m3}$ should be as small as practical, to minimize the constant current $I_0$ and thereby reduce current consumption.

The differential amplifying section amplifies the input voltage differential and outputs a receive signal voltage $V_2$ corresponding to the transmitted signal at the output terminal OUT. In the differential amplifying section, it is necessary for transistors $p_1$ and $p_2$, and for transistors $n_1$ and $n_2$, to have substantially identical characteristics; in particular, transistors $p_1$ and $p_2$ should have the same transconductance, and transistors $n_1$ and $n_2$ should have the same transconductance. Currents $I_1$ and $I_2$ will then vary according to the input voltage differential, while maintaining the relation $I_1+I_2=I_0$.

Input terminals $IN_1$ and $IN_2$ are coupled through the branching section 4 to an intermediate point on the signal transmission line pair 1. When a complementary signal is present at this intermediate point, signal transmission line 1a is at a higher potential than signal transmission line 1b, so the potential of input terminal $IN_1$ (the gate voltage of transistor $n_1$) becomes higher than the potential of input terminal $IN_2$ (the gate voltage of transistor $n_2$), and the receive output signal voltage $V_2$ at the output terminal OUT (the drain voltage of transistor $n_2$) becomes higher than the drain voltage $V_1$ of transistor $n_1$ ($V_2-V_1>0$). This relation holds even if a bias voltage is present on the signal transmission line pair 1 due to common-mode noise, because the potential of signal transmission line 1a remains higher than the potential of signal transmission line 1b. When no complementary signal is present at this intermediate point, after all of the charge stored in the input capacitances of the input terminals $IN_1$ and $IN_2$ has been discharged, drain voltages $V_1$ and $V_2$ are equal ($V_2-V_1=0$). Since the signal transmission bus system of the first embodiment expresses the transmitted signal values '1' and '0' by whether or not a complementary signal is present (instead of by reversing the polarity of the complementary signal as in the conventional signal transmission bus system in FIG. 22), it maintains the relationship $V_2-V_1 \geq 0$.

If $R_{n1}$ is the resistance value of transistor $n_1$, $R_{n2}$ is the resistance value of transistor $n_2$, and $g_{m12}$ is the combined transconductance of transistors $n_1$ and $n_2$, then:

$$g_{m12}=1/(R_{n1}+R_{n2})$$

If the resistance values of transistors $p_1$ and $p_2$ are both $R_p$, then the voltage gain $G_v$ of the differential amplifier 22 has the following value:

$$G_v=g_{m12} \times R_p=R_p/(R_{n1}+R_{n2})$$

Since the resistance value $R_p$ of transistors $p_1$ and $p_2$ increases as $V_2-V_1$ increases (as $V_2$ becomes higher), the voltage gain $G_v$ also increases as $V_2-V_1$ increases. When a complementary signal is present, $V_2-V_1$ increases, so the voltage gain $G_v$ becomes greater than when the complementary signal is not present. The increase in the voltage gain $G_v$ when the complementary signal is present improves the sensitivity of the differential amplifier 22, a desirable feature for sensing the slight complementary signal energy that is diverted to the receiver circuit 5.

The dynamic range $V_2-V_1$ of the differential amplifier 22 is:

$$V_2-V_1=(I_0/1000)^{1/2}$$

This value increases with the constant current $I_0$, but increasing the constant current $I_0$ increases the power consumption, so the constant current $I_0$ should not be made very large. The desired value of the constant current $I_0$ is the minimum value in the range permitting the complementary signal voltage to be sensed; this value is set by optimizing the transconductance of transistor $p_3$, as noted above.

The receive output signal voltage $V_2$ is shifted somewhat toward the high side, so an appropriate level shifter may be inserted, and further circuitry may be added to convert the receive output signal to CMOS logic levels. The gate electrodes of transistors $p_1$ and $p_2$ may also be coupled to ground (GND), if adequate gain is obtained.

As stated earlier, to sense the complementary signal without disturbing its propagation on the signal transmission line pair 1, the branch receiver unit, as seen from the signal transmission line pair 1, must behave as a high-impedance circuit element with only a dc resistance component; the capacitive component of the impedance must be negligible. The high resistance reduces reflection and attenuation of the complementary signal. The negligible capacitance prevents distortion of the waveform of the complementary signal. Waveform distortion, reflection, and attenuation become particularly troublesome when more than one branch receiver unit is coupled to the signal transmission line pair 1. That is why, when there are two or more branch receiver units, the total complementary signal energy diverted by all of the branch receiver units must be kept be within a fixed limit, such as 10% of the complementary signal energy supplied to the signal transmission line pair 1.

The input capacitance of a differential-amplifier receiver circuit with MOS transistors, such as the receiver circuit 5, is the gate capacitance of the MOS transistors and the stray capacitance in their vicinity. It is difficult to design a receiver circuit in which this input capacitance is negligibly small (0.05 pF or less, for example), but the input capacitance can still be regarded as zero if branch resistances 20a and 20b with pure resistance values of 0.4 kΩ or more are provided at the point of branching from the signal transmission line pair 1.

If the characteristic impedance of the signal transmission lines 1a, 1b is 15 Ω, for example, and the resistance value of the branch resistances 20a, 20b is 1 kΩ, then 1.5% of the energy of the complementary signal on the signal transmission line pair 1 is diverted into each branch receiver unit.

$$15 \text{ }\Omega/(1 \text{ k}\Omega+15 \text{ }\Omega)=1.5\%$$

The energy of the complementary signal on the signal transmission line pair 1 is thereby reduced to 98.5%. If the total diverted energy is to be kept within 10%, the number of branch receiver units must not exceed six.

If the resistance value of the branch resistances 20a, 20b is 5 kΩ, then only 0.3% of the energy of the complementary signal on the signal transmission line pair 1 is diverted to each branch receiver unit.

$$15 \text{ }\Omega/(5 \text{ k}\Omega+15 \text{ }\Omega)=0.3\%$$

In this case, to keep the total diverted energy within 10%, the number of branch receiver units must not exceed thirty-three.

The termination transistor 23 in the receiver circuit 5 is a pMOS field-effect transistor that provides termination between the input terminals $IN_1$, $IN_2$ (thus between the input terminals of the differential amplifier). The source and drain electrodes of the termination transistor 23 are coupled to the input terminals $IN_1$, $IN_2$. The gate electrode of the termination transistor 23 is coupled to the ground pattern or a ground line and is thus held at the ground potential (GND).

The termination transistor 23 may alternatively be an nMOS field-effect transistor coupled between the input terminals $IN_1$ and $IN_2$, with its gate electrode coupled to a power-supply pattern or line and thereby held at the Vdd potential.

The termination transistor 23 is necessary for the following reason. When the driver circuit 3 supplies a complementary signal to the signal transmission line pair 1, the input capacitance of input terminal $IN_1$ (the gate capacitance of transistor $n_1$ and the adjacent stray capacitance) becomes charged by positive charge supplied from signal transmission line 1a, and the input capacitance of input terminal $IN_2$ (the gate capacitance of transistor $n_2$ and the adjacent stray capacitance) becomes charged by negative charge supplied from signal transmission line 1b.

When the driver circuit 3 switches the complementary signal off in response to the transmit input signal TS, the charge stored in the input capacitance of the receiver circuit 5 must be removed before the receiver 5 can sense that the complementary signal is absent. The input capacitance must be discharged in substantially the time taken for the transmit input signal TS to fall from high to low. Since the branch resistances 20a, 20b have high resistance values (1 kΩ, for example), a conventional receiver circuit would be unable to discharge its input capacitance quickly enough. The charge stored in the input capacitance of the receiver circuit 5, however, can be discharged quickly through the termination transistor 23.

In order to discharge the input capacitance in a time equivalent to the fall time of a digital signal with a speed of several gigahertz, the termination transistor 23 should satisfy two conditions: its cut-off frequency should be at least sixty gigahertz (60 GHz); and the time constant of the resistance of the termination transistor 23 and the input capacitance of the receiver circuit 5 should not exceed one hundred picoseconds (100 ps). If the input capacitance is five picofarads (5 pF), for example, the resistance value of the termination transistor 23 should be at most 20 Ω. If the input capacitance is 2 pF, the resistance value of the termination transistor 23 should be at most 50 Ω.

It is also desirable for the resistance value of the termination transistor 23 to match the characteristic impedance of the branch transmission line pair 21. This is difficult to achieve, because the resistance value of the termination transistor 23 varies, but if the branch transmission line pair 21 is sufficiently short, the resistance value of the branch transmission line pair 21 does not have to match the characteristic impedance of the branch transmission line pair 21 very closely.

The operation of the first embodiment will be described below. In the following description, the pulse frequency of the transmit input signal TS, that is, the data rate of the transmitted signal, is several gigahertz. The power-supply voltage Vdd is 1.0 V, the resistance value of the series resistances 17, 18 is 100 Ω each, the characteristic impedance of the signal transmission lines 1a, 1b is 15 Ω, the resistance value of the termination resistance 2 is likewise 15 Ω, the on-resistance of the drive transistors 13, 14 is also 15 Ω, and the on-resistance of the bypass transistor 15 is 45 Ω. These are one example of a suitable set of conditions for transmitting a digital signal with a data rate of several gigahertz over the signal transmission bus system in the first embodiment.

When the transmit input signal TS changes from the low level to the high level, the driver circuit 3 turns on the drive transistors 13, 14 and turns off the bypass transistor 15. The turn-off of the bypass transistor 15 opens the current path that bypasses the signal transmission line pair 1, but the turn-on of the drive transistors 13, 14 forms a current path through the signal transmission line pair 1 (through drive transistor 13, signal transmission line 1a, termination resistance 2, signal transmission line 1b, and drive transistor 14). This path conducts current from the power-supply line 6a into the signal transmission line pair 1, and from the signal transmission line pair 1 into the ground line 6b. Positive charge thus enters the signal transmission line 1a from the power-supply line 6a, and negative charge enters the signal transmission line 1b from the ground line 6b.

During the on-off transition interval of the drive transistors 13, 14 and bypass transistor 15 (the transition from the state in which no complementary signal is being supplied to the signal transmission line pair 1 to the state in which a complementary signal is being supplied, referred to below as the first transition), as the combined series resistance offered by the drive transistors 13, 14, signal transmission line pair 1, and termination resistance 2 decreases, the resistance value of the bypass transistor 15 increases. The combined parallel resistance of the two current paths, the one through the signal transmission line pair 1 and the other through the bypass transistor 15, does not vary greatly. As seen from the power supply and ground (from terminals $E_1$ and $E_2$), accordingly, the impedance of the driver circuit 3 changes very little; the driver circuit 3 behaves as a dc circuit. Positive charge continues to flow from the power-supply line 6a into the driver circuit 3, and negative charge continues to flow from the ground line 6b into the driver circuit 3, at the same rate, throughout the first transition period.

The complementary signal supplied from the driver circuit 3 to the signal transmission line pair 1 propagates toward the termination resistance 2. A small part of the signal energy is diverted to the branch receiver units at the branching sections 4, but most of the signal energy reaches the termination resistance 2. When the signal reaches the termination resistance 2, it causes positive charge to flow into the termination resistance 2 from the signal transmission line 1a, and negative charge to flow into the termination resistance 2 from the signal transmission line 1b, at nearly the same rate is it caused positive charge to enter the signal transmission line 1a from the power-supply line 6a, and negative charge to enter the signal transmission line 1b from the ground line 6b. In other words, the signal energy is nearly undiminished.

Since the resistance of the termination resistance 2 matches the characteristic impedance of the signal transmission line 1a and signal transmission line 1b, none of the signal energy that reaches the termination resistance 2 is reflected. All of the signal energy enters the termination resistance 2 and is dissipated as heat.

The part of the signal that is diverted through the branch resistance pair 20 in each branch receiver unit propagates through the branch transmission line pair 21 and enters the receiver circuit 5. This part of the signal causes a movement of positive charge into input terminal $IN_1$, charging the input capacitance of input terminal $IN_1$, and a movement of negative charge into input terminal $IN_2$, charging the input capacitance of input terminal $IN_2$. The differential amplifier 22 in the receiver circuit 5 amplifies the differential signal voltage across the input terminals $IN_1$, $IN_2$ and outputs the amplified signal as a receive output signal RS at the output terminal OUT, thereby sensing the complementary transmitted signal. Current also begins to flow between the input terminals $IN_1$, $IN_2$ through the termination transistor 23, responsive to the complementary signal voltage.

When the transmit input signal TS next changes from the high level to the low level, the driver circuit 3 turns off the drive transistors 13, 14 and turns on the bypass transistor 15. The current path through the signal transmission line pair 1 is now opened, and supply of the complementary signal ceases. At the same time, a current path bypassing the signal transmission line pair 1 is formed through the bypass transistor 15, allowing current to continue flowing from the power-supply line 6a into the driver circuit 3 and from the driver circuit 3 into the ground line 6b.

During the transition interval while the drive transistors 13, 14 are turning off and the bypass transistor 15 is turning on (referred to below as the second transition interval), the combined series resistance offered by the drive transistors 13, 14, signal transmission line pair 1, and termination resistance 2 increases, and the resistance offered by the bypass transistor 15 decreases. During the second transition interval, as during the first transition interval, the combined parallel resistance of the two current paths does not vary greatly, and the driver circuit 3 continues to behave as a dc circuit as seen from the power supply and ground (from terminals $E_1$ and $E_2$). Positive charge continues to flow from the power-supply line 6a into the driver circuit 3, and negative charge from the ground line 6b into the driver circuit 3, at substantially the same rate.

As noted above, the on-resistance of the bypass transistor 15 is equal to the sum of the on-resistances of the drive transistors 13, 14 and the bypass transistor 15. Consequently, the driver circuit 3 has the same impedance during intervals while the complementary signal is being supplied to the signal transmission line pair 1 as during intervals while the complementary signal is not being supplied.

Moreover, during the first and second transition intervals, the impedance of the driver circuit 3 does not vary greatly, so the driver circuit 3 operates substantially as a dc circuit at all times, and does not generate common-mode noise on the power-ground line pair 6. Accordingly, the power-supply and ground potentials are not disturbed.

Figure 7A:
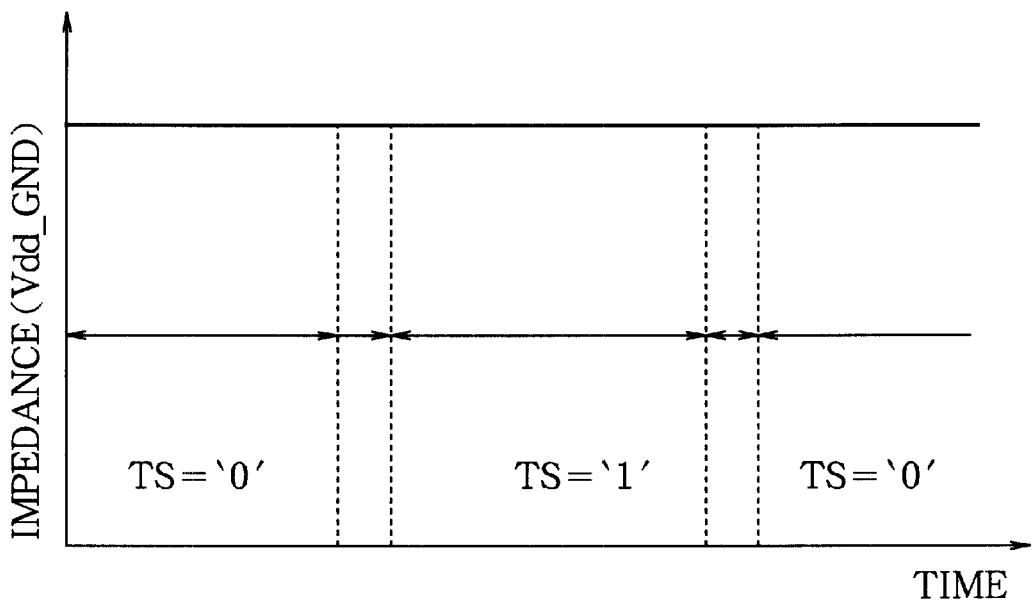
FIG. 7A illustrates impedance variations of the driver circuit in FIG. 1.
Figure 7B:
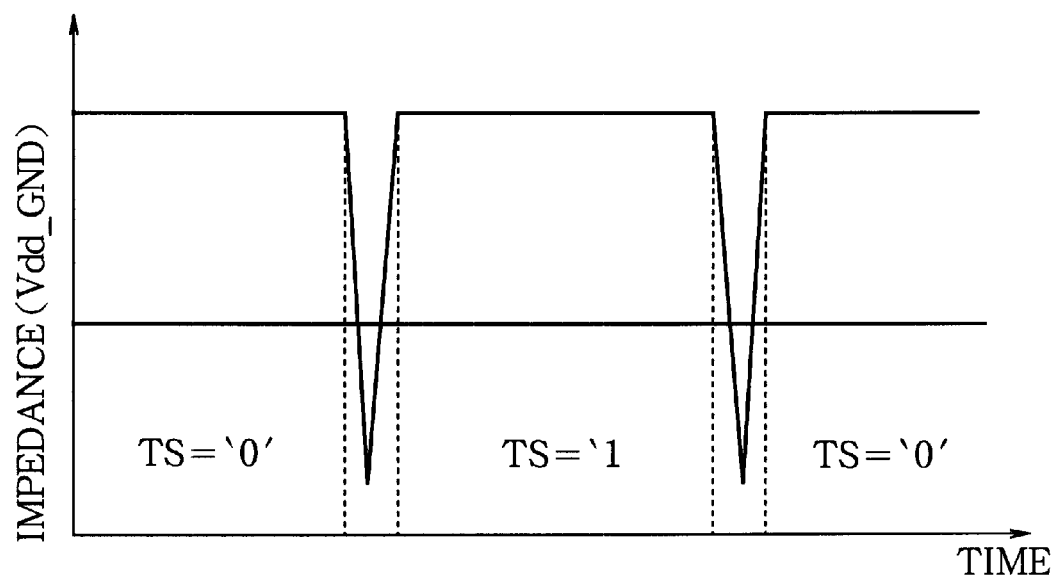
FIG. 7B illustrates impedance variations of the conventional driver circuit shown in FIG. 22.
Figure 22:
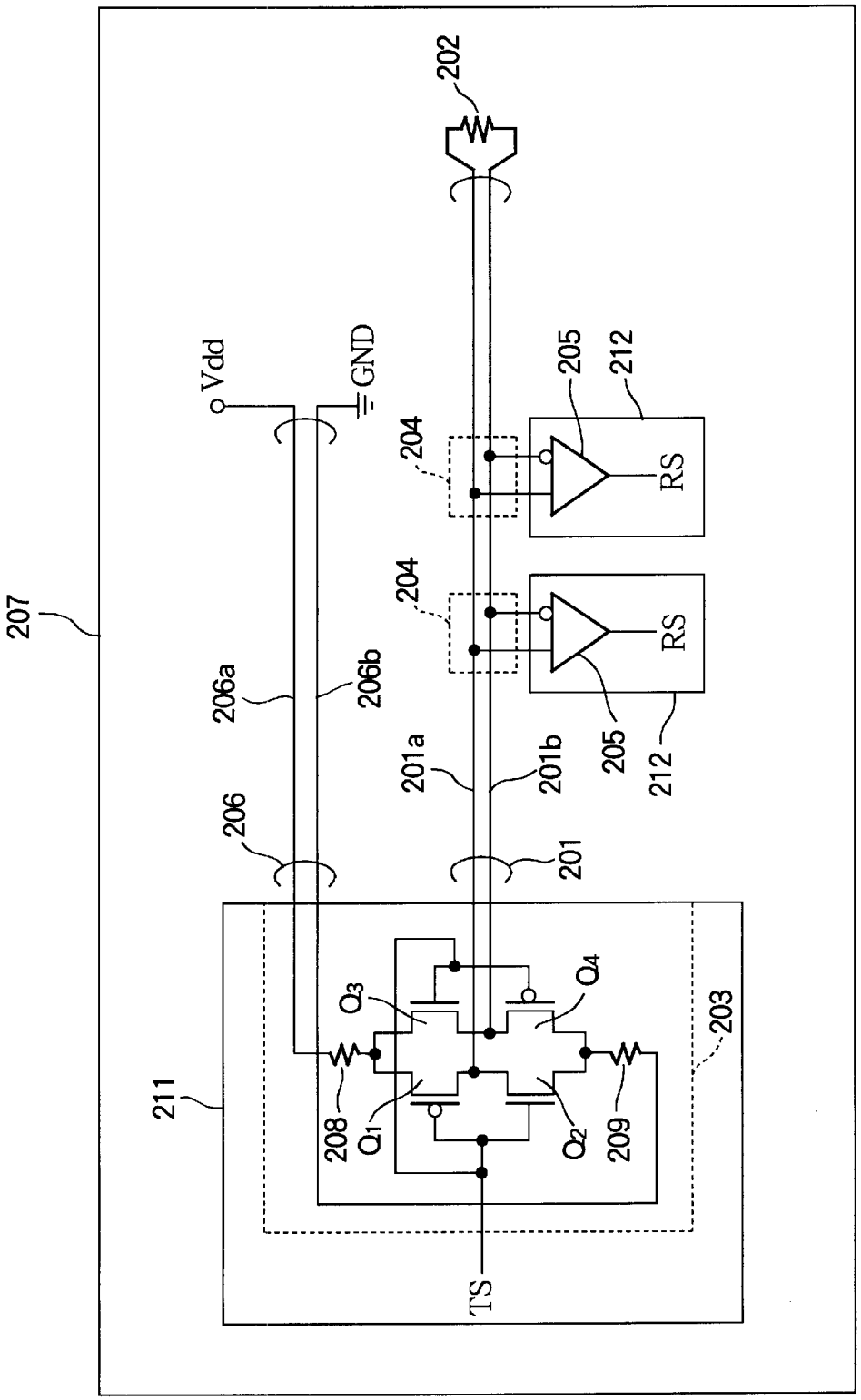
FIG. 22 is a circuit diagram of a signal transmission bus system employing a conventional driver circuit of the current-switch type.
Figure 23:
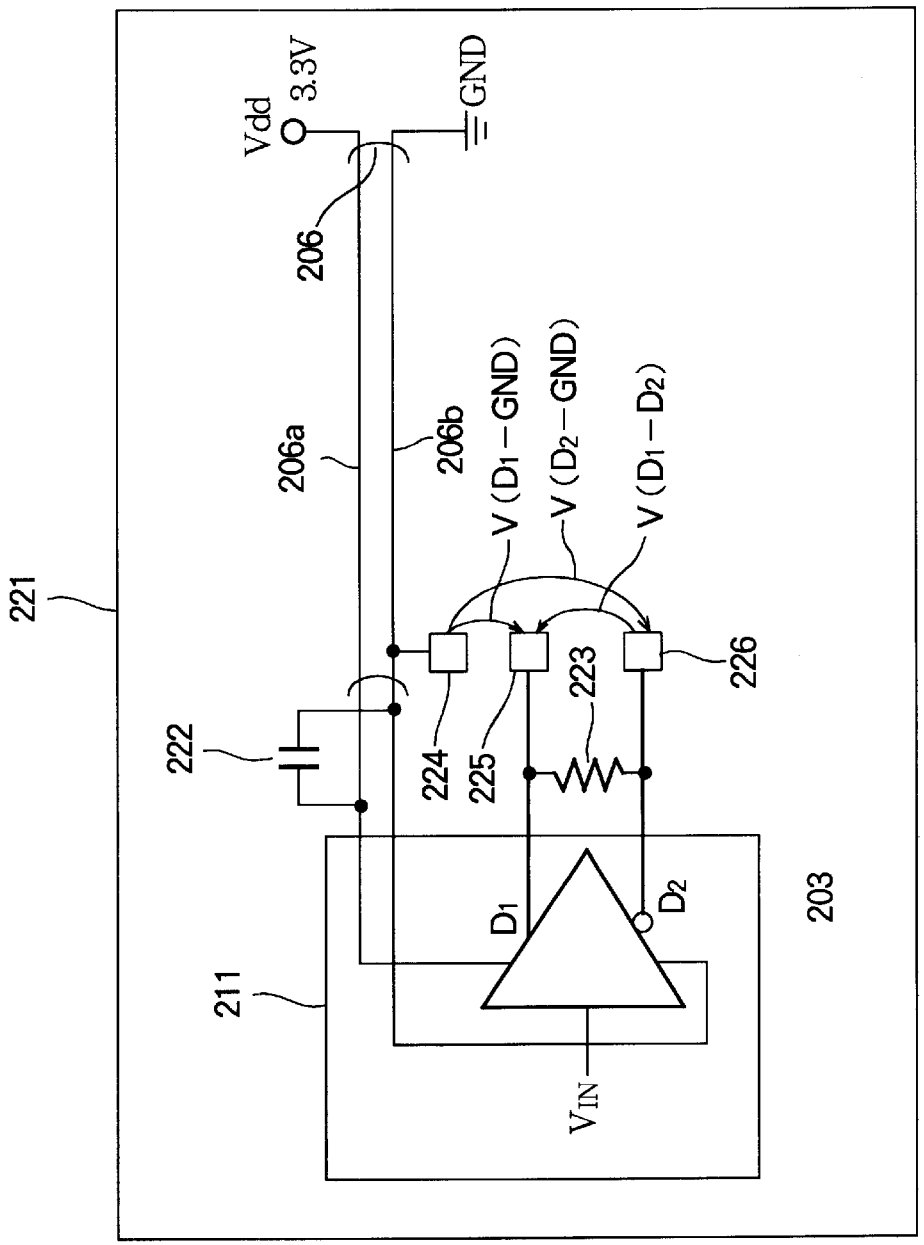
FIG. 23 is a circuit diagram of an evaluation circuit for measuring common-mode noise generated by the driver circuit in FIG. 22.
Figure 24A:
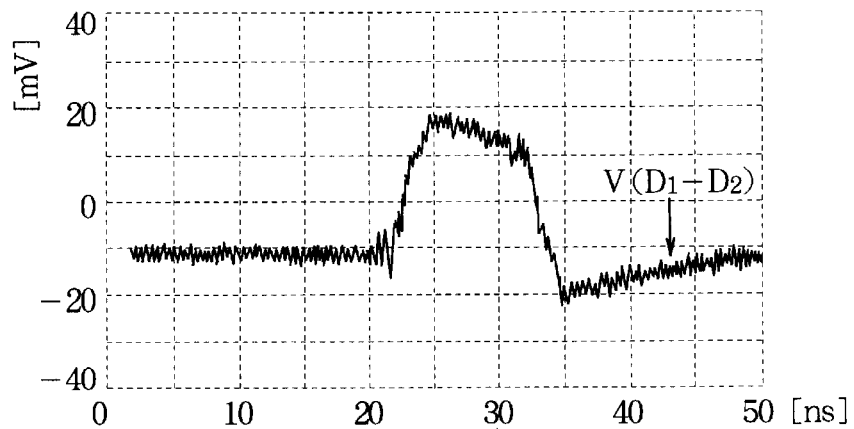
FIGS. 24A, 24B, and 24C show voltage waveforms measured with the evaluation circuit in FIG. 23.
Figure 24B:
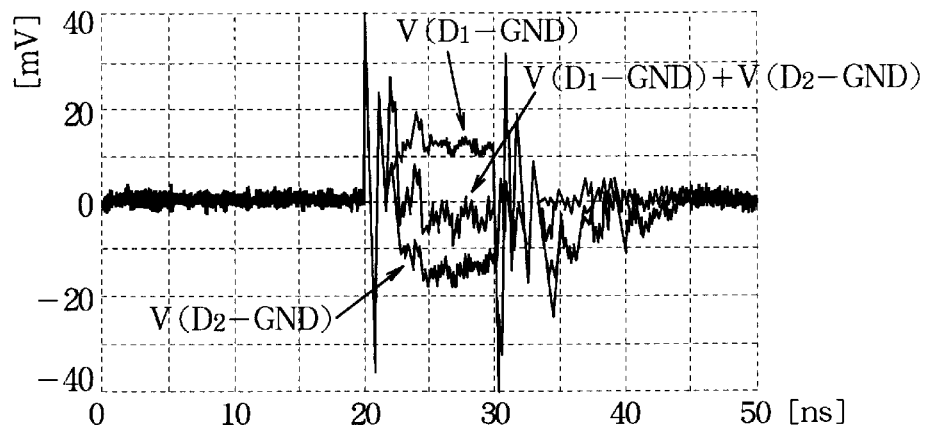
Figure 24C:
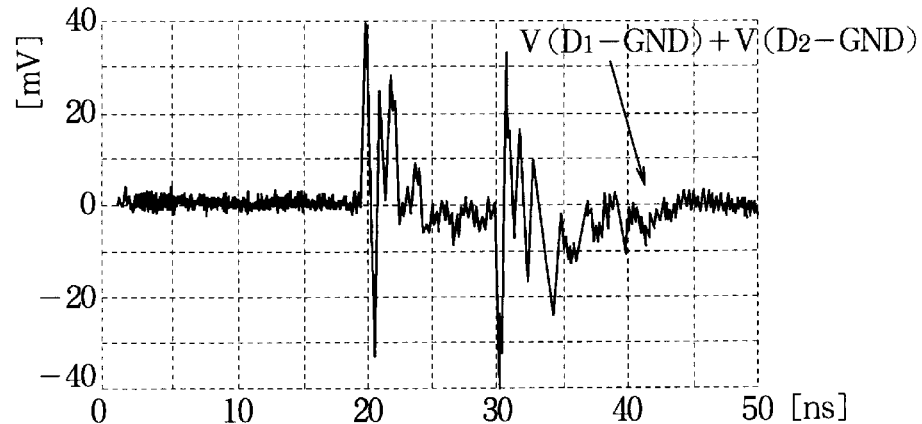
Figure 25A:
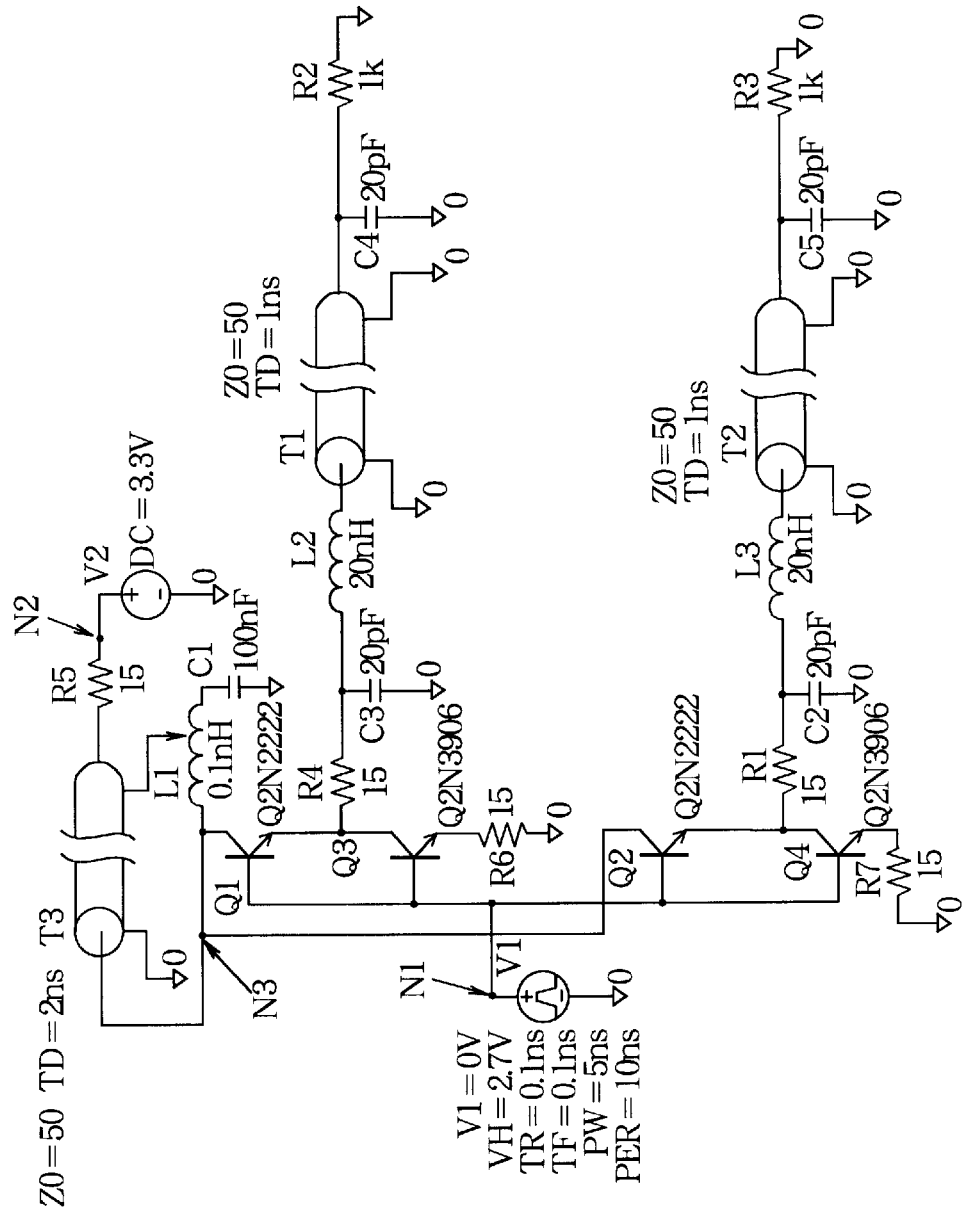
FIGS. 25A, 25B, 25C, and 25D are circuit diagrams of equivalent circuits used to simulate common-mode noise.
Figure 25B:
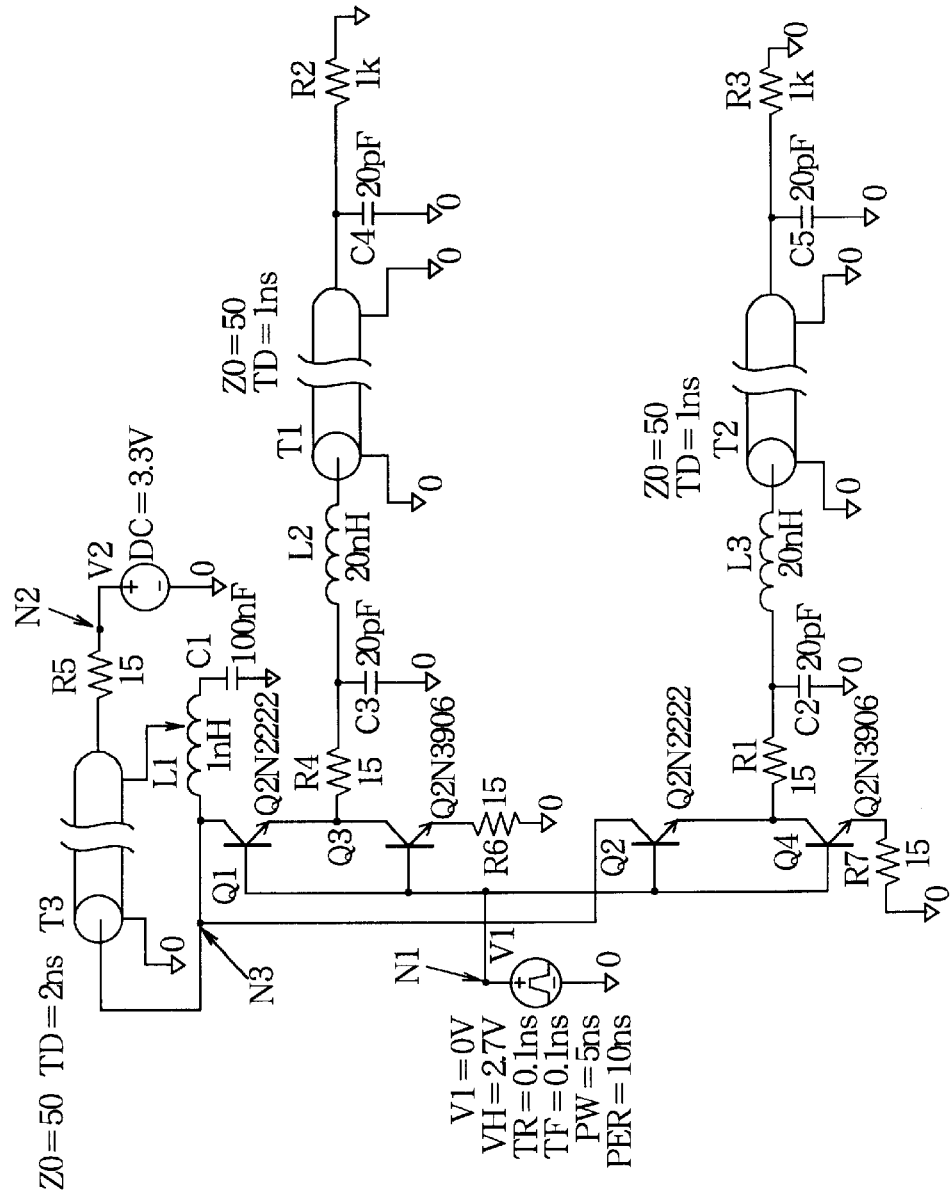
Figure 25C:
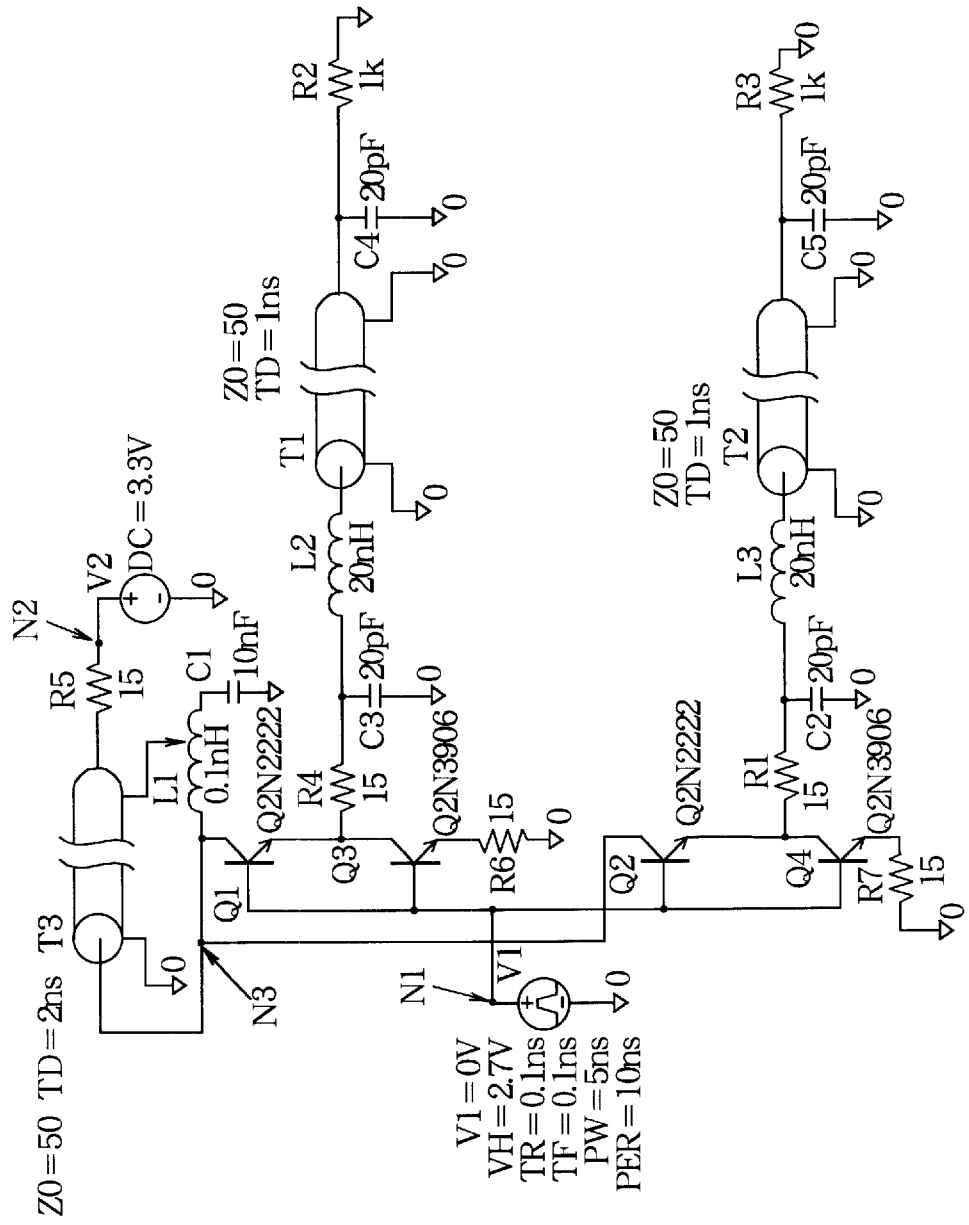
Figure 25D:
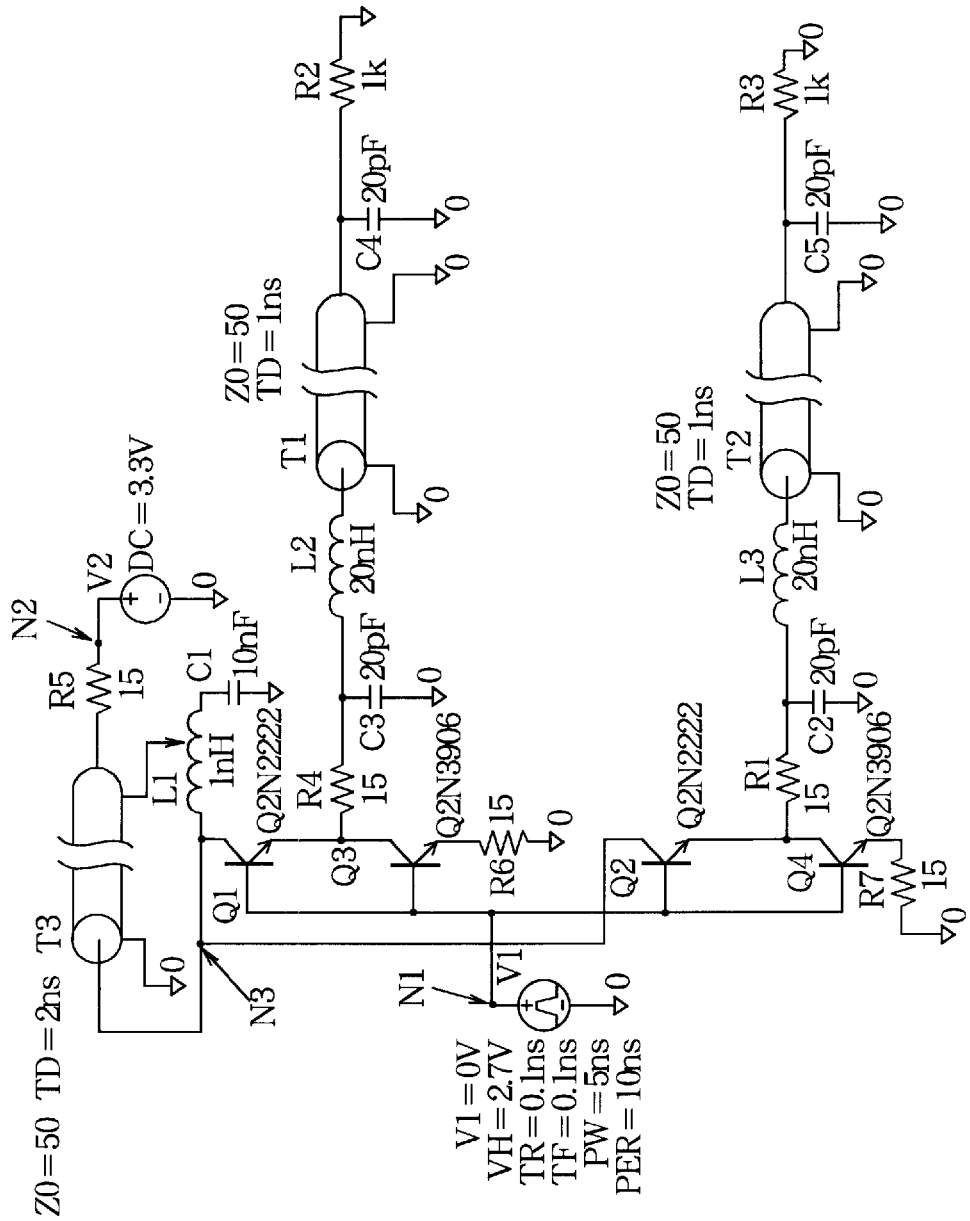
Figure 26A:
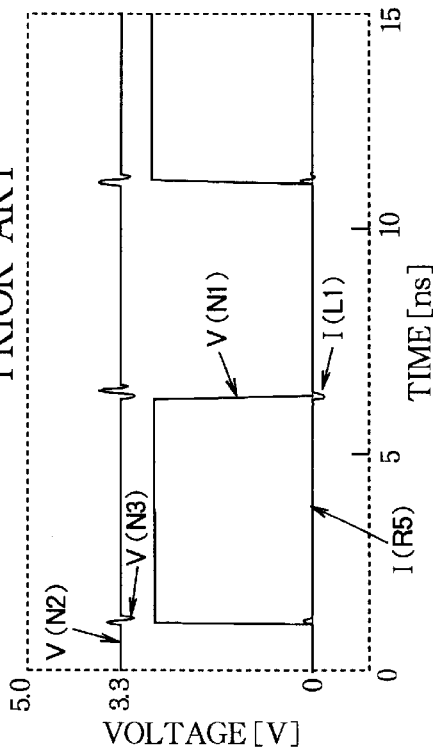
FIGS. 26A, 26B, 26C, and 26D are waveform diagrams showing results of the common-mode noise simulations.
Figure 26C:
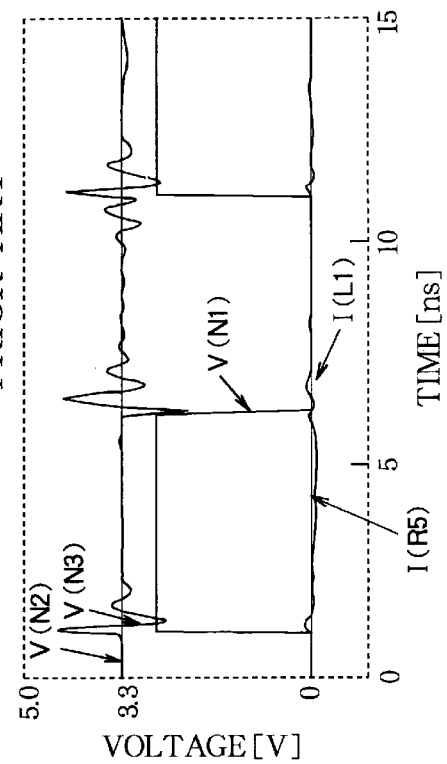
Figure 26B:
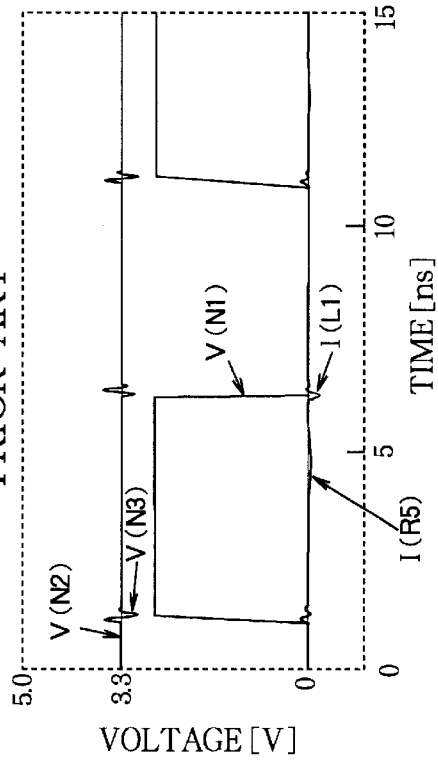
Figure 26D:
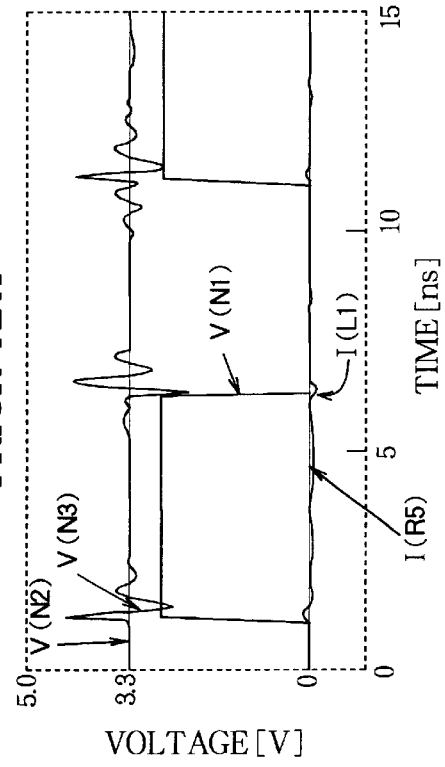

FIGS. 7A and 7B show variations in impedance, as seen from the power supply and ground, of the driver circuit 3 of the first embodiment and a conventional current-switch type of driver circuit (the driver circuit 203 in FIG. 22). FIG. 7A shows the impedance variations of the invented driver circuit 3; FIG. 7B shows the impedance variations of the conventional current-switch driver circuit. The impedance variations are shown schematically; no attempt is made to depict the variations exactly. The transition intervals indicated by dotted lines in FIG. 7A are the switching intervals of transistors 13, 14, 15 in FIG. 1, during which the transmit input signal TS is changing state and the complementary signal is being switched on (TS='1') or off (TS='0'). The transition intervals in FIG. 7B are the switching intervals of transistors $Q_1$ to $Q_4$ in FIG. 22, during which the complementary signal polarity is being inverted.

In the conventional current-switch driver circuit, during the signal transition intervals, the impedance seen from the power supply and ground dips momentarily to a small value, during which current flows directly from the power supply to ground through the driver circuit, and common-mode noise occurs on the power-supply and ground lines. It will be recalled that the conventional current-switch driver circuit has two parallel paths between the power supply and ground, with transistors $Q_1$ and $Q_2$ coupled in series on one path and transistors $Q_3$ and $Q_4$ coupled in series on the other path (FIG. 22). When transistors $Q_1$ and $Q_4$ turn on, transistors $Q_2$ and $Q_3$ turn off. When transistors $Q_2$ and $Q_3$ turn on, transistors $Q_1$ and $Q_4$ turn off. During the transition intervals, the impedance of both of these paths varies in substantially the same way, first decreasing, then returning to the same value as before the transition. The total parallel impedance of the two paths shows a similar behavior, as in FIG. 7B.

In the invented driver circuit 3, there are also two parallel paths, but one leads through drive transistors 13, 14, the signal transmission line pair 1, and the termination resistance 2, while the other leads through the bypass transistor 15. In the first transition interval, drive transistors 13, 14 turn on and the bypass transistor 15 turns off. In the second transition interval, drive transistors 13, 14 turn off and the bypass transistor 15 turns on. During the first transition interval, the resistance values of drive transistors 13, 14 fall from a high off-resistance value to a much lower on-resistance value, while the resistance value of the bypass transistor 15 rises from a low on-resistance value to a high off-resistance value. The two changes substantially cancel out, so that the total parallel impedance remains substantially constant during the transition interval. During the second transition interval, the resistance of drive transistors 13, 14 rises from the comparatively low on-resistance value to a high off-resistance value, while the resistance of the bypass transistor 15 falls from a high off-resistance value to a lower on-resistance value. These changes also cancel out, and the total parallel impedance remains substantially constant.

When the current paths leading through the two drive transistors 13, 14 are opened, the signal transmission line pair 1 is left floating with respect to the power supply and ground. The complementary signal that was being supplied to the signal transmission line 1b just before these current paths were opened continues to propagate toward the termination resistance 2, where its associated electromagnetic fields and positive and negative charges meet and cancel out. In the wake of the complementary signal, the two signal transmission lines 1a, 1b are left at the same potential. This potential is not necessarily equal to one-half the power-supply potential; it may vary each time the current paths are opened, because of the wavelike character the complementary signal and because of external electromagnetic interference, but as long as the two signal transmission lines 1a, 1b are at the same potential, the absence of the complementary signal can be detected.

When the trailing edge of the complementary signal has passed a branching section 4, the positive and negative charges that were stored in the input capacitances of the input terminals $IN_1$ and $IN_2$ of the connected receiver circuit 5 are rapidly discharged through its termination transistor 23. Thus when the trailing edge of the complementary signal has passed the branching section 4, the input terminals $IN_1$ and $IN_2$ of the receiver circuit 5 rapidly assume the same potential. The differential amplifier 22 in the receiver circuit 5 senses that the voltage differential across the input terminals $IN_1$, $IN_2$ is now zero, and outputs a corresponding receive output signal RS at the output terminal OUT.

In this way, when the trailing edge of the complementary signal has passed the branching section 4 and the charge stored in the input capacitance of the input terminals $IN_1$, $IN_2$ of the receiver circuit 5 has been discharged by the termination transistor 23 disposed between them, the receiving circuit 5 senses that the complementary signal is no longer present at the connected branch point on the signal transmission line pair 1. Thus a transition of the transmitted signal is sensed.

To summarize the first embodiment, the driver circuit 3 has a pair of drive transistors 13, 14 that turn on when the transmit input signal TS is at the high level, closing current paths that supply a complementary signal to the signal transmission line pair 1, and turn off when the transmit input signal TS is at the low level, opening these current paths. The driver circuit 3 also has a bypass transistor 15 that turns on when the transmit input signal TS is at the low level, closing a parallel current path that bypasses the signal transmission line pair 1, and turns off when the transmit input signal TS is at the high level, opening the parallel bypass current path. The on-resistance of the bypass transistor 15 is equal to the sum of the on-resistances of the drive transistors 13, 14, the dc resistance of the signal transmission lines 1a, 1b, and the resistance of the termination resistance 2. As seen from the power supply and ground, the driver circuit 3 has the same impedance regardless of whether the transmit input signal TS is high or low, and also has substantially the same impedance during the transition intervals when the transmit input signal TS is changing state. The driver circuit 3 accordingly behaves as a dc circuit, and the transitions of the transmit input signal TS, which conventionally generate common-mode noise and a small amount of differential-mode noise, generate less of these types of noise in the first embodiment. The transitions of the transmit input signal TS therefore cause less perturbation of the power-supply and ground potentials, so resonance of these perturbations with stray inductances and capacitances is reduced, and high-speed signal transmission becomes possible without generating electromagnetic interference. These effects are furthermore obtained without reliance on decoupling by a bypass capacitor, so it is not necessary to embed a bypass capacitor in the driver circuit 3, or even to provide an external bypass capacitor very close to the driver circuit 3. This greatly increases the freedom of design with respect to the positioning of the bypass capacitor, its parasitic inductance, and so on.

Moreover, since a termination transistor 23 is provided between the input terminals $IN_1$ and $IN_2$ of the receiver circuit 5, after the input capacitance of the receiver circuit 5 is charged by the complementary signal energy diverted from the signal transmission line pair 1, when the trailing edge of the complementary signal has passed, the charge stored in the input capacitance of the receiver circuit 5 can discharge rapidly through the termination transistor 23, and the receiver circuit 5 can quickly sense that the complementary signal is no longer present. This enables the receiver circuit 5 to receive high-frequency transmitted signals.

Provision of a branch resistance pair 20 at the point where the receiver circuit 5 is coupled to the signal transmission line pair 1 enables the receiver circuit 5 to sense the complementary signal without significantly disturbing the propagation of the complementary signal on the signal transmission line pair 1.

Use of parallel lines of equal length for the signal transmission line pair 1, the power-ground line pair 6, and the branch transmission line pair 21 enables the parasitic inductance of these pairs of lines to cancel out, producing transmission lines which are free of reactance, thus free of electromagnetic disturbances.

The noise-elimination resistance 16 coupled between the drive output terminals $D_1$, $D_2$ of the driver circuit 3 absorbs the small amount of reflection noise generated at branch points on the signal transmission line pair 1, thereby reducing multiple reflections, and keeping the noise from propagating further into the driver circuit 3.

The bypass capacitor 7 reduces the effects of electromagnetic noise generated by other circuits on the power-ground line pair 6.

The series resistances 17, 18 reduce the current consumption and power dissipation of the driver circuit 3.

The branch receiver unit described above couples the receiver circuit 5 to the signal transmission line pair 1 through a branch resistance pair 20 and a branch transmission line pair 21, but the branch transmission line pair 21 can be omitted; the receiver circuit 5 can be coupled directly to the branch resistance pair 20.

Figure 8:
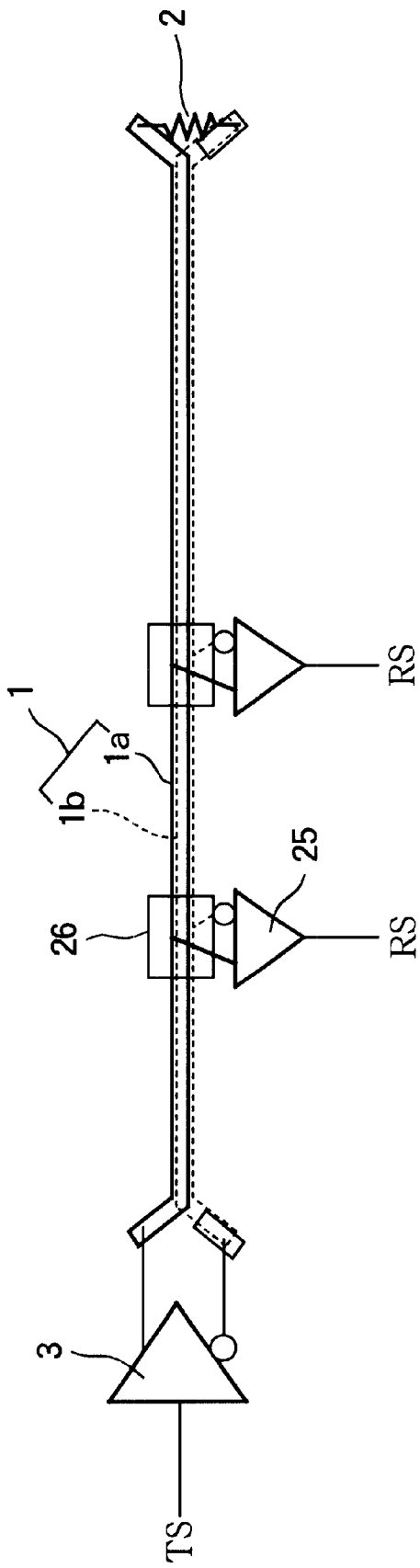
FIG. 8 is a simplified circuit diagram showing a variation of the signal transmission bus system in FIG. 1.

Moreover, the receiver circuit can be connected directly to the signal transmission line pair 1, provided the receiver circuit has a sufficiently high input impedance (for example, 10 kΩ) and an input capacitance that can be regarded as zero (for example, 0.05 pF or less). FIG. 8 shows an example in which two such receiver circuits are coupled to the signal transmission line pair 1. Due to their high input impedance and near-zero input capacitance, these receiver circuits do not significantly disturb the complementary signal on the signal transmission line pair 1, so no branch resistance pair is necessary.

Figure 9:
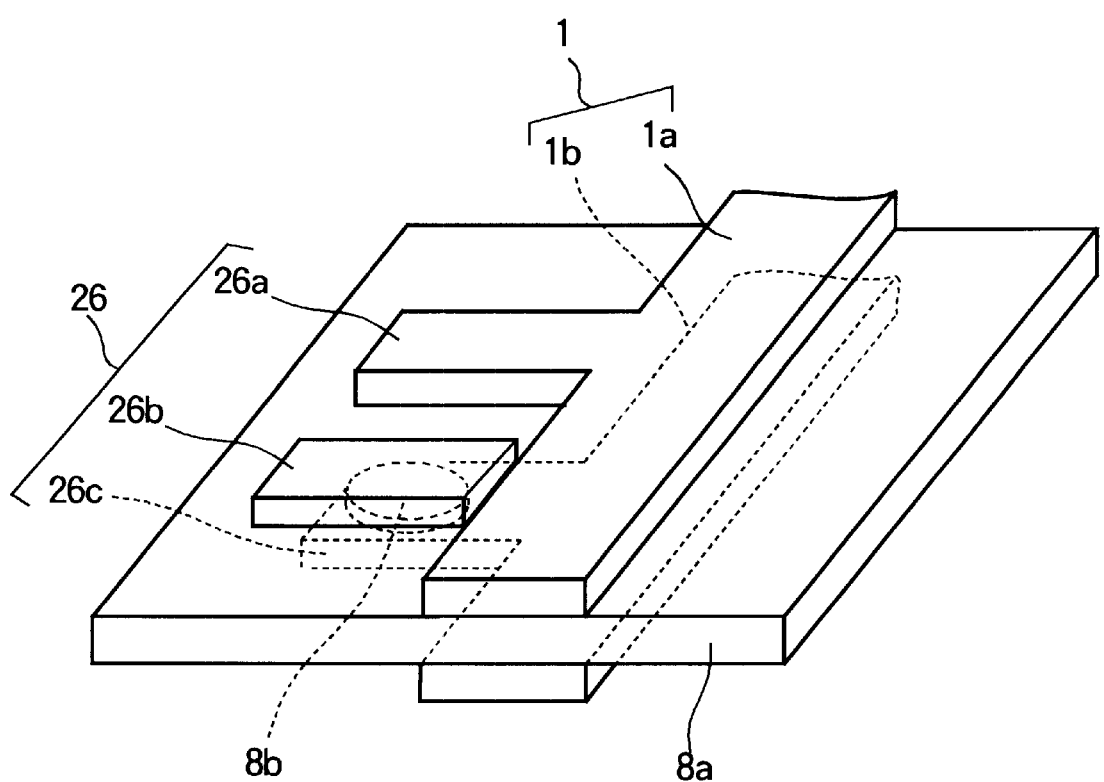
FIG. 9 is a perspective view of a branching section in FIG. 8.

Each receiver circuit 25 in FIG. 8 needs to have only a differential amplifier, such as the differential amplifier 22 in FIG. 4. The termination transistor 23 shown in FIG. 4 is not necessary. The branching section 26 that couples each receiver circuit 25 to the signal transmission line pair 1 has, for example, the structure shown in FIG. 9, comprising a pair of branch pad electrodes 26a, 26b and a branch contact electrode 26c. Branch pad electrode 26a and branch contact electrode 26c are unitary with signal transmission lines 1a and 1b, respectively. Branch pad electrode 26b makes contact with the branch contact electrode 26c through a via hole 8b in the dielectric layer 8a. The receiver chip including the receiver circuit 25 is coupled to the branch pad electrodes 26a, 26b by flip-chip bonding or wire bonding.

The termination transistor 23 can also be omitted from the receiver circuit 5 in the first embodiment if it is not necessary to discharge the input capacitance of the receiver circuit 5 rapidly. In this case too, the receiver circuit need have only a differential amplifier 22.

It is also possible for a signal transmission bus system according to the first embodiment to have a plurality of signal transmission line pairs, each with its own termination resistance, driver circuit, branching sections, and receiver circuits, disposed on the same circuit substrate. The signal transmission bus system shown in FIG. 10, for example, has two signal transmission line pairs 1A, 1B, two termination resistances 2A, 2B, a driver chip 27 with two driver circuits 3A, 3B, two branching sections 4A each including a branch transmission line pair 21A, another two branching sections 4B each including a branch transmission line pair 21B, and two receiver chips 28, each including two receiver circuits 5A, 5B. The letters A and B in these reference characters denote two units, each similar in structure to the first embodiment as described above, sharing the same circuit substrate 8, with separate transmit input signals TSA, TSB and receive output signals RSA, RSB.

Figure 10:
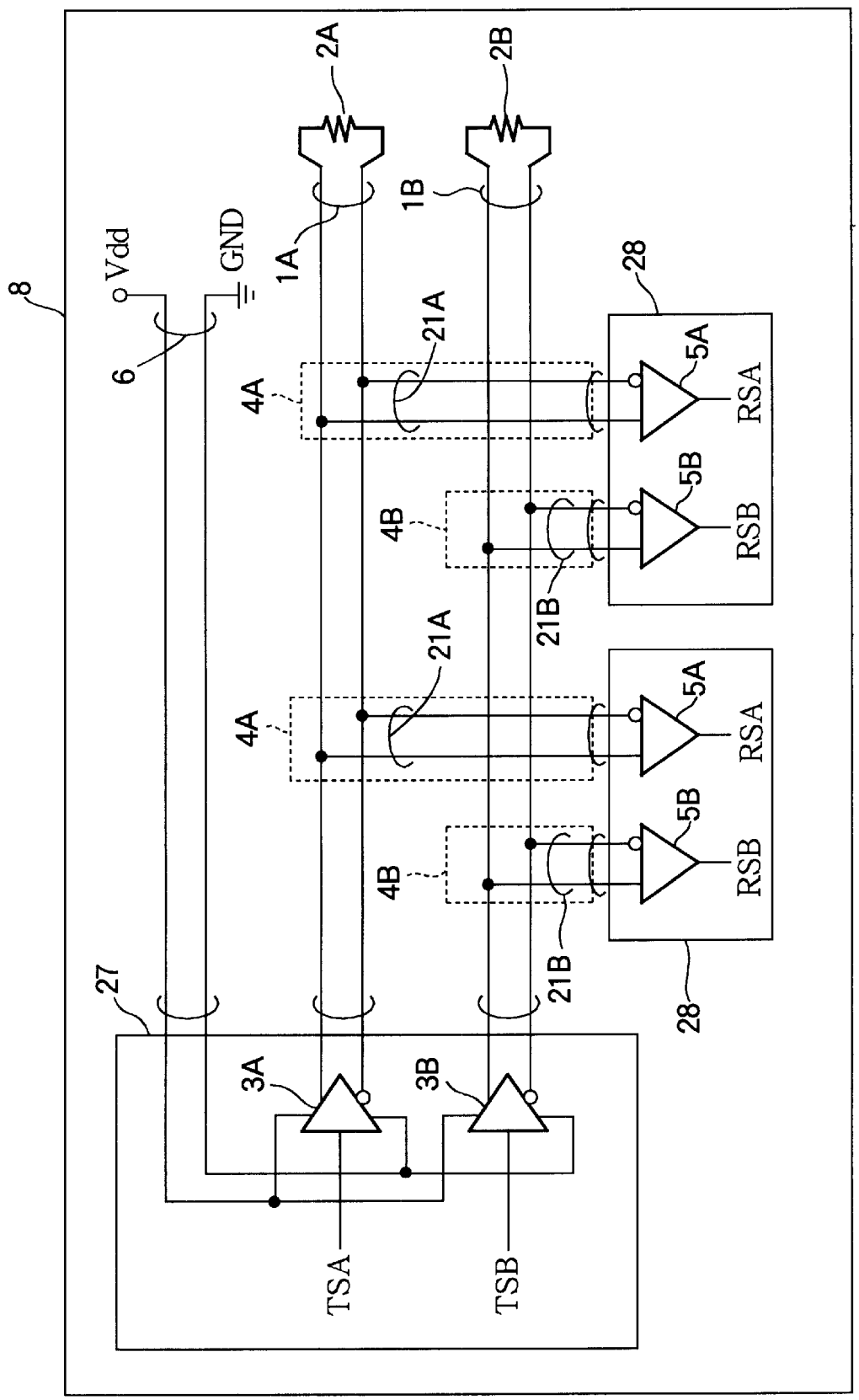
FIG. 10 is a circuit diagram showing another variation of the signal transmission bus system in FIG. 1.
Figure 11:
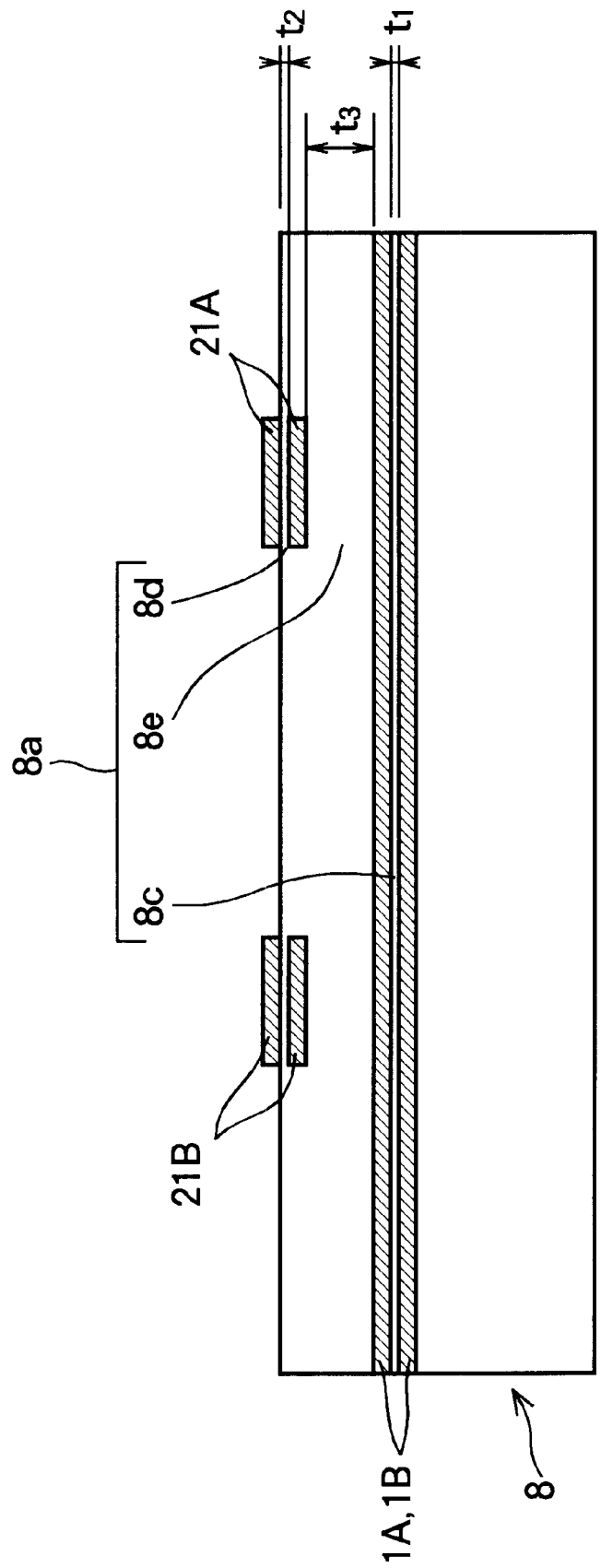
FIG. 11 is a sectional view of the circuit substrate in FIG. 10, showing several transmission line pairs.

The circuit substrate 8 in FIG. 10 has, for example, the four-layer structure shown in FIG. 11. The two signal transmission line pairs 1A, 1B (only one of which is visible) are disposed in a first layer and a second layer embedded in the circuit substrate 8. These two layers are separated by a dielectric layer 8c with a thickness $t_1$. The branch transmission line pairs 21A, 21B are disposed in a third layer and a fourth layer, the fourth layer being a surface layer. These two layers are separated by a dielectric layer 8d with a thickness $t_2$. The second and third layers are separated by a dielectric layer 8e with a thickness $t_3$ at least twice as large (preferably several times as large) as the thicknesses $t_1$, $t_2$ of the above dielectric layers 8c, 8d. If $t_3$ is sufficiently larger than $t_1$ and $t_2$, the electromagnetic fields of signals propagating on the signal transmission line pairs 1A, 1B will not interfere with signals propagating on the branch transmission line pairs 21A, 21B, and vice versa. Electromagnetic interference between the two branch transmission line pairs 21A, 21B is prevented by providing a sufficient separation between them, as shown in FIG. 11 and discussed in FIG. 2B. Similarly, the two signal transmission line pairs 1A, 1B are sufficiently separated from each other to prevent electromagnetic interference, although this is not visible in FIG. 11.

Figure 12:
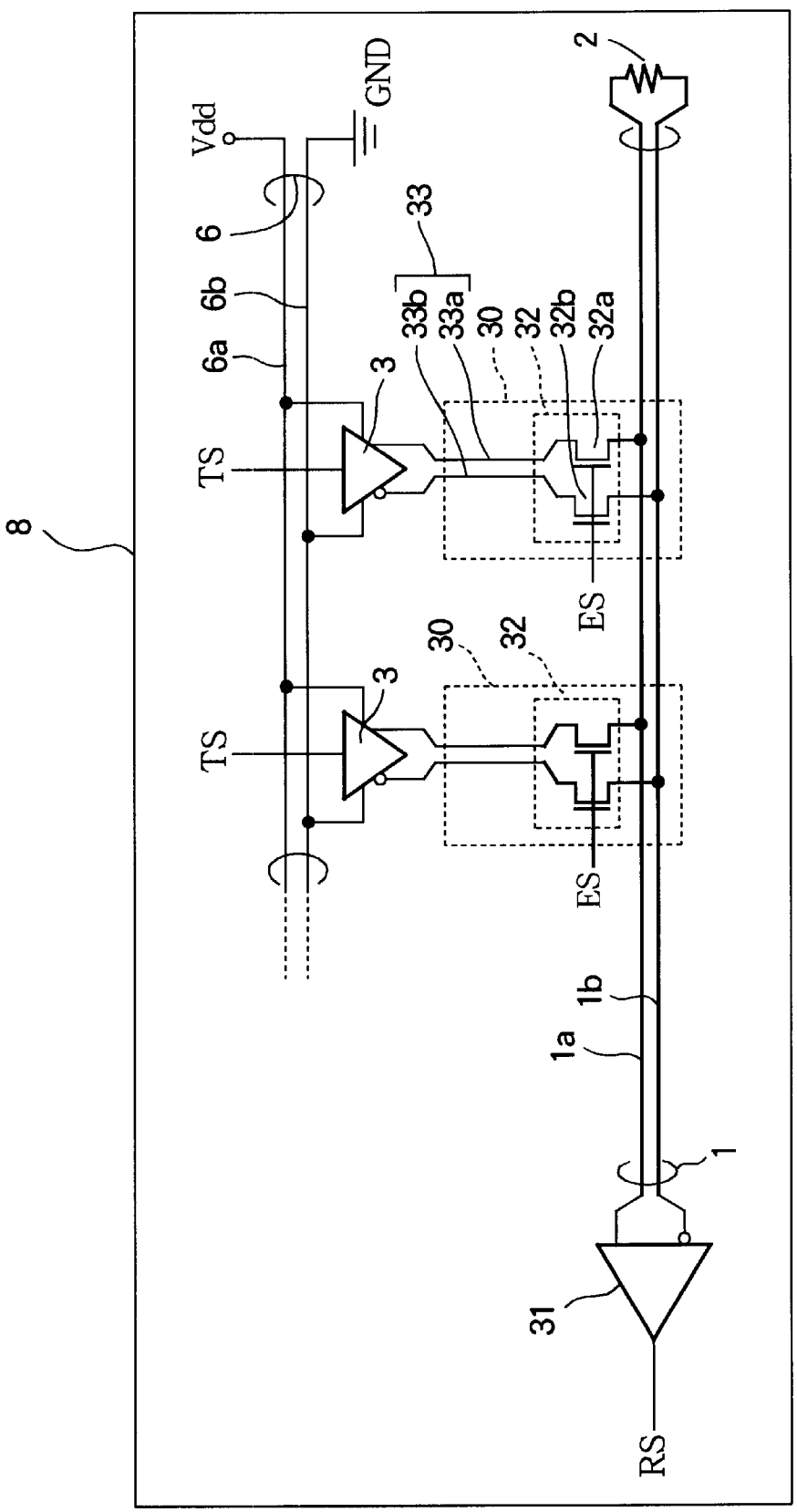
FIG. 12 is a circuit diagram of another signal transmission bus system, illustrating a second embodiment of the invention.

Referring to FIG. 12, a second embodiment of the present invention is a signal transmission bus system comprising a signal transmission line pair 1 with a termination resistance 2, one or more driver circuits 3 (two are shown), one or more branching sections 30 (two are shown), a receiver circuit 31, a power-ground line pair 6, and a circuit substrate 8. Although not explicitly indicated in FIG. 12, each driver circuit 3 is disposed in a driver chip, and the receiver circuit 31 is disposed in a receiver chip, these chips being similar to the IC chips 9, 10 in FIG. 1.

This signal transmission bus system, like the one in the first embodiment, transmits signals in a single direction, from the driver circuits 3 to the receiver circuit 31, but differs from the first embodiment in that the receiver circuit 31 is disposed at one end of the signal transmission line pair 1, while the one or more driver circuits 3 are disposed at intermediate points between the two ends of the signal transmission line pair 1.

Each driver circuit 3 and its branching section 30 constitute a branch driver unit. The branching section 30 includes a bus transceiver circuit 32. The term 'bus transceiver circuit' is used herein to denote a type of circuit through which signals can be transmitted and/or received when the circuit is enabled.

Each bus transceiver circuit 32 receives an enable signal ES from, for example, one of the driver chips or another circuit (not visible). Each driver circuit 3 receives a transmit input signal TS. Only one branch driver unit coupled to the signal transmission line pair 1 is active at a time. The enable signals ES indicate which branch driver unit is active. The transmit input signal TS supplied to the active branch driver unit varies between the high and low levels to indicate '1' and '0' data. The transmit input signal TS supplied to an inactive branch driver unit is held at the low level. The active branch driver unit supplies a complementary signal to the signal transmission line pair 1, switching the complementary signal on and off to indicate '1' and '0' data. An inactive branch driver unit does not supply a complementary signal to the signal transmission line pair 1. The branch driver units become active in turn, sharing the signal transmission line pair 1 to transmit signals to the receiver circuit 31 at different times.

A branching section 30 comprises the bus transceiver circuit 32 and a branch transmission line pair 33. The bus transceiver circuit 32 comprises a pair of nMOS branch transistors 32a, 32b. The branch transmission line pair 33 comprises two parallel branch transmission lines 33a, 33b of equal length. Branch transistor 32a is inserted between an intermediate point on signal transmission line 1a and one end of branch transmission line 33a. The other end of branch transmission line 33a is coupled to one of the drive terminals (drive terminal $D_1$ in FIG. 1) of the driver circuit 3. Branch transistor 32b is inserted between a corresponding point on signal transmission line 1b and one end of branch transmission line 33b. The other end of branch transmission line 33b is coupled to the other drive terminal of the driver circuit 3 (drive terminal $D_2$ in FIG. 1). The enable signal ES is supplied to the gate electrodes of both transistors 32a, 32b.

The transistors 32a, 32b in the bus transceiver circuit 32 turn on when the enable signal ES is at the high level, coupling the driver circuit 3 and branch transmission line pair 33 to the signal transmission line pair 1, thereby placing the branch driver unit in the active state. When the enable signal ES is at the low level, these transistors 32a, 32b turn off, disconnecting the branch transmission line pair 33 and driver circuit 3 from the signal transmission line pair 1, thereby placing the branch driver unit in the inactive state.

This prevents the complementary signal supplied to the signal transmission line pair 1 from the active branch driver unit from being diverted into an inactive branch driver unit and reflected at the end of the branch transmission line pair 33 of the inactive branch driver unit.

The characteristic impedance of the branch transmission lines 33a, 33b is preferably matched to one-half the characteristic impedance of the signal transmission lines 1a, 1b so as to prevent reflection of signal energy at the T-junction where the branch transmission line pair 33 is coupled to the signal transmission line pair 1. The on-resistance of the branch transistors 32a, 32b is matched to the characteristic impedance of the branch transmission lines 33a, 33b.

As in the first embodiment, each driver circuit 3 behaves as a dc circuit as seen from the power supply and ground. Depending on the state of the transmit input signal TS, the driver circuit 3 either closes current paths that supply the complementary signal through the branching section 30 to the signal transmission line pair 1 and opens a bypass current path that bypasses the branching section 30 and signal transmission line pair 1, or opens the current paths that supply the complementary signal and closes the bypass current path. The on-resistance of the bypass transistor 15 that closes the bypass current path is substantially equal to the sum of the on-resistances of the drive transistors 13, 14 that close the signal-supply current paths and the dc resistance seen from the drive terminals $D_1$, $D_2$ of the driver circuit 3, looking toward the branching section 30, when the branch driver unit is active (these transistors and drive terminals are shown in FIG. 1).

The receiver circuit 31 is coupled to the end of the signal transmission line pair 1 opposite from the termination resistance 2. Sensing the complementary signal supplied to the signal transmission line pair 1 from the driver circuit 3 in the active branch driver unit, the receiver circuit 31 generates a corresponding receive output signal RS. More precisely, the receiver circuit 31 senses whether the complementary signal is present or absent, these states representing '1' and '0' data. The receiver circuit 31 comprises, for example, the differential amplifier 22 shown in FIG. 4, which has an input impedance with a high dc resistance and a capacitive reactance. The end of the signal transmission line pair 1 coupled to the receiver circuit 31 therefore has a capacitive termination that is totally reflecting, even if the input capacitance of the receiver circuit 31 varies slightly.

The complementary signal supplied to the signal transmission line pair 1 from the active driver circuit 3 through the branch transmission line pair 33 and bus transceiver circuit 32 propagates from the T-junction with the signal transmission line pair 1 toward both the receiver circuit 31 and the termination resistance 2, substantially half of the signal energy propagating in each direction. The characteristic impedance of the signal transmission lines 1a, 1b seen from the branch transmission lines 33a, 33b is therefore one-half of the actual characteristic impedance. The characteristic impedance of the branch transmission lines 33a, 33b thus matches the characteristic impedance of the signal transmission lines 1a, 1b if it is one-half the actual characteristic impedance of the signal transmission lines 1a, 1b, as described above.

Since the termination resistance 2 matches the characteristic impedance of the signal transmission line pair 1, all of the energy of the complementary signal that propagates toward the termination resistance 2 on the signal transmission line pair 1 enters the termination resistance 2 and is dissipated therein. The energy of the complementary signal that propagates toward the receiver circuit 31 is totally reflected at the receiver circuit 31 and returns on the signal transmission line pair 1 toward the termination resistance 2. The reflected signal energy reaching the termination resistance 2 is dissipated therein. Reflected signal energy may also branch back to the active driver circuit 3, but this energy is dissipated in the noise-elimination resistance 16 of the driver circuit 3 (shown in FIG. 1).

Because of total reflection, the complementary signal voltage differential sensed by the receiver circuit 31 is substantially twice the voltage differential of the complementary signal that propagates toward the receiver circuit 31 on the signal transmission line pair 1, and is therefore substantially equal to the complementary signal voltage supplied by the driver circuit 3 to the branch transmission line pair 33. This doubling of the complementary signal voltage is desirable because it enables the receiver circuit 31 to sense the complementary signal more easily.

Because the driver circuits 3 behave as dc circuits as seen from the power supply and ground, the signal transmission bus system in the second embodiment provides effects similar to those described in the first embodiment. It reduces the common-mode noise and the small amount of differential-mode noise that occur when the transmit input signals TS change state, and thus prevents common-mode noise from perturbing the power-supply and ground potentials, without relying on decoupling by bypass capacitors. Signals can be transmitted at high speed without causing electromagnetic interference, and if bypass capacitors are employed, there is increased design freedom in regard to their mounting positions and parasitic inductance.

Since the characteristic impedance of the branch transmission lines 33a, 33b is equal to one-half the characteristic impedance of the signal transmission lines 1a, 1b, each branch transmission line pair 33 is matched to the signal transmission line pair 1, and the complementary signal supplied from the branch transmission line pair 33 to the signal transmission line pair 1 is not reflected at the T-junction between these transmission line pairs.

Figure 13:
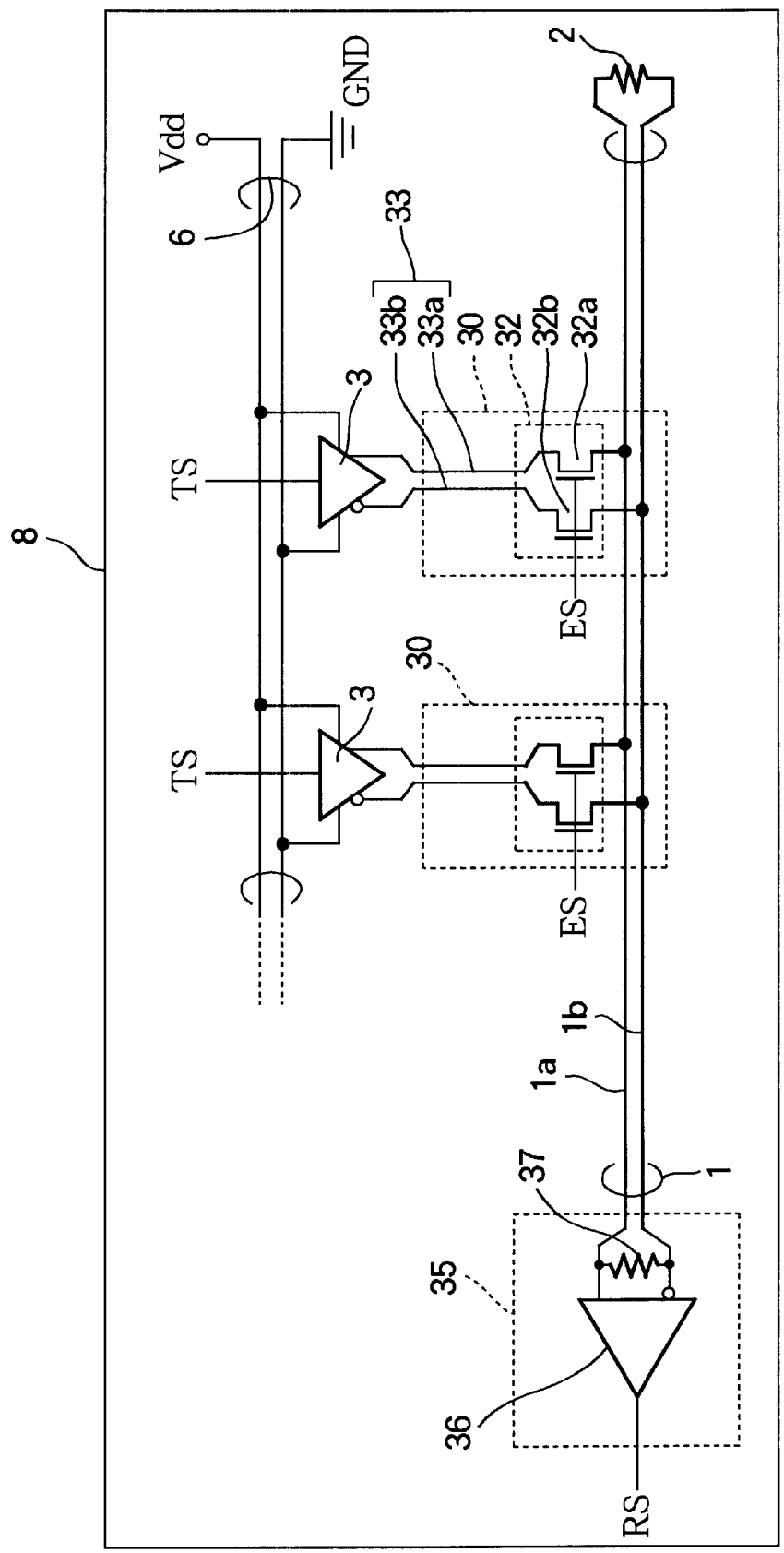
FIG. 13 is a circuit diagram showing a variation of the signal transmission bus system in FIG. 12.

In a variation of the second embodiment, the signal transmission line pair 1 has termination resistances at both ends. Referring to FIG. 13, the receiver circuit 35 comprises a differential amplifier 36 and an input termination resistance 37. The input termination resistance 37 is coupled between the input terminals of the differential amplifier 36, and is matched to the characteristic impedance of the signal transmission line pair 1, having the same resistance value as the termination resistance 2 at the opposite end. In this case, the complementary signal energy that propagates to the receiver circuit 35 is not reflected, but is entirely dissipated in the input termination resistance 37. A resulting advantage is that the branch driver units can be switched between the active and inactive states with fewer timing constraints, because a complementary signal supplied by one driver circuit 3 will not be reflected and interfere with the complementary signal supplied later by another driver circuit 3. A disadvantage is that the complementary signal voltage sensed by the receiver circuit 35 will be only half the complementary signal voltage sensed by the receiver circuit 31 in FIG. 12.

Figure 14:
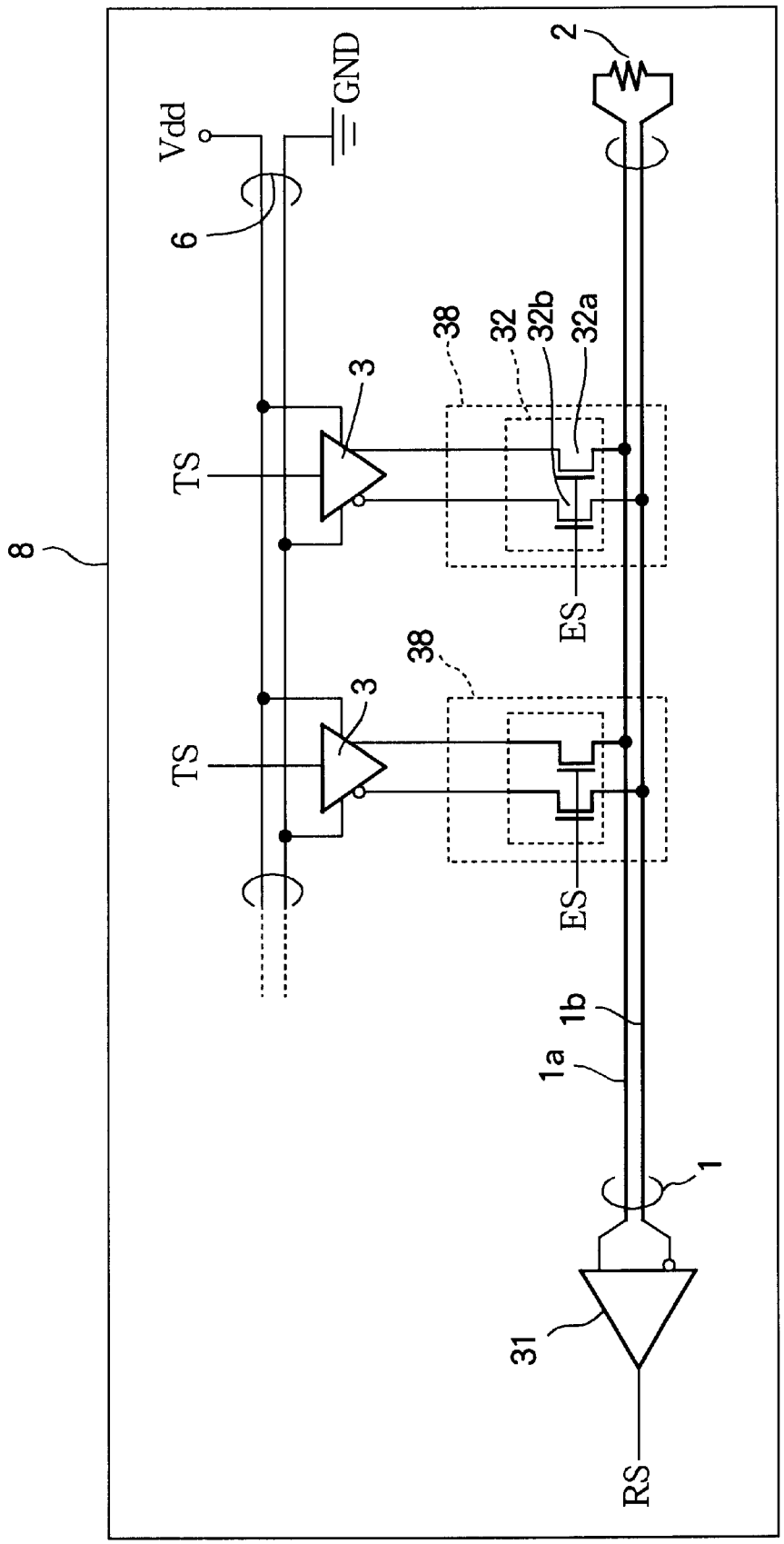
FIG. 14 is a circuit diagram showing another variation of the signal transmission bus system in FIG. 12.

In another variation of the second embodiment, the branch transmission line pairs are omitted. Referring to FIG. 14, the branching section 38 in this case comprises only a bus transceiver circuit 32. The branch transistors 32a and 32b in the bus transceiver circuit 32 are coupled directly to the drive terminals of the driver circuit 3.

Figure 15:
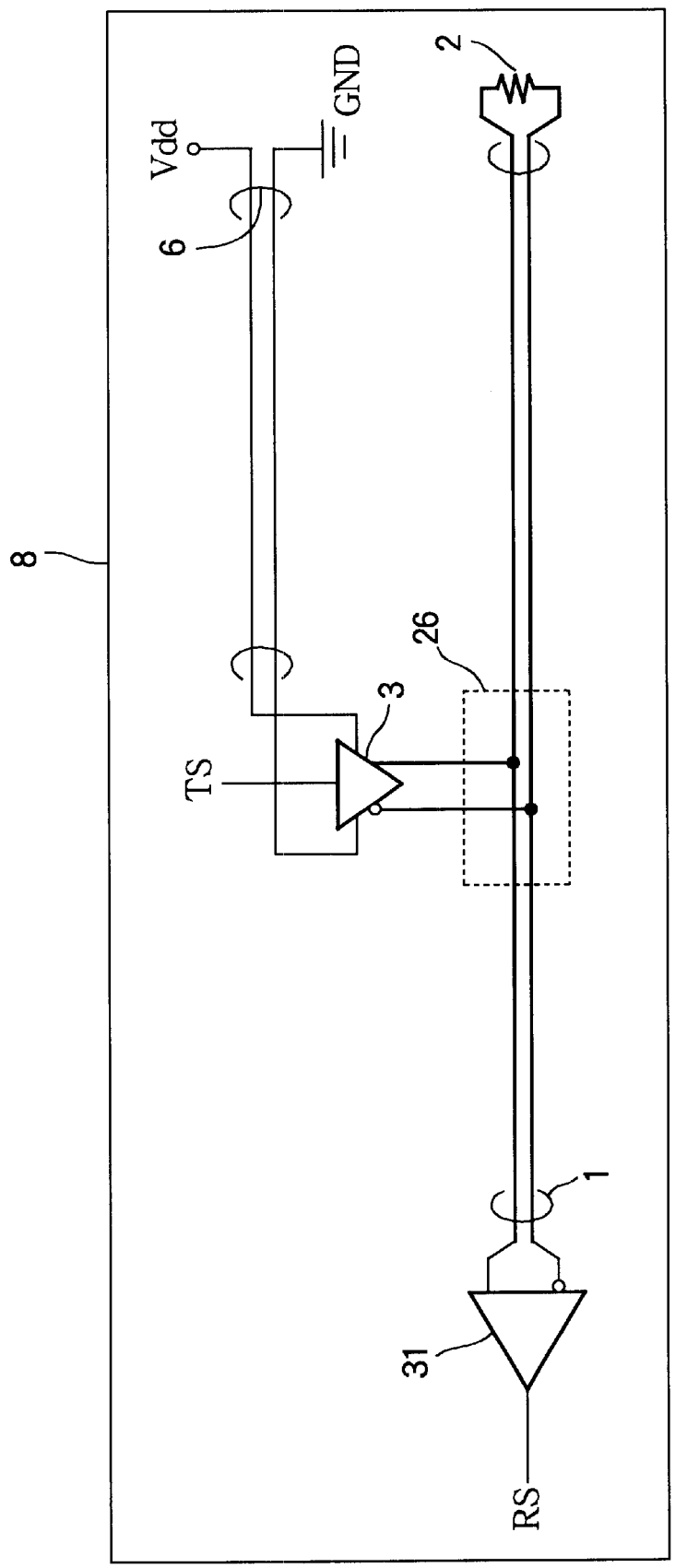
FIG. 15 is a circuit diagram showing still another variation of the signal transmission bus system in FIG. 12.

When there is only one branch driver unit in the second embodiment, both the branch transmission line pairs 33 and the bus transceiver circuits 32 may be omitted. Referring to FIG. 15, the driver circuit 3 is coupled to the signal transmission line pair 1 by a branching section 26 having the structure shown in FIG. 9.

A bypass capacitor may be connected to the power-ground line pair 6 at an appropriate point in FIGS. 12 to 15 to reduce the effect of electromagnetic radiation from other circuits, as in the first embodiment.

In the two embodiments described above, when no complementary signal is supplied, the signal transmission line pair 1 is left floating, and is accordingly susceptible to electromagnetic noise generated by other circuits. In the next embodiment, the termination resistance or the noise-elimination resistance comprises two resistances coupled in series, and the node between them is coupled to ground. Consequently, when the complementary signal is not being supplied, the signal transmission line pair is grounded, improving its immunity to external electromagnetic noise.

Figure 16:
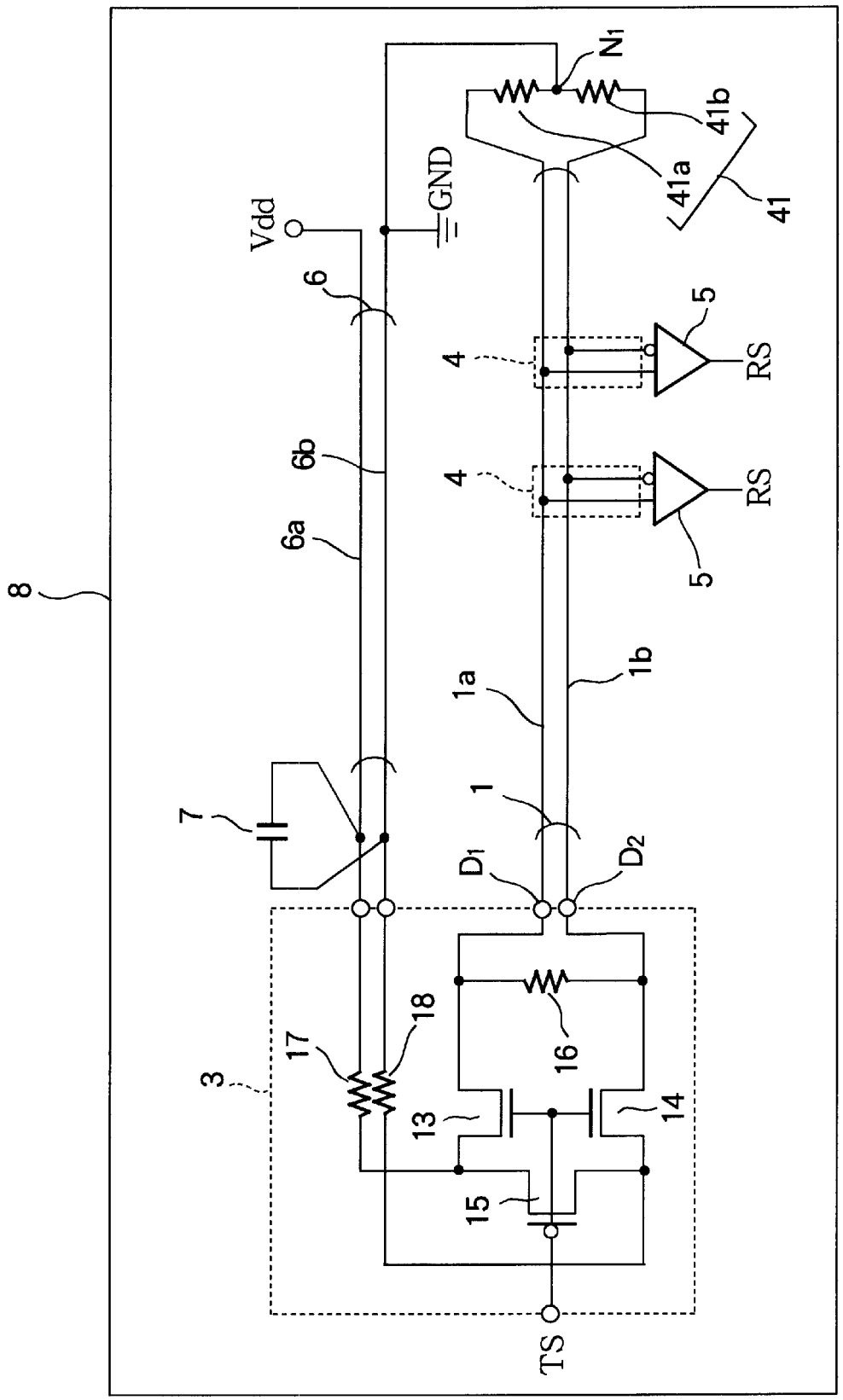
FIG. 16 is a circuit diagram of another signal transmission bus system, illustrating a third embodiment of the invention.

Referring to FIG. 16, this third embodiment comprises, for example, a signal transmission line pair 1, a driver circuit 3, branching sections 4, receiver circuits 5, a power-ground line pair 6, and a bypass capacitor 7 as described in the first embodiment, and a termination resistance 41. The termination resistance 41 is coupled to the end of the signal transmission line pair 1 opposite the driver circuit 3, replacing the termination resistance 2 of the first embodiment.

The termination resistance 41 comprises two termination resistances 41a, 41b coupled in series, their combined series resistance being equal to the characteristic impedance of the signal transmission line pair 1 (thus to the resistance of the termination resistance 2 in the first embodiment). The node $N_1$ between the first termination resistance 41a and second termination resistance 41b is coupled to ground (GND) through a ground line or ground pattern. The resistance values of the first termination resistance 41a and second termination resistance 41b are preferably equal. For stable propagation of the complementary signal on the transmission line, the resistance values of the series resistances 17, 18 are preferably equal to the resistance values of the first and second termination resistances 41a, 41b.

When the complementary signal is not supplied, drive terminal $D_1$ of the driver circuit 3 is disconnected from the power supply and drive terminal $D_2$ is disconnected from ground, but signal transmission line 1a is coupled to ground through the first termination resistance 41a, and signal transmission line 1b is coupled to ground through the second termination resistance 41b, so the signal transmission line pair 1 is held at the ground potential. Accordingly, when a complementary signal is supplied, signal transmission line 1a is driven to a potential higher than the ground potential, and signal transmission line 1b to a potential lower than the ground potential. At all times, the signal transmission line pair 1 is highly immune to electromagnetic noise generated by other circuits (not visible), because it is never left floating.

Given that the termination resistance 41 is divided into two equal parts, and the node $N_1$ between them is coupled to ground, the potentials of signal transmission line 1a and signal transmission line 1b are symmetrical with respect to ground. A complementary signal causes these potentials to diverge in opposite directions from ground, the divergence having the same absolute value in both directions. This arrangement minimizes the absolute value of the divergence from ground. If electromagnetic noise is also present, it will perturb the potentials of both signal transmission lines 1a, 1b in the same direction, so that a positive noise potential, for example, is added to a positive signal potential on signal transmission line 1*a* and to a negative signal potential on signal transmission line 1*b*. Since the absolute value of the signal potentials has been minimized, however, the absolute value of the sum of the signal and noise potentials is also minimized. In short, perturbations of the ground potential are minimized.

To summarize the third embodiment, the termination resistance 41 is separated into two resistances coupled in series, and the internal node between them is grounded, so that when the driver circuit 3 is not supplying a complementary signal, the signal transmission line pair 1 is not left floating. The signal transmission line pair 1 is therefore less susceptible to electromagnetic noise. Equality of the resistance values of the first termination resistance 41*a*, second termination resistance 41*b*, and series resistances 17, 18 furthermore enables complementary signals to propagate on the signal transmission lines 1*a* and 1*b* in the most stable manner, under conditions that minimize perturbations of the ground potential.

In the description of the third embodiment given above, it was the termination resistance that was divided into two resistances on opposite sides of a grounded node, but it is possible to divide the noise-elimination resistance into two resistances and ground the node between them instead.

Figure 17:
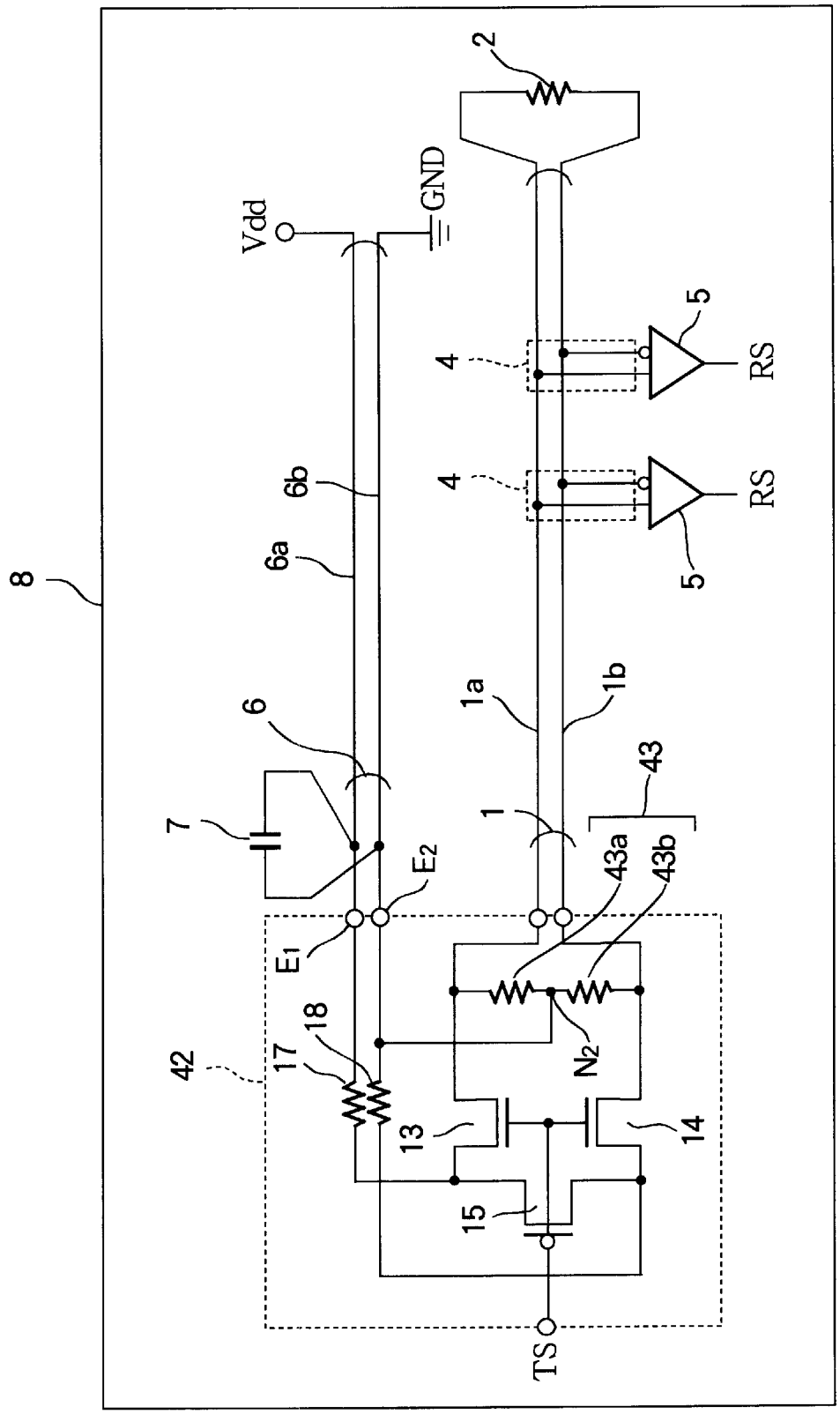
FIG. 17 is a circuit diagram showing a variation of the signal transmission bus system in FIG. 16.

The signal transmission bus system in FIG. 17 replaces the driver circuit 3 shown in FIG. 1 with a different driver circuit 42. The driver circuit 42 replaces the noise-elimination resistance 16 in FIG. 1 with another noise-elimination resistance 43. The noise-elimination resistance 43 divides the noise-elimination resistance 16 of FIG. 1 into a first noise-elimination resistance 43*a* and a second noise-elimination resistance 43*b*. The resistance value of the noise-elimination resistance 43 in FIG. 17 (the series resistance of the first and second noise-elimination resistances 43*a*, 43*b*) is equal to the resistance value of the noise-elimination resistance 16 in FIG. 1, being about ten times the characteristic impedance of the signal transmission lines 1*a*, 1*b*. The node $N_2$ between the first and second noise-elimination resistances 43*a*, 43*b* is coupled to the ground terminal $E_2$, which is coupled through the ground line 6*b* to ground.

In the signal transmission bus system in FIG. 17, it is preferable for the resistance values of the first noise-elimination resistance 43*a*, second noise-elimination resistance 43*b*, and series resistances 17, 18 to be equal. In the signal transmission bus system in FIG. 16, the resistance value of the series resistances 17, 18 was preferably small, (only half the characteristic impedance of the signal transmission lines 1*a*, 1*b*, in order to match the termination resistance 41), but in the signal transmission bus system in FIG. 17, the resistance value of the noise-elimination resistance 43 can be made fairly large (a value about ten times as large as the characteristic impedance of the signal transmission lines 1*a*, 1*b* being preferred), so the resistance values of the series resistances 17, 18 can also be made large, reducing the power dissipation of the driver circuit.

The resistance values of the first termination resistance 41*a* and second termination resistance 41*b* in FIG. 16 may differ, provided their combined series resistance matches the characteristic impedance of the signal transmission lines 1*a*, 1*b*. Similarly, in FIG. 17, the first noise-elimination resistance 43*a* and second noise-elimination resistance 43*b* may have differing resistance values. It is preferable, however, for the termination resistance 41 or noise-elimination resistance 43 to be divided into two equal resistances as described above, so that both signal transmission lines 1*a*, 1*b* will have similar amplitude swings with respect to ground.

The basic concept of the third embodiment is to divide the termination resistance (or the noise-elimination resistance) into a first resistance and a second resistance coupled in series, and ground the node between these two resistances. The third embodiment was obtained by applying this concept to the first embodiment, but the same concept can be applied to the second embodiment.

The signal transmission bus systems in the preceding embodiments transmitted signals in one direction. The signal transmission bus system to be described below transmits signals in both directions.

Figure 18:
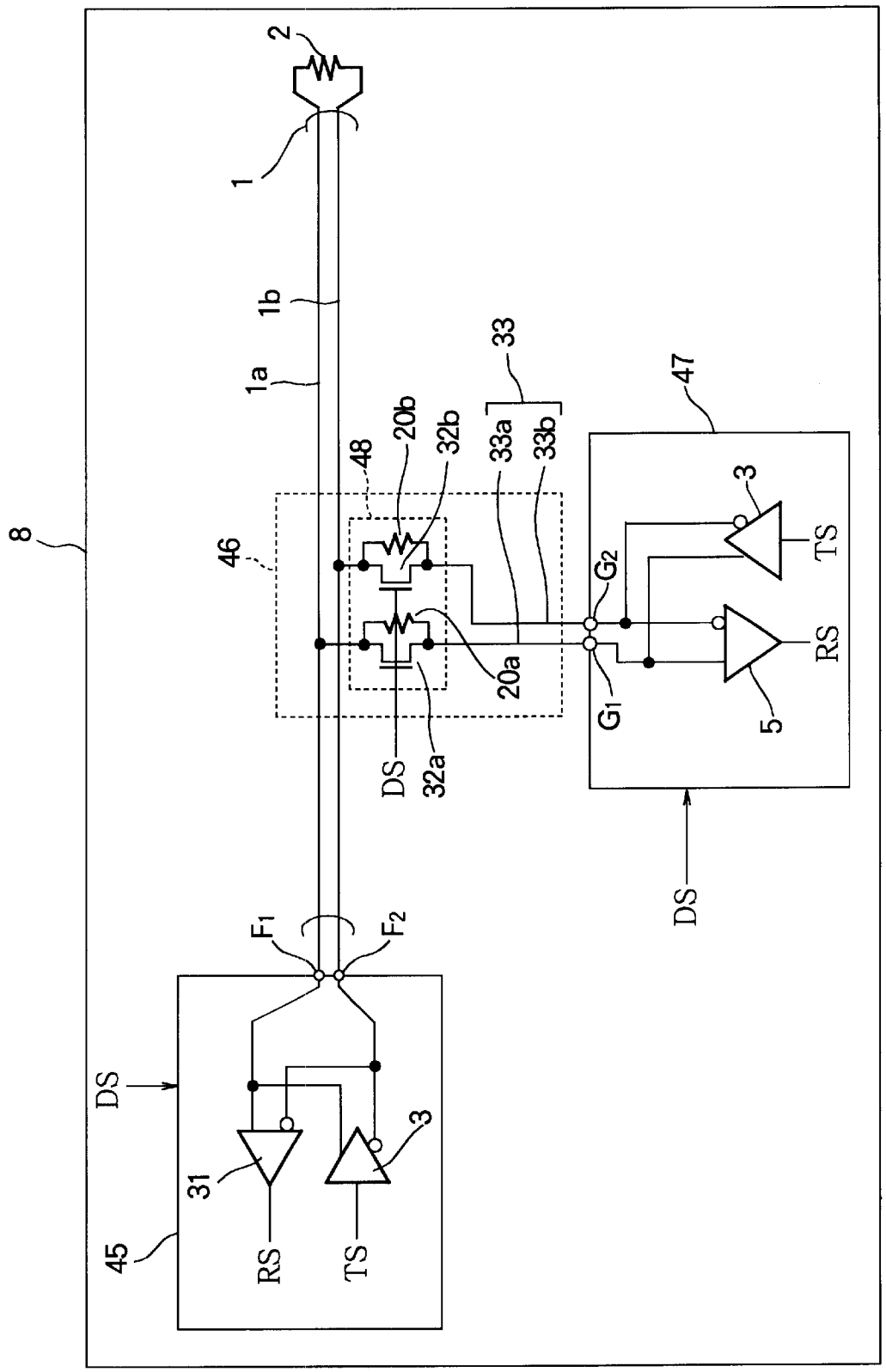
FIG. 18 is a circuit diagram of another signal transmission bus system, illustrating a fourth embodiment of the invention.

FIG. 18 is a circuit diagram of the signal transmission bus system of the fourth embodiment. Elements identical to elements shown in FIGS. 1, 4, and 12 have the same reference characters. This signal transmission bus system comprises a signal transmission line pair 1, a termination resistance 2, a first IC chip 45, one or more branching sections 46 (one is shown), one or more second IC chips 47 (one is shown), parallel power-supply and ground lines of equal length (not visible), and a circuit substrate 8. Signals are transmitted between the first IC chip 45 and second IC chip 47 through the signal transmission line pair 1 and branching section 46. The first IC chip 45 is a controller chip such as a central processing unit (CPU) or the like. The second IC chip 47 is, for example, a memory chip or memory interface chip. The parallel power-supply and ground lines couple the first and second IC chips 45, 47 to the power supply and ground.

The first IC chip 45, which is coupled to the opposite end of the signal transmission line pair 1 from the termination resistance 2, includes a driver circuit 3, a receiver circuit 31, and input-output terminals $F_1$, $F_2$. Depending on the transmit input signal TS, the driver circuit 3 either closes current paths supplying a complementary signal to the signal transmission line pair 1 and opens a current path bypassing the signal transmission line pair 1, or opens the current paths supplying a complementary signal to the signal transmission line pair 1 and closes the current path bypassing the signal transmission line pair 1, thereby operating as a dc circuit as seen from the power supply and ground.

The first and second IC chips 45, 47 are controlled by a direction control signal DS. When the direction control signal DS is at the low level, the drive terminals of the driver circuit 3 in the first IC chip 45 are coupled to the input-output terminals $F_1$, $F_2$, and the input terminals of the receiver circuit 31 are disconnected from the input-output terminals $F_1$, $F_2$. In this state, the driver circuit 3 drives the signal transmission line pair 1 by expressing '1' and '0' data as the presence and absence of a complementary signal. Conversely, when the direction control signal DS is at the high level, the input terminals of the receiver circuit 31 are coupled to the input-output terminals $F_1$, $F_2$, the driver terminals of the driver circuit 3 are disconnected from the input-output terminals $F_1$, $F_2$, and a signal transmitted from the second IC chip 47 onto the signal transmission line pair 1 is sensed by the receiver circuit 31. The direction control signal DS may be generated within the first IC chip 45, or supplied from another circuit, external to the first IC chip 45, as shown in FIG. 18. (This external circuit and the internal circuits that switch the connections of the driver circuit 3 and receiver circuit 31 to the input-output terminals $F_1$, $F_2$ are not visible).

The branching section 46 and the second IC chip 47 connected to it form a branch unit disposed at an intermediate point between the two ends of the signal transmission line pair 1. This branch unit receives the direction control signal DS from the first IC chip 45 or another device (not visible). When the direction control signal DS is high, the second IC chip 47 drives the signal transmission line pair 1. When the direction control signal DS is low, the second IC chip 47 senses the signal transmitted on the signal transmission line pair 1 by the first IC chip 45.

The branching section 46 includes a bus transceiver circuit 48 and a branch transmission line pair 33 having two branch transmission lines 33a, 33b.

The bus transceiver circuit 48, which is disposed between the branching point on the signal transmission line pair 1 and one end of the branch transmission line pair 33, includes a pair of branch resistances 20a, 20b and a pair of nMOS branch transistors 32a, 32b. Branch resistance 20a and branch transistor 32a are inserted in parallel between the branch point on signal transmission line 1a and one end of branch transmission line 33a; branch resistance 20b and branch transistor 32b are inserted in parallel between the branch point on signal transmission line 1b and one end of branch transmission line 33b. The direction control signal DS is supplied to the gate electrodes of both transistors 32a, 32b. The branch resistances 20a, 20b have resistance values of at least four hundred ohms (0.4 k$\Omega$).

In this bus transceiver circuit 48, when the direction control signal DS is at the low level, the branch transistors 32a and 32b turn off, so that the second IC chip 47 and branch transmission line pair 33 are connected to the signal transmission line pair 1 only through the high-resistance branch resistances 20a, 20b. When the direction control signal DS is at the high level, the branch transistors 32a and 32b turn on, forming low-resistance current paths that bypass the branch resistances 20a, 20b, and the second IC chip 47 and branch transmission line pair 33 are connected to the signal transmission line pair 1 through these low-resistance current paths.

The second IC chip 47, which is coupled by the branching section 46 to an intermediate point on the signal transmission line pair 1, includes a driver circuit 3, a receiver circuit 5, and input-output terminals $G_1$, $G_2$. The receiver circuit 5 has a termination transistor 23 coupled between its input terminals $IN_1$, $IN_2$, as described in the first embodiment (FIG. 4), so that charge stored in its input capacitance can be rapidly discharged.

When the direction control signal DS is at the low level, the input terminals of the receiver circuit 5 in the second IC chip 47 are coupled to the input-output terminals $G_1$, $G_2$, the drive terminals of the driver circuit 3 in the second IC chip 47 are disconnected from the input-output terminals $G_1$, $G_2$, and the transmitted signal supplied to the signal transmission line pair 1 by the first IC chip 45 is sensed by the receiver circuit 5 through the branching section 46. Conversely, when the direction control signal DS is at the high level, the drive terminals of the driver circuit 3 are coupled to the input-output terminals $G_1$, $G_2$, the input terminals of the receiver circuit 5 are disconnected from the input-output terminals $G_1$, $G_2$, and the driver circuit 3 drives the signal transmission line pair 1.

In the signal transmission bus system of the fourth embodiment, the transmission of a signal from the first IC chip 45 to the second IC chip 47 (the transmitting operation when the direction control signal DS is at the low level) is accomplished as described in the first embodiment. The transmission of a signal from the second IC chip 47 to the first IC chip 45 (the transmitting operation when the direction control signal DS is at the high level) is accomplished as described in the second embodiment.

To summarize the fourth embodiment, driver circuits 3 of the invented type, that transmit '1' and '0' data by switching a complementary signal on and off while behaving as dc circuits as seen from the power supply and ground, are provided in both a first IC chip 45, disposed at one end of a signal transmission line pair 1, and a second IC chip 47, disposed at an intermediate point on the signal transmission line pair 1. Signals are transmitted in both directions between these IC chips 45, 47 through the signal transmission line pair 1 and a branching section 46, responsive to transmit input signals TS. As in the first embodiment, the common-mode noise and the small amount of differential-mode noise that occur when the transmit input signal TS changes state are reduced without reliance on decoupling by a bypass capacitor, and common-mode noise is kept from perturbing the power-supply and ground potentials, so signals can be transmitted at high speed without causing electromagnetic interference, even if no bypass capacitor is used. If a bypass capacitor is used, moreover, there is increased design freedom in regard to its mounting position and parasitic inductance.

The provision of a receiver circuit 5 having a termination transistor 23 between input terminals $IN_1$ and $IN_2$ in the second IC chip 47 enables the charge stored in the input capacitance of the receiver circuit 5 by the complementary signal received through the branch resistances 20a, 20b to be speedily discharged, so the absence of complementary signal input can be sensed quickly, as in the first embodiment, whereby high-frequency transmitted signals propagating on the signal transmission line pair 1 can be sensed.

Figure 19:
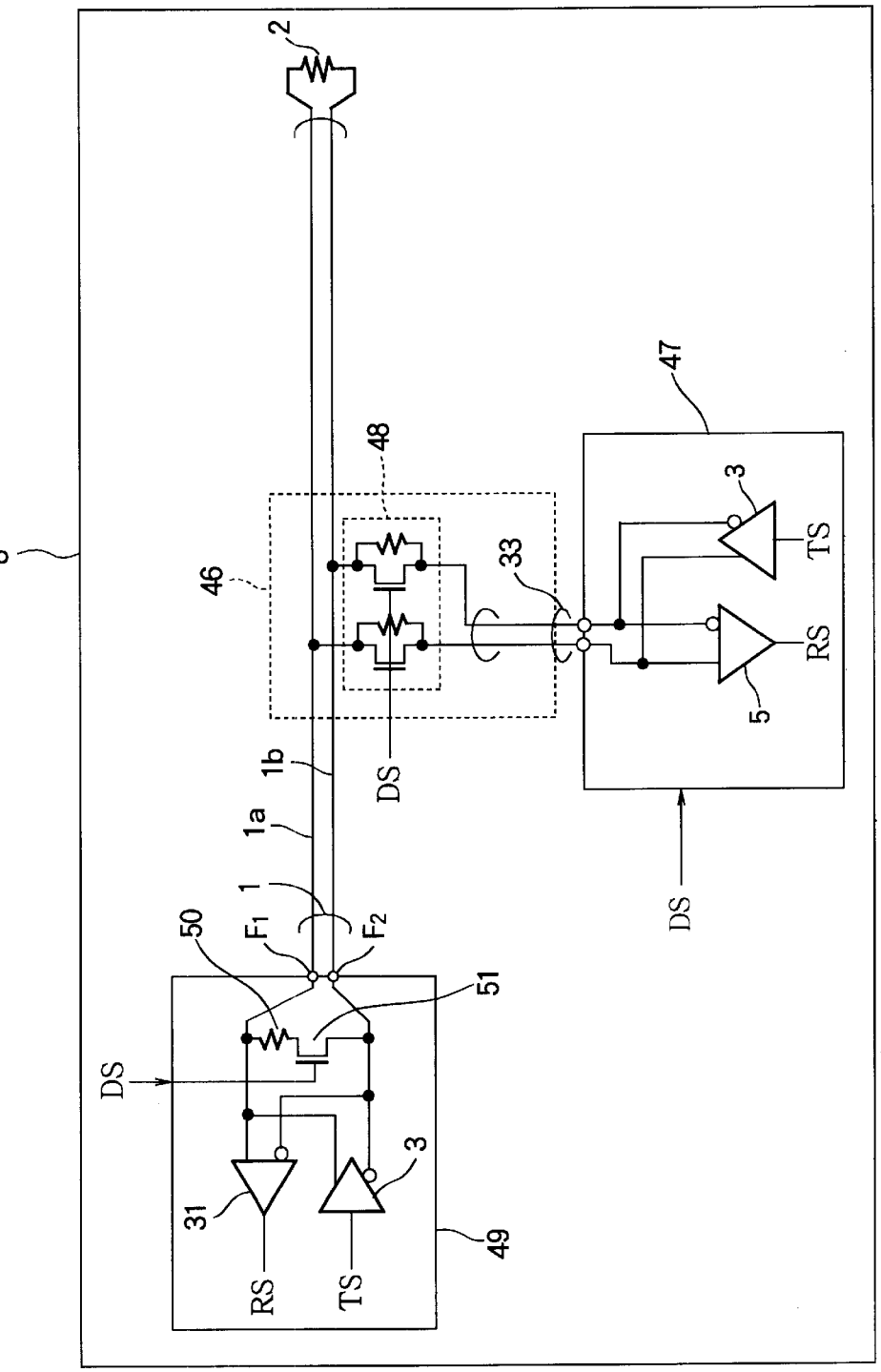
FIG. 19 is a circuit diagram showing a variation of the signal transmission bus system in FIG. 18.

In a variation of the fourth embodiment, when the first IC chip is receiving, the signal transmission line pair 1 is terminated at both ends, as shown in FIG. 19. The first IC chip 49 in FIG. 19 is equivalent to the first IC chip 45 in FIG. 18 with a series circuit comprising an integrated termination resistance 50 and an nMOS transistor 51 coupled in series between the input-output terminals $F_1$, $F_2$ (thus between the signal transmission lines 1a, 1b). The direction control signal DS is applied to the gate electrode of transistor 51. When the direction control signal DS is low (when the first IC chip 49 is the driver), transistor 51 is switched off and an open circuit is formed between the input-output terminals $F_1$, $F_2$. When the direction control signal DS is high (when the first IC chip 49 is the receiver), transistor 51 is switched on and the input-output terminals $F_1$, $F_2$ are terminated by the integrated termination resistance 50. Signal reflection at this end of the signal transmission line pair 1 is thereby prevented, the incident signal energy being dissipated in the integrated termination resistance 50.

Figure 20:
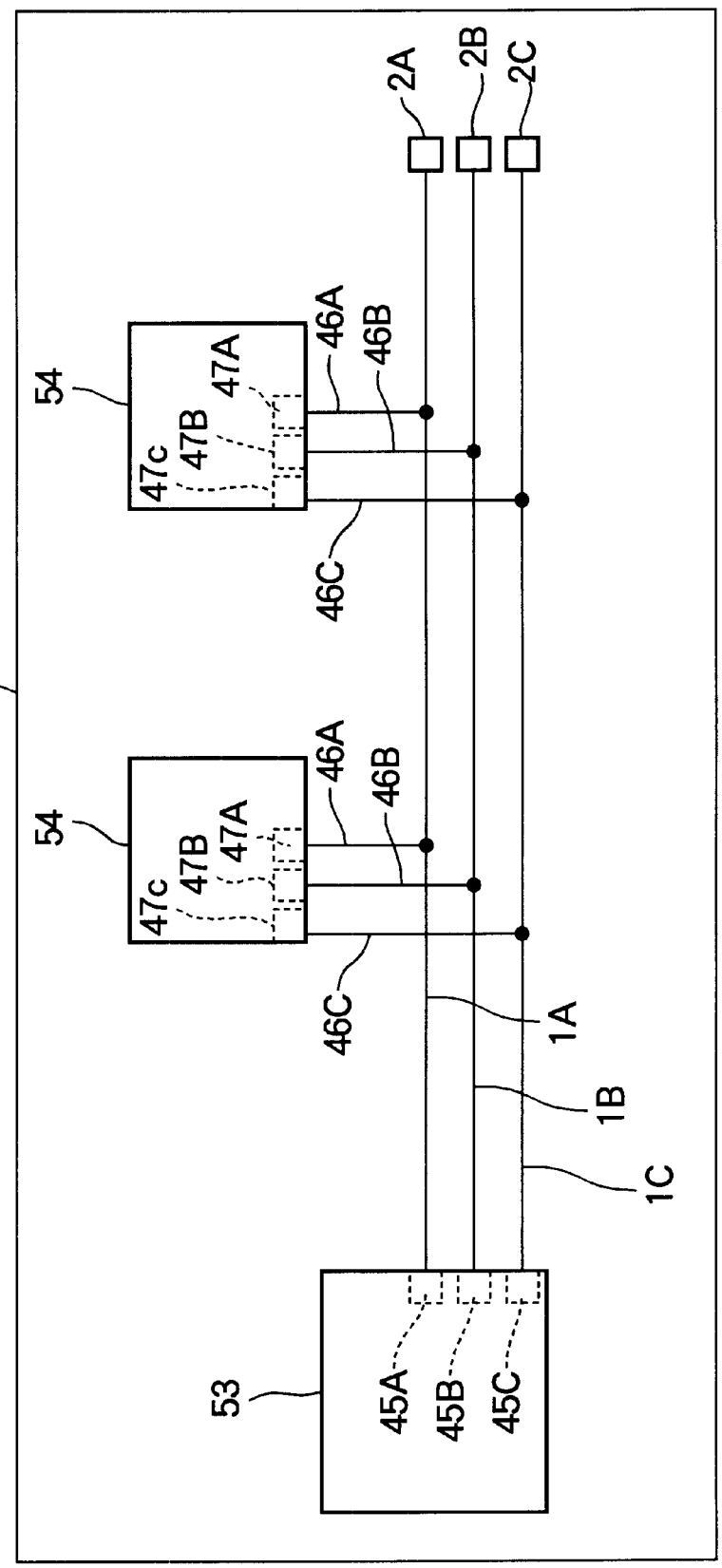
FIG. 20 is a circuit diagram showing another variation of the signal transmission bus system in FIG. 18.
Figure 21:
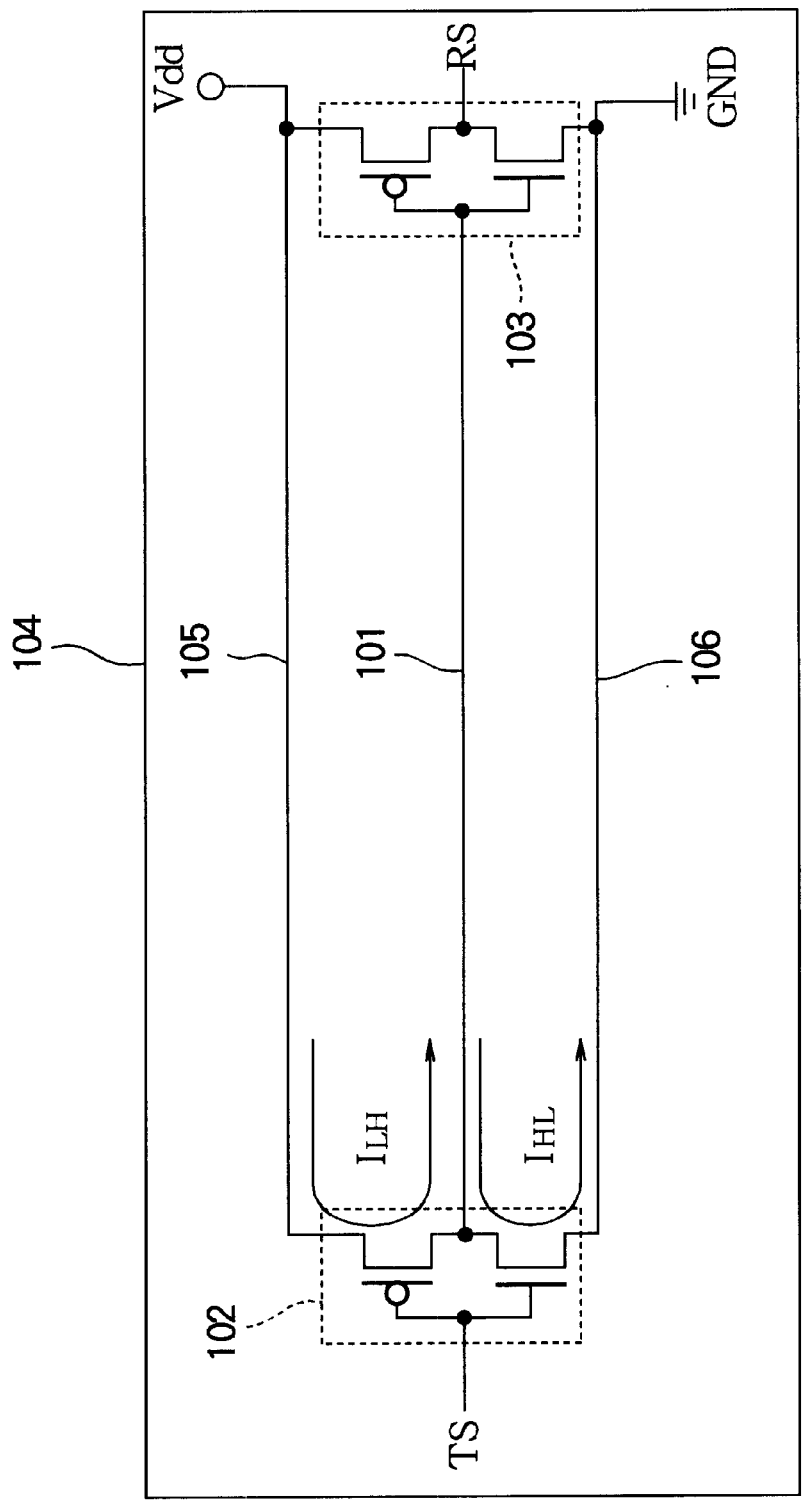
FIG. 21 is a circuit diagram of a signal transmission bus system employing a conventional CMOS driver circuit.

The signal transmission bus system of the fourth embodiment may have a plurality of signal transmission line pairs, with associated termination resistances, IC chips, and branching sections, all disposed on a single circuit substrate 8. In FIG. 20, for example, signal transmission line pairs 1A, 1B, 1C having respective termination resistances 2A, 2B, 2c are coupled to a controller chip 53 at one end. The controller chip 53 includes circuits 45A, 45B, 45C, each equivalent to the driver-receiver circuits of the IC chip 45 in FIG. 18. Each of the three transmission line pairs 1A, 1B, 1C is coupled to two memory interface chips 54. Each memory interface chip 54 includes circuits 47A, 47B, 47C, each of which is equivalent to the driver-receiver circuits of the second IC chip 47 in FIG. 18. There are accordingly two separate sets of branching sections 46A, 46B, 46C, one set for each memory interface chip 54. The letters A, B, C each designate one system of the type described above.

In the signal transmission bus system in FIG. 20, one of the two memory interface chips 54 becomes active at a time, and signals are sent in both directions between the active memory interface chip 54 and the controller chip 53 via the signal transmission line pairs 1A, 1B, 1C and the corresponding branching sections 46A, 46B, 46C.

Only a few variations of the above embodiments have been discussed. Those skilled in the art will recognize that further variations are possible within the scope claimed below.

What is claimed is:

1. A driver circuit receiving power at a first potential from a first power supply and power at a second potential from a second power supply, receiving an input signal having a first level and a second level, and supplying a complementary signal, responsive to the input signal, to a signal transmission line pair having a first signal transmission line and a second signal transmission line, the first signal transmission line and the second signal transmission line being mutually parallel and of equal length, wherein:

the driver circuit closes a first current path between the first power supply and the first signal transmission line, and a second current path between the second power supply and the second signal transmission line, when the input signal is at the first level; and the driver circuit opens the first current path and the second current path, and closes a third current path between the first power supply and the second power supply, bypassing the signal transmission line pair, when the input signal is at the second level.

2. The driver circuit of claim 1, comprising:

a first transistor coupled between the first power supply and the first signal transmission line, turning on when the input signal is at the first level and off when the input signal is at the second level, thereby opening and closing the first current path;

a second transistor coupled between the second power supply and the second signal transmission line, turning on when the input signal is at the first level and off when the input signal is at the second level, thereby opening and closing the second current path; and a third transistor coupled between the first power supply and the second power supply, turning on when the input signal is at the second level and off when the input signal is at the first level, thereby opening and closing the third current path.

3. The driver circuit of claim 2, wherein the first signal transmission line and the second signal transmission line are interconnected through a termination resistance, and the third transistor has an on-resistance substantially equal to a sum of an on-resistance of the first transistor, an on-resistance of the second transistor, a direct-current resistance of the first signal transmission line, a direct-current resistance of the second signal transmission line, and the resistance value of the termination resistance.

4. The driver circuit of claim 2, wherein the first transistor has a first terminal coupled to the first signal transmission line and the second transistor has a second terminal coupled to the second signal transmission line, further comprising a noise-elimination resistance coupled between the first terminal and the second terminal, for absorbing reflection noise on the signal transmission line pair.

5. The driver circuit of claim 4, wherein the first signal transmission line and the second signal transmission line have a characteristic impedance, and the noise-elimination resistance has a resistance substantially ten times said characteristic impedance.

6. The driver circuit of claim 4, further comprising:

a first series resistance coupled between the first transistor and the first power supply; and a second series resistance coupled between the second transistor and the second power supply;

wherein the noise-elimination resistance includes a node coupled to the second power supply, a first noise-elimination resistance coupled between the signal transmission line and said node, and a second noise-elimination resistance coupled between said node and the second power supply; and the first series resistance, the second series resistance, the first noise-elimination resistance, and the second noise-elimination resistance have substantially identical resistance values.

7. A signal transmission bus system, comprising:

a driver circuit receiving power at a first potential from a first power supply, receiving power at a second potential from a second power supply, and receiving an input signal having a first level and a second level; and a signal transmission line pair having a first signal transmission line and a second signal transmission line, the first signal transmission line and the second signal transmission line being mutually parallel and of equal length and having a characteristic impedance, wherein, the driver circuit is coupled to one end of the signal transmission line pair;

the driver circuit closes a first current path between the first power supply and the first signal transmission line, and a second current path between the second power supply and the second signal transmission line, thereby supplying a complementary signal to the signal transmission line pair, when the input signal is at the first level; and the driver circuit opens the first current path and the second current path, and closes a third current path between the first power supply and the second power supply, bypassing the signal transmission line pair, when the input signal is at the second level;

the signal transmission bus system further comprising:

a termination resistance interconnecting the first signal transmission line and the second signal transmission line at another end of the signal transmission line pair, having a resistance value matching the characteristic impedance of the first signal transmission line and the second signal transmission line;

at least one branching section disposed at an intermediate point on the signal transmission line pair, diverting part of the complementary signal supplied by the driver circuit away from the signal transmission line pair, the diverted part of the complementary signal being small enough to allow the complementary signal to propagate on the signal transmission line pair substantially undisturbed;

for each said branching section, a receiver circuit coupled to the branching section, sensing the part of the complementary signal diverted by the branching section; and a circuit substrate supporting the signal transmission line pair, the termination resistance, the driver circuit, the branching section, and the receiver circuit.

8. The signal transmission bus system of claim 7, wherein said receiver circuit comprises:

a differential amplifier having differential input terminals receiving the diverted part of the complementary signal; and a termination transistor coupled between the differential input terminals.

9. The signal transmission bus system of claim 8, wherein the termination transistor has a cut-off frequency of at least sixty gigahertz, the termination transistor has a resistance, and the differential amplifier has an input capacitance that, in combination with the resistance of the termination transistor, yields a time constant of at most one hundred picoseconds.

10. The signal transmission bus system of claim 7, further comprising a power line pair including a first power line coupling the driver circuit to the first power supply and a second power line coupling the driver circuit to the second power supply, the first power line and the second power line being mutually parallel and of equal length.

11. The signal transmission bus system of claim 10, further comprising a bypass capacitor coupled between the first power line and the second power line.

12. The signal transmission bus system of claim 7, further comprising at least one series resistance, coupled between the driver circuit and at least one of the first power supply and the second power supply, reducing current consumption by the driver circuit.

13. The signal transmission bus system of claim 7, further comprising:
   a first series resistance coupled between the driver circuit and the first power supply; and
   a second series resistance coupled between the driver circuit and the second power supply;
   wherein the termination resistance includes a node coupled to the second power supply, a first termination resistance coupled between the first signal transmission line and said node, and a second termination resistance coupled between said node and the second signal transmission line; and
   the first series resistance, the second series resistance, the first termination resistance, and the second termination resistance have substantially identical resistance values.

14. The signal transmission bus system of claim 7, wherein the branching section includes:
   a first branch resistance coupled between the receiver circuit and the first signal transmission line; and
   a second branch resistance coupled between the receiver circuit and the second signal transmission line.

15. The signal transmission bus system of claim 14, wherein the first branch resistance and the second branch resistance have resistance values of at least four hundred ohms.

16. The signal transmission bus system of claim 14, wherein the branching section also includes a branch transmission line pair having:
   a first branch transmission line coupling the first branch resistance to the receiver circuit; and
   a second branch transmission line coupling the second branch resistance to the receiver circuit, the first branch transmission line and the second branch transmission line being mutually parallel and of equal length.

17. The signal transmission bus system of claim 16, comprising a plurality of separate units sharing the same circuit substrate, each separate unit having its own said signal transmission line pair, its own said termination resistance, its own said driver circuit, its own said branching section, and its own said receiver circuit, wherein the circuit substrate has:
   a first dielectric layer separating the first signal transmission line from the second signal transmission line in the signal transmission line pair of one of the separate units;
   a second dielectric layer separating the first branch transmission line from the second branch transmission line in the branch transmission line pair of another one of the separate units; and
   a third dielectric layer at least twice as thick as the first dielectric layer and at least twice as thick as the second dielectric layer, separating the signal transmission line pair of said one of the separate units from the branch transmission line pair of said another one of the separate units, the signal transmission line pair of said one of the separate units crossing the branch transmission line pair of said another one of the separate units as seen looking in a direction perpendicular to the third dielectric layer.

18. The signal transmission bus system of claim 7, wherein the receiver circuit is coupled directly to the signal transmission line pair, has an input impedance of at least one thousand ohms, and has an input capacitance of at most 0.05 picofarad.

19. The signal transmission bus system of claim 7, wherein the complementary signal has an energy, and at least nine-tenths of said energy is left on the signal transmission line pair without being diverted by any said branching section.

20. The signal transmission bus system of claim 7, wherein the circuit substrate has a dielectric layer separating the first signal transmission line from the second signal transmission line.

21. The signal transmission bus system of claim 7, wherein the circuit substrate has a dielectric layer, and the first signal transmission line and the second signal transmission line are disposed side by side on the dielectric layer.

22. The signal transmission bus system of claim 7, comprising a plurality of separate units sharing the same circuit substrate, each separate unit having its own said signal transmission line pair, its own said termination resistance, its own said driver circuit, its own said branching section, and its own said receiver circuit.

23. A signal transmission bus system, comprising:
   a driver circuit receiving power at a first potential from a first power supply, receiving power at a second potential from a second power supply, and receiving an input signal having a first level and a second level;
   a signal transmission line pair having a first signal transmission line and a second signal transmission line, the first signal transmission line and the second signal transmission line being mutually parallel and of equal length and having a characteristic impedance; and
   a branching section disposed between the driver circuit and the signal transmission line pair, coupling the driver circuit to an intermediate point on the signal transmission line pair;
   wherein,
      the driver circuit closes a first current path between the first power supply and the first signal transmission line, and a second current path between the second power supply and the second signal transmission line, thereby supplying a complementary signal to the signal transmission line pair, when the input signal is at the first level; and
      the driver circuit opens the first current path and the second current path, and closes a third current path between the first power supply and the second power supply, bypassing the signal transmission line pair, when the input signal is at the second level;
   the signal transmission bus system further comprising:

a termination resistance interconnecting the first signal transmission line and the second signal transmission line at one end of the signal transmission line pair, having a resistance value matching the characteristic impedance of the first signal transmission line and the second signal transmission line;

a receiver circuit coupled to another end of the signal transmission line pair, sensing the complementary signal; and a circuit substrate supporting the signal transmission line pair, the termination resistance, the driver circuit, the branching section, and the receiver circuit.

24. The signal transmission bus system of claim 23, further comprising a power line pair including a first power line coupling the driver circuit to the first power supply and a second power line coupling the driver circuit to the second power supply, the first power line and the second power line being mutually parallel and of equal length.

25. The signal transmission bus system of claim 24, further comprising a bypass capacitor coupled between the first power line and the second power line.

26. The signal transmission bus system of claim 23, further comprising at least one series resistance, coupled between the driver circuit and at least one of the first power supply and the second power supply, reducing current consumption by the driver circuit.

27. The signal transmission bus system of claim 23, further comprising:

a first series resistance coupled between the driver circuit and the first power supply; and a second series resistance coupled between the driver circuit and the second power supply;

wherein the termination resistance includes a node coupled to the second power supply, a first termination resistance coupled between the first signal transmission line and said node, and a second termination resistance coupled between said node and the second signal transmission line; and the first series resistance, the second series resistance, the first termination resistance, and the second termination resistance have substantially identical resistance values.

28. The signal transmission bus system of claim 23, wherein the receiver circuit includes an input termination resistance interconnecting the first signal transmission line and the second signal transmission line, having a resistance value matching the characteristic impedance of the first signal transmission line and the second signal transmission line.

29. The signal transmission bus system of claim 23, comprising a plurality of separate units coupled to the signal transmission line pair, each separate unit having its own said driver circuit and its own said branching section, each said branching section having a bus transceiver circuit disposed between the driver circuit and the signal transmission line pair, the bus transceiver circuit comprising:

a first branch transistor coupling the driver circuit to the first signal transmission line; and a second branch transistor coupling the driver circuit to the second signal transmission line;

wherein the first branch transistor and the second branch transistor turn on in at most one of the separate units at a time.

30. The signal transmission bus system of claim 29, wherein each said branching section also has a branch transmission line pair including a first branch transmission line coupling the first branch transistor to the driver circuit and a second branch transmission line coupling the second branch transistor to the driver circuit, the first branch transmission line and the second branch transmission line being mutually parallel and of equal length.

31. The signal transmission bus system of claim 30, wherein the first branch transmission line and the second branch transmission line have a characteristic impedance equal to substantially one-half the characteristic impedance of the first signal transmission line and the second signal transmission line.

32. The signal transmission bus system of claim 30, comprising a plurality of separate super-units sharing the same circuit substrate, each separate super-unit having its own said signal transmission line pair, its own said termination resistance, its own said plurality of separate units, and its own said receiver circuit, wherein the circuit substrate has:

a first dielectric layer separating the first signal transmission line from the second signal transmission line in the signal transmission line pair of one of the separate super-units;

a second dielectric layer separating the first branch transmission line from the second branch transmission line in the branch transmission line pair of one of the branching sections of another one of the separate super-units; and a third dielectric layer at least twice as thick as the first dielectric layer and at least twice as thick as the second dielectric layer, separating the signal transmission line pair of said one of the separate super-units from the branch transmission line pair of said one of the branching sections, the signal transmission line pair of said one of the separate super-units crossing the branch transmission line pair of said one of the branching sections as seen looking in a direction perpendicular to the third dielectric layer.

33. The signal transmission bus system of claim 23, wherein the circuit substrate has a dielectric layer separating the first signal transmission line from the second signal transmission line.

34. The signal transmission bus system of claim 23, wherein the circuit substrate has a dielectric layer, and the first signal transmission line and the second signal transmission line are disposed side by side on the dielectric layer.

35. The signal transmission bus system of claim 23, comprising a plurality of separate units sharing the same circuit substrate, each separate unit having its own said signal transmission line pair, its own said termination resistance, its own said driver circuit, its own said branching section, and its own said receiver circuit.

36. A signal transmission bus system, comprising:

a signal transmission line pair having a first signal transmission line and a second signal transmission line, the first signal transmission line and the second signal transmission line being mutually parallel and of equal length and having a characteristic impedance;

a termination resistance interconnecting the first signal transmission line and the second signal transmission line at one end of the signal transmission line pair, having a resistance value matching the characteristic impedance of the first signal transmission line and the second signal transmission line;

a first integrated-circuit chip coupled to another end of the signal transmission line pair, including a first driver circuit supplying a first complementary signal to the signal transmission line pair, and a first receiver circuit sensing a second complementary signal received from the signal transmission line pair;

at least one second integrated-circuit chip, including a second driver circuit supplying the second complementary signal to the signal transmission line pair, and a second receiver circuit sensing the first complementary signal on the signal transmission line pair, while allowing the first complementary signal to propagate substantially undisturbed on the signal transmission line pair;

for each said second integrated-circuit chip, a branching section coupling the second integrated-circuit chip to an intermediate point on the signal transmission line pair; and a circuit substrate supporting the signal transmission line pair, the termination resistance, the first integrated-circuit chip, the second integrated-circuit chip, and the branching section;

wherein,
at least one of the first driver circuit and the second driver circuit receives power at a first potential from a first power supply, receives power at a second potential from a second power supply, and receives an input signal having a first level and a second level;

said one of the first driver circuit and the second driver circuit closes a first current path between the first power supply and the first signal transmission line, and a second current path between the second power supply and the second signal transmission line, thereby supplying a corresponding one of the first complementary signal and the second complementary signal to the signal transmission line pair, when the input signal is at the first level; and said one of the first driver circuit and the second driver circuit opens the first current path and the second current path, and closes a third current path between the first power supply and the second power supply, bypassing the signal transmission line pair, when the input signal is at the second level.

37. The signal transmission bus system of claim 36, wherein the second receiver circuit comprises:
a differential amplifier having differential input terminals receiving the first complementary signal; and
a termination transistor coupled between the differential input terminals.

38. The signal transmission bus system of claim 37, wherein the termination transistor has a cut-off frequency of at least sixty gigahertz, the termination transistor has a resistance, and the differential amplifier has an input capacitance that, in combination with the resistance of the termination transistor, yields a time constant of at most one hundred picoseconds.

39. The signal transmission bus system of claim 36, further comprising a power line pair including a first power line coupling said one of the first driver circuit and the second driver circuit to the first power supply, and a second power line coupling said one of the first driver circuit and the second driver circuit to the second power supply, the first power line and the second power line being mutually parallel and of equal length.

40. The signal transmission bus system of claim 39, further comprising a bypass capacitor coupled between the first power line and the second power line.

41. The signal transmission bus system of claim 36, further comprising at least one series resistance, coupled between said one of the first driver circuit and the second driver circuit and at least one of the first power supply and the second power supply, reducing current consumption by said one of the first driver circuit and the second driver circuit.

42. The signal transmission bus system of claim 36, further comprising:
a first series resistance coupled between the first power supply and said one of the first driver circuit and the second driver circuit; and
a second series resistance coupled between the second power supply and said one of the first driver circuit and the second driver circuit;
wherein the termination resistance includes a node coupled to the second power supply, a first termination resistance coupled between the first signal transmission line and said node, and a second termination resistance coupled between said node and the second signal transmission line; and
the first series resistance, the second series resistance, the first termination resistance, and the second termination resistance have substantially identical resistance values.

43. The signal transmission bus system of claim 36, wherein the first integrated-circuit chip further includes an integrated termination resistance and a transistor, the integrated termination resistance and the transistor being coupled in series between the first signal transmission line and the second signal transmission line, the integrated termination resistance having a resistance value matching the characteristic impedance of the first signal transmission line and the second signal transmission line, the transistor turning on when the first receiver circuit senses the second complementary signal, and turning off when the first driver circuit supplies the first complementary signal to the signal transmission line pair.

44. The signal transmission bus system of claim 36, wherein the branching section includes a bus transceiver circuit having:
a first branch resistance coupled between the first signal transmission line and the second integrated-circuit chip;
a second branch resistance coupled between the second signal transmission line and the second integrated-circuit chip;
a first branch transistor coupled in parallel with the first branch resistance; and
a second branch transistor coupled in parallel with the second branch resistance;
the first branch transistor and the second branch transistor turning on to enable the second driver circuit to supply the second complementary signal to the signal transmission line pair, and turning off at other times.

45. The signal transmission bus system of claim 44, wherein the first branch resistance and the second branch resistance have respective resistance values of at least four hundred ohms.

46. The signal transmission bus system of claim 44, wherein the branching section also includes a branch transmission line pair having:
a first branch transmission line coupling the second integrated circuit chip to the first branch transistor and the first branch resistance; and
a second branch transmission line coupling the second integrated circuit chip to the second branch transistor and the second branch resistance, the first branch transmission line and the second branch transmission line being mutually parallel and of equal length.

47. The signal transmission bus system of claim 46, comprising a plurality of separate units sharing the same circuit substrate, each separate unit having its own said signal transmission line pair, its own said termination resistance, its own said first integrated-circuit chip, its own said branching section, and its own said second integrated-circuit chip, wherein the circuit substrate has:
- a first dielectric layer separating the first signal transmission line from the second signal transmission line in the signal transmission line pair of one of the separate units;
- a second dielectric layer separating the first branch transmission line from the second branch transmission line in the branch transmission line pair of another one of the separate units; and
- a third dielectric layer at least twice as thick as the first dielectric layer and at least twice as thick as the second dielectric layer, separating the signal transmission line pair of said one of the separate units from the branch transmission line pair of said another one of the separate units, the signal transmission line pair of said one of the separate units crossing the branch transmission line pair of said another one of the separate units as seen looking in a direction perpendicular to the third dielectric layer.

48. The signal transmission bus system of claim 36, wherein the complementary signal has an energy, and at least nine-tenths of said energy is left on the signal transmission line pair without being diverted by any said branching section.

49. The signal transmission bus system of claim 36, wherein the circuit substrate has a dielectric layer separating the first signal transmission line from the second signal transmission line.

50. The signal transmission bus system of claim 36, wherein the circuit substrate has a dielectric layer, and the first signal transmission line and the second signal transmission line are disposed side by side on the dielectric layer.

51. The signal transmission bus system of claim 36, comprising a plurality of separate units sharing the same circuit substrate, each separate unit having its own said signal transmission line pair, its own said termination resistance, its own said first integrated-circuit chip, its own said branching section, and its own said second integrated-circuit chip.

52. A receiver circuit sensing a complementary signal transmitted on a signal transmission line pair while allowing the complementary signal to propagate substantially undisturbed on the signal transmission line pair, the signal transmission line pair having a first signal transmission line and a second signal transmission line, the first signal transmission line and the second signal transmission line being parallel and of equal length, the receiver circuit being coupled to the signal transmission line pair through a branch resistance pair, the receiver circuit comprising:
- a differential amplifier having a pair of differential input terminals coupled through the branch resistance pair to the signal transmission line pair, the differential amplifier sensing the complementary signal, and generating an output signal indicating presence and absence of the complementary signal; and
- a termination transistor coupled between the differential input terminals.

53. The receiver circuit of claim 52, receiving power from a power supply, wherein the termination transistor is a field-effect transistor having a source electrode coupled to one of said differential input terminals, a drain electrode coupled to another one of said differential input terminals, and a gate electrode coupled to the power supply.

54. A signal transmission bus system, comprising:
- a signal transmission line pair having a first signal transmission line and a second signal transmission line, the first signal transmission line and the second signal transmission line being mutually parallel and of equal length and having a characteristic impedance;
- a termination resistance interconnecting the first signal transmission line and the second signal transmission line at one end of the signal transmission line pair, having a resistance value matching the characteristic impedance of the first signal transmission line and the second signal transmission line;
- a driver circuit coupled to another end of the signal transmission line pair, supplying a complementary signal to the signal transmission line pair;
- at least one branching section disposed at an intermediate point on the signal transmission line pair, diverting part of the complementary signal supplied by the driver circuit away from the signal transmission line pair, the diverted part of the complementary signal being small enough to allow the complementary signal to propagate on the signal transmission line pair substantially undisturbed;
- for each said branching section, a receiver circuit coupled to the branching section, sensing the part of the complementary signal diverted by the branching section; and
- a circuit substrate supporting the signal transmission line pair, the termination resistance, the driver circuit, the branching section, and the receiver circuit;

wherein at least one said receiver circuit includes:
- a differential amplifier having a pair of differential input terminals coupled through the branching section to the signal transmission line pair, the differential amplifier sensing the part of the complementary signal diverted by the branching section, and generating an output signal indicating presence and absence of the complementary signal; and
- a termination transistor coupled between the differential input terminals.

55. The signal transmission bus system of claim 54, wherein, in said at least one said receiver circuit, the termination transistor has a cut-off frequency of at least sixty gigahertz, the termination transistor has a resistance, and the differential amplifier has an input capacitance that, in combination with the resistance of the termination transistor, yields a time constant of at most one hundred picoseconds.

56. The signal transmission bus system of claim 54, wherein the branching section includes:
- a first branch resistance coupled between the receiver circuit and the first signal transmission line; and
- a second branch resistance coupled between the receiver circuit and the second signal transmission line.

57. The signal transmission bus system of claim 56, wherein the first branch resistance and the second branch resistance have resistance values of at least four hundred ohms.

58. The signal transmission bus system of claim 56, wherein the branching section also includes a branch transmission line pair having:
- a first branch transmission line coupling the first branch resistance to the receiver circuit; and a second branch transmission line coupling the second branch resistance to the receiver circuit, the first branch transmission line and the second branch transmission line being mutually parallel and of equal length.

59. The signal transmission bus system of claim 58, comprising a plurality of separate units sharing the same circuit substrate, each separate unit having its own said signal transmission line pair, its own said termination resistance, its own said driver circuit, its own said branching section, and its own said receiver circuit, wherein the circuit substrate has:
- a first dielectric layer separating the first signal transmission line from the second signal transmission line in the signal transmission line pair of one of the separate units;
- a second dielectric layer separating the first branch transmission line from the second branch transmission line in the branch transmission line pair of another one of the separate units; and
- a third dielectric layer at least twice as thick as the first dielectric layer and at least twice as thick as the second dielectric layer, separating the signal transmission line pair of said one of the separate units from the branch transmission line pair of said another one of the separate units, the signal transmission line pair of said one of the separate units crossing the branch transmission line pair of said another one of the separate units as seen looking in a direction perpendicular to the third dielectric layer.

60. The signal transmission bus system of claim 54, wherein the complementary signal has an energy, and at least nine-tenths of said energy is left on the signal transmission line pair without being diverted by any said branching section.

61. The signal transmission bus system of claim 54, wherein the circuit substrate has a dielectric layer separating the first signal transmission line from the second signal transmission line.

62. The signal transmission bus system of claim 54, wherein the circuit substrate has a dielectric layer, and the first signal transmission line and the second signal transmission line are disposed side by side on the dielectric layer.

63. The signal transmission bus system of claim 54, comprising a plurality of separate units sharing the same circuit substrate, each separate unit having its own said signal transmission line pair, its own said termination resistance, its own said driver circuit, its own said branching section, and its own said receiver circuit.

64. A signal transmission bus system, comprising:
- a signal transmission line pair having a first signal transmission line and a second signal transmission line, the first signal transmission line and the second signal transmission line being mutually parallel and of equal length and having a characteristic impedance;
- a termination resistance interconnecting the first signal transmission line and the second signal transmission line at one end of the signal transmission line pair, having a resistance value matching the characteristic impedance of the first signal transmission line and the second signal transmission line;
- a first integrated-circuit chip coupled to another end of the signal transmission line pair, including a first driver circuit supplying a first complementary signal to the signal transmission line pair, and a first receiver circuit sensing a second complementary signal received from the signal transmission line pair;
- at least one second integrated-circuit chip including a second driver circuit supplying the second complementary signal to the signal transmission line pair, and a second receiver circuit sensing the first complementary signal on the signal transmission line pair, while allowing the first complementary signal to propagate substantially undisturbed on the signal transmission line pair;
- for each said second integrated-circuit chip, a branching section coupling the second integrated-circuit chip to an intermediate point on the signal transmission line pair; and
- a circuit substrate supporting the signal transmission line pair, the termination resistance, the first integrated-circuit chip, the second integrated-circuit chip, and the branching section;
- wherein the second receiver circuit includes:
  - a differential amplifier having a pair of differential input terminals coupled through the branching section to the signal transmission line pair, the differential amplifier sensing the first complementary signal, and generating an output signal indicating presence and absence of the first complementary signal; and
  - a termination transistor coupled between the differential input terminals.

65. The signal transmission bus system of claim 64, wherein the first integrated-circuit chip further includes an integrated termination resistance and a transistor, the integrated termination resistance and the transistor being coupled in series between the first signal transmission line and the second signal transmission line, the integrated termination resistance having a resistance value matching the characteristic impedance of the first signal transmission line and the second signal transmission line, the transistor turning on when the first receiver circuit senses the second complementary signal, and turning off when the first driver circuit supplies the first complementary signal to the signal transmission line pair.

66. The signal transmission bus system of claim 64, wherein, in the second receiver circuit, the termination transistor has a cut-off frequency of at least sixty gigahertz, the termination transistor has a resistance, and the differential amplifier has an input capacitance that, in combination with the resistance of the termination transistor, yields a time constant of at most one hundred picoseconds.

67. The signal transmission bus system of claim 64, wherein the branching section includes a bus transceiver circuit having:
- a first branch resistance coupled between the first signal transmission line and the second integrated-circuit chip;
- a second branch resistance coupled between the second signal transmission line and the second integrated-circuit chip;
- a first branch transistor coupled in parallel with the first branch resistance; and
- a second branch transistor coupled in parallel with the second branch resistance;
- the first branch transistor and the second branch transistor turning on to enable the second driver circuit to supply the second complementary signal to the signal transmission line pair, and turning off at other times.

68. The signal transmission bus system of claim 67, wherein the first branch resistance and the second branch resistance have respective resistance values of at least four hundred ohms.

69. The signal transmission bus system of claim 67, wherein the branching section also includes a branch transmission line pair having:
- a first branch transmission line coupling the second integrated circuit chip to the first branch transistor and the first branch resistance; and
- a second branch transmission line coupling the second integrated circuit chip to the second branch transistor and the second branch resistance, the first branch transmission line and the second branch transmission line being mutually parallel and of equal length.

70. The signal transmission bus system of claim 69, comprising a plurality of separate units sharing the same circuit substrate, each separate unit having its own said signal transmission line pair, its own said termination resistance, its own said first integrated-circuit chip, its own said branching section, and its own said second integrated-circuit chip, wherein the circuit substrate has:
- a first dielectric layer separating the first signal transmission line from the second signal transmission line in the signal transmission line pair of one of the separate units;
- a second dielectric layer separating the first branch transmission line from the second branch transmission line in the branch transmission line pair of the branching section of another one of the separate units; and
- a third dielectric layer at least twice as thick as the first dielectric layer and at least twice as thick as the second dielectric layer, separating the signal transmission line pair of said one of the separate units from the branch transmission line pair of said another one of the separate units, the signal transmission line pair of said one of the separate units crossing the branch transmission line pair of said another one of the separate units as seen looking in a direction perpendicular to the third dielectric layer.

71. The signal transmission bus system of claim 64, wherein the complementary signal has an energy, and at least nine-tenths of said energy is left on the signal transmission line pair without being diverted by any said branching section.

72. The signal transmission bus system of claim 64, wherein the circuit substrate has a dielectric layer separating the first signal transmission line from the second signal transmission line.

73. The signal transmission bus system of claim 64, wherein the circuit substrate has a dielectric layer, and the first signal transmission line and the second signal transmission line are disposed side by side on the dielectric layer.

74. The signal transmission bus system of claim 64, comprising a plurality of separate units sharing the same circuit substrate, each separate unit having its own said signal transmission line pair, its own said termination resistance, its own said first integrated-circuit chip, its own said branching section, and its own said second integrated-circuit chip.

* * * * *